United States Patent
Lee et al.

(10) Patent No.: US 9,320,026 B2
(45) Date of Patent: Apr. 19, 2016

(54) METHOD AND USER EQUIPMENT FOR TRANSMITTING ACK/NACK INFORMATION, AND METHOD AND BASE STATION FOR RECEIVING ACK/NACK INFORMATION

(75) Inventors: Hyunwoo Lee, Anyang-si (KR); Sungho Moon, Anyang-si (KR); Jaehoon Chung, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 13/995,452

(22) PCT Filed: Nov. 22, 2011

(86) PCT No.: PCT/KR2011/008904
§ 371 (c)(1),
(2), (4) Date: Jun. 18, 2013

(87) PCT Pub. No.: WO2012/086932
PCT Pub. Date: Jun. 28, 2012

(65) Prior Publication Data
US 2013/0272258 A1    Oct. 17, 2013

Related U.S. Application Data

(60) Provisional application No. 61/424,673, filed on Dec. 20, 2010, provisional application No. 61/442,274, filed on Feb. 13, 2011.

(30) Foreign Application Priority Data
Mar. 31, 2011   (KR) .................... 10-2011-0029918

(51) Int. Cl.
*H04W 72/04*    (2009.01)
*H04B 7/04*    (2006.01)
(Continued)

(52) U.S. Cl.
CPC ......... *H04W 72/0413* (2013.01); *H04B 7/0413* (2013.01); *H04L 1/06* (2013.01); *H04L 1/1861* (2013.01); *H04L 5/0055* (2013.01)

(58) Field of Classification Search
CPC ....... H04L 1/18; H04L 1/0027; H04L 1/0029; H04L 1/1671; H04L 1/1692; H04L 1/1685; H04L 1/1812; H04L 1/1861; H04L 1/1858; H04L 1/1887; H04L 5/001; H04L 5/0007; H04L 5/0023; H04L 5/0053; H04L 5/0055; H04L 5/0064; H04L 5/0091; H04L 5/0094; H04W 28/06; H04W 52/58; H04W 72/00; H04W 72/042; H04W 72/0406; H04W 72/0413
See application file for complete search history.

(56) References Cited

U.S. PATENT DOCUMENTS

| 8,374,136 | B2 * | 2/2013 | Yin ............................... 370/329 |
| 2009/0207793 | A1 * | 8/2009 | Shen et al. .................. 370/329 |

(Continued)

FOREIGN PATENT DOCUMENTS

| KR | 10-2009-0017408 A | 2/2009 |
| KR | 10-2010-0107393 A | 10/2010 |

(Continued)

OTHER PUBLICATIONS

LG Electronics, "PUCCH resource allocation for ACK/NACK", 3GPP TSG RAN WG1 Meeting #63, R1-106129, Nov. 15-19, 2010.

(Continued)

*Primary Examiner* — John Pezzlo
*Assistant Examiner* — Dharmesh Patel
(74) *Attorney, Agent, or Firm* — Dentons US LLP

(57) ABSTRACT

A method and user equipment (UE) for transmitting ACK/NACK information, and a method and base station (BS) for receiving ACK/NACK information are disclosed. If ACK/NACK repetition and spatial orthogonal-resource transmit diversity (SORTD) caused by 2 antenna ports are configured in the UE, the UE performs first ACK/NACK transmission using 2 PUCCH resources implicitly decided by an associated PDCCH. From the second transmission, the UE performs ACK/NACK transmission using 2 PUCCH resources explicitly assigned respectively for the two antenna ports.

20 Claims, 33 Drawing Sheets

(51) Int. Cl.
  *H04L 1/06* (2006.01)
  *H04L 1/18* (2006.01)
  *H04L 5/00* (2006.01)

(56) References Cited

U.S. PATENT DOCUMENTS

2010/0290418 A1 11/2010 Nishio et al.
2010/0303035 A1 12/2010 Gao et al.
2011/0243066 A1* 10/2011 Nazar et al. .................. 370/328

FOREIGN PATENT DOCUMENTS

WO 2010110598 A2 9/2010
WO 2010132006 A1 11/2010

OTHER PUBLICATIONS

Panasonic, "ACK/NACK resource indication for SORTD and SDM", 3GPP TSG RAN WG1 Meeting #63, R1-106063, Nov. 15-19, 2010.
Pantech, "PUCCH resource allocation with SORTD for channel selection", 3GPP TSG RAN WG1 Meeting #63, R1-106054, Nov. 15-19, 2010.
Etri, "Resource allocation for channel-selection based A/N", 3GPP TSG RAN WG1 Meeting #63, R1-106173, Nov. 15-19, 2010.
Texas Instruments: "RRC Configured ACK/NAK Repetition in EUTRA Uplink", 3GPP TSG RAN WG1 #53b, R1-082488, Jun. 30-Jul. 4, 2008.
ZTE: "Consideration on ACK/NAK transmission for multi-antenna PUCCH format 2b in LTE-A", 3GPP TSG-RAN WG1 Meeting #60bis, R1-101817, Apr. 12-16, 2010.
HTC Corporation: "SPS release issues", 3GPP TSG-RAN Wg2 #64, R1-086091, Sep. 29-Oct. 3, 2008.

* cited by examiner (a)　　　　　　　　　　　　(b)

Single component carrier (e.g. LTE system)

PUCCH format 1a and 1b structure (normal CP case)

PUCCH format 1a and 1b structure (extended CP case)

One resource between 2 explicit resources 2 explicit resources 1 resource among 2 explicit resources

METHOD AND USER EQUIPMENT FOR TRANSMITTING ACK/NACK INFORMATION, AND METHOD AND BASE STATION FOR RECEIVING ACK/NACK INFORMATION

TECHNICAL FIELD

The present invention relates to a wireless communication system, and more particularly to a method and apparatus for transmitting uplink control information.

BACKGROUND ART

Wireless communication systems are widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi-Carrier Frequency Division Multiple Access (MC-FDMA) system, and the like.

DISCLOSURE OF INVENTION

Technical Problem

Accordingly, the present invention is directed to a method and a user equipment (UE) for transmitting ACK/NACK information, and a method and a base station (BS) for receiving ACK/NACK information, that substantially obviate one or more problems due to limitations and disadvantages of the related art.

An object of the present invention devised to solve the problem lies on a method and apparatus for effectively transmitting control information in a wireless communication system. Another object of the present invention devised to solve the problem lies on a channel format and signal processing for effectively transmitting control information, and an apparatus thereof. A further object of the present invention devised to solve the problem lies on a method and apparatus for effectively allocating resources to transmit control information.

It is to be understood that objects to be achieved by the present invention are not limited to the aforementioned objects and other objects which are not mentioned will be apparent to those of ordinary skill in the art to which the present invention pertains from the following description.

Solution to Problem

The object of the present invention can be achieved by providing a method for transmitting ACK/NACK (ACKnowledgement/NegativeACK) information to a base station (BS) by a user equipment (UE) in a wireless communication system, the method including: receiving at least one physical downlink control channel (PDCCH) from the base station (BS); receiving physical uplink control channel (PUCCH) resource information for ACK/NACK repetition from the base station (BS), wherein the PUCCH resource information includes a first PUCCH resource for a first antenna port and a second PUCCH resource for a second antenna port; performing an initial transmission process that includes a step of transmitting the ACK/NACK information to the base station (BS) through the first antenna port using a PUCCH resource derived from a lowest control channel element (CCE) index ($n_{CCE}$) from among CCE indexes of the PDCCH and a step of transmitting the ACK/NACK information to the base station (BS) through the second antenna port using a PUCCH resource derived from a CCE index ($n_{CCE}+1$); and performing a repetition transmission process that includes a step of repeatedly transmitting the ACK/NACK information to the base station (BS) through the first antenna port using the first PUCCH resource and a step for repeatedly transmitting the ACK/NACK information to the base station (BS) through the second antenna port using the second PUCCH resource.

In another aspect of the present invention, provided herein is a method for receiving ACK/NACK (ACKnowledgement/NegativeACK) information from a user equipment (UE) by a base station (BS) in a wireless communication system, the method including: transmitting at least one physical downlink control channel (PDCCH) to the user equipment (UE); transmitting physical uplink control channel (PUCCH) resource information for ACK/NACK repetition to the user equipment (UE), wherein the PUCCH resource information includes a first PUCCH resource for a first antenna port of the user equipment (UE) and a second PUCCH resource for a second antenna port of the user equipment (UE); performing an initial reception process that includes a step of receiving the ACK/NACK information from the first antenna port using a PUCCH resource derived from a lowest control channel element (CCE) index ($n_{CCE}$) from among CCE indexes of the PDCCH and a step of receiving the ACK/NACK information from the second antenna port using a PUCCH resource derived from a CCE index ($n_{CCE}+1$); and performing a repetition reception process that includes a step of repeatedly receiving the ACK/NACK information from the first antenna port using the first PUCCH resource and a step for repeatedly receiving the ACK/NACK information from the second antenna port using the second PUCCH resource.

In another aspect of the present invention, provided herein is a user equipment (UE) for transmitting ACK/NACK (ACKnowledgement/NegativeACK) information to a base station (BS) in a wireless communication system, the user equipment (UE) including: a receiver; a transmitter; and a processor for controlling the receiver and the transmitter, wherein the receiver receives at least one physical downlink control channel (PDCCH) from the base station (BS), receives physical uplink control channel (PUCCH) resource information for ACK/NACK repetition from the base station (BS), the PUCCH resource information including a first PUCCH resource for a first antenna port and a second PUCCH resource for a second antenna port, and the processor controls the transmitter in such a manner that the transmitter performs an initial transmission process that includes a step of transmitting the ACK/NACK information to the base station (BS) through the first antenna port using a PUCCH resource derived from a lowest control channel element (CCE) index ($n_{CCE}$) from among CCE indexes of the PDCCH and a step of transmitting the ACK/NACK information to the base station (BS) through the second antenna port using a PUCCH resource derived from a CCE index ($n_{CCE}+1$), and also controls the transmitter in such a manner that the transmitter performs a repetition transmission process that includes a step of repeatedly transmitting the ACK/NACK information to the base station (BS) through the first antenna port using the first PUCCH resource and a step for repeatedly transmitting the ACK/NACK information to the base station (BS) through the second antenna port using the second PUCCH resource.

In another aspect of the present invention, provided herein is a base station (BS) for receiving ACK/NACK (ACKnowledgement/NegativeACK) information from a user equipment (UE) by a base station (BS) in a wireless communication system, the base station (BS) including: a receiver; a transmitter; and a processor for controlling the receiver and the transmitter, wherein the processor controls the transmitter in such a manner that the transmitter transmits at least one physical downlink control channel (PDCCH) to the user equipment (UE), and transmits physical uplink control channel (PUCCH) resource information for ACK/NACK repetition to the user equipment (UE), wherein the PUCCH resource information includes a first PUCCH resource for a first antenna port of the user equipment (UE) and a second PUCCH resource for a second antenna port of the user equipment (UE), and the processor controls the receiver in such a manner that the receiver performs an initial reception process that includes a step of receiving the ACK/NACK information from the first antenna port using a PUCCH resource derived from a lowest control channel element (CCE) index ($n_{CCE}$) from among CCE indexes of the PDCCH and a step of receiving the ACK/NACK information from the second antenna port using a PUCCH resource derived from a CCE index ($n_{CCE}+1$), and performs a repetition reception process that includes a step of repeatedly receiving the ACK/NACK information from the first antenna port using the first PUCCH resource and a step for repeatedly receiving the ACK/NACK information from the second antenna port using the second PUCCH resource.

In each of the aspects of the present invention, information indicating the number of ACK/NACK repetition times may be transmitted from the base station (BS) to the user equipment (UE), and the ACK/NACK information may be repeatedly transmitted from the user equipment (UE) to the base station (BS) (the number of ACK/NACK repetition times 1) times using the first PUCCH resource and the second PUCCH resource.

In each of the aspects of the present invention, information indicating the number of ACK/NACK repetition times and the PUCCH resource information may be transmitted from the base station (BS) to the user equipment (UE), through a radio resource control (RRC) message.

In each of the aspects of the present invention, if the PDCCH is a PDCCH indicating a specific PDSCH, the ACK/NACK information is an ACK/NACK response for the specific PDSCH, and if the PDCCH is a PDCCH indicating semi-static scheduling (SPS) release, the ACK/NACK information is an ACK/NACK response for the PDCCH indicating the SPS release.

In each of the aspects of the present invention, information instructing that the user equipment (UE) transmit ACK/NACK information using two antenna ports may be transmitted from the base station (BS) to the user equipment (UE).

The aforementioned technical solutions are only a part of the embodiments of the present invention, and various modifications to which technical features of the present invention are applied could be understood by those of ordinary skill in the art to which the present invention pertains, based on the following detailed description of the present invention.

Advantageous Effects of Invention

As is apparent from the above description, exemplary embodiments of the present invention have the following effects.

In accordance with the embodiments of the present invention, control information can be effectively transmitted in a wireless system. In addition, the embodiments of the present invention can provide a channel format and a signal processing method to effectively transmit control information. In addition, resources for transmitting control information can be effectively assigned.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
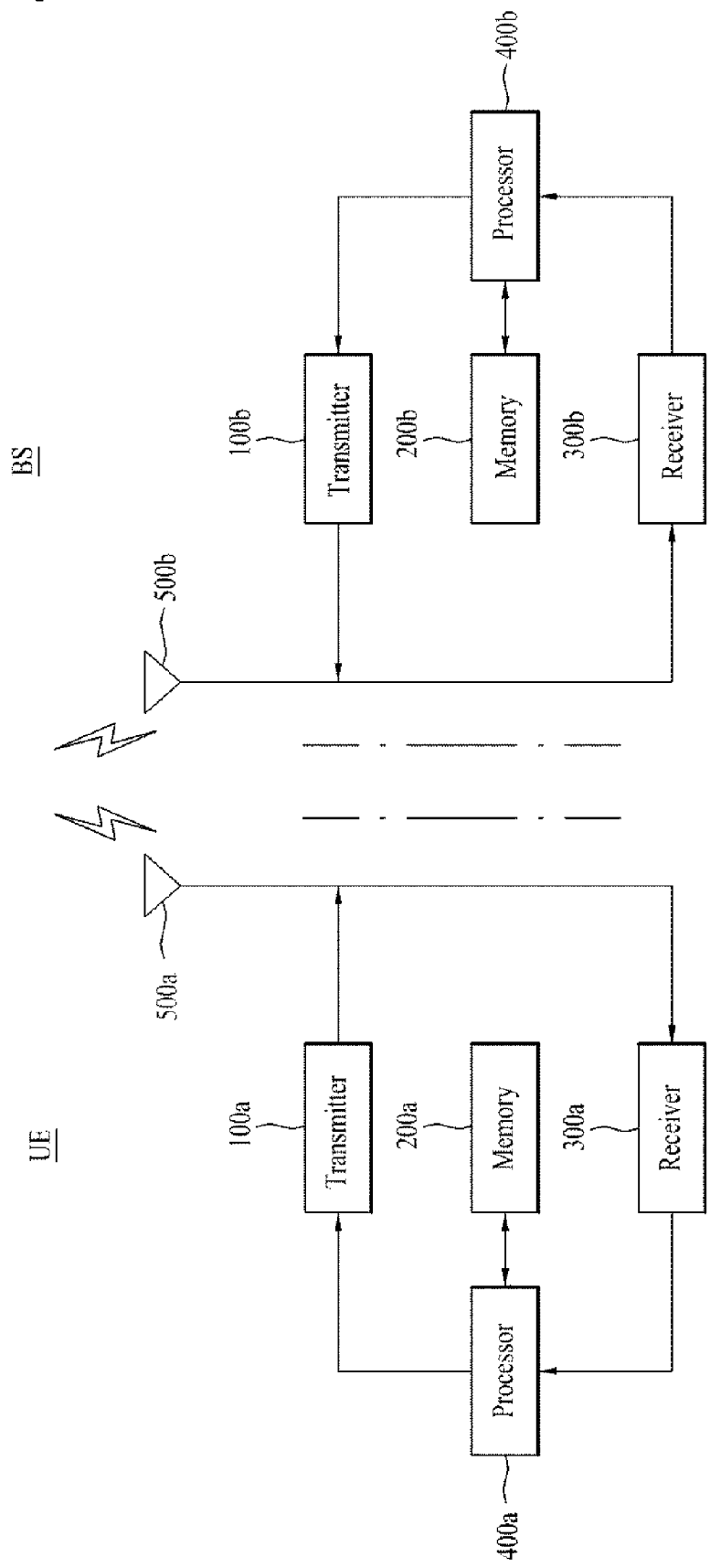
FIG. 1 is a block diagram of a UE and a BS for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an EvolvedNodeB (eNB), a Base Transceiver System (BTS), and an Access Point (AP).

In the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

In the present invention, a rank or a transmission rank may indicate the number of layers multiplexed/allocated to one OFDM symbol or one data resource element (RE).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of REs carrying Downlink Control Information (DCI), a set of REs carrying Control Format Indicator (CFI), a set of REs carrying downlink ACK/NACK (ACKnowlegement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal. In the present invention, RE that is assigned to or pertains to PDCCH/PCFICH/PHICH/PDSCH/PUCCH/PUSCH/PRACH may be called PDCCH/PCFICH/PHICH/

PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

On the other hand, in the present invention, ACK/NACK information mapping to a specific constellation point may be conceptually identical to ACK/NACK information mapping to a specific complex modulation symbol.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port is not designed to be further deconstructed by the UE receiver (300a). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
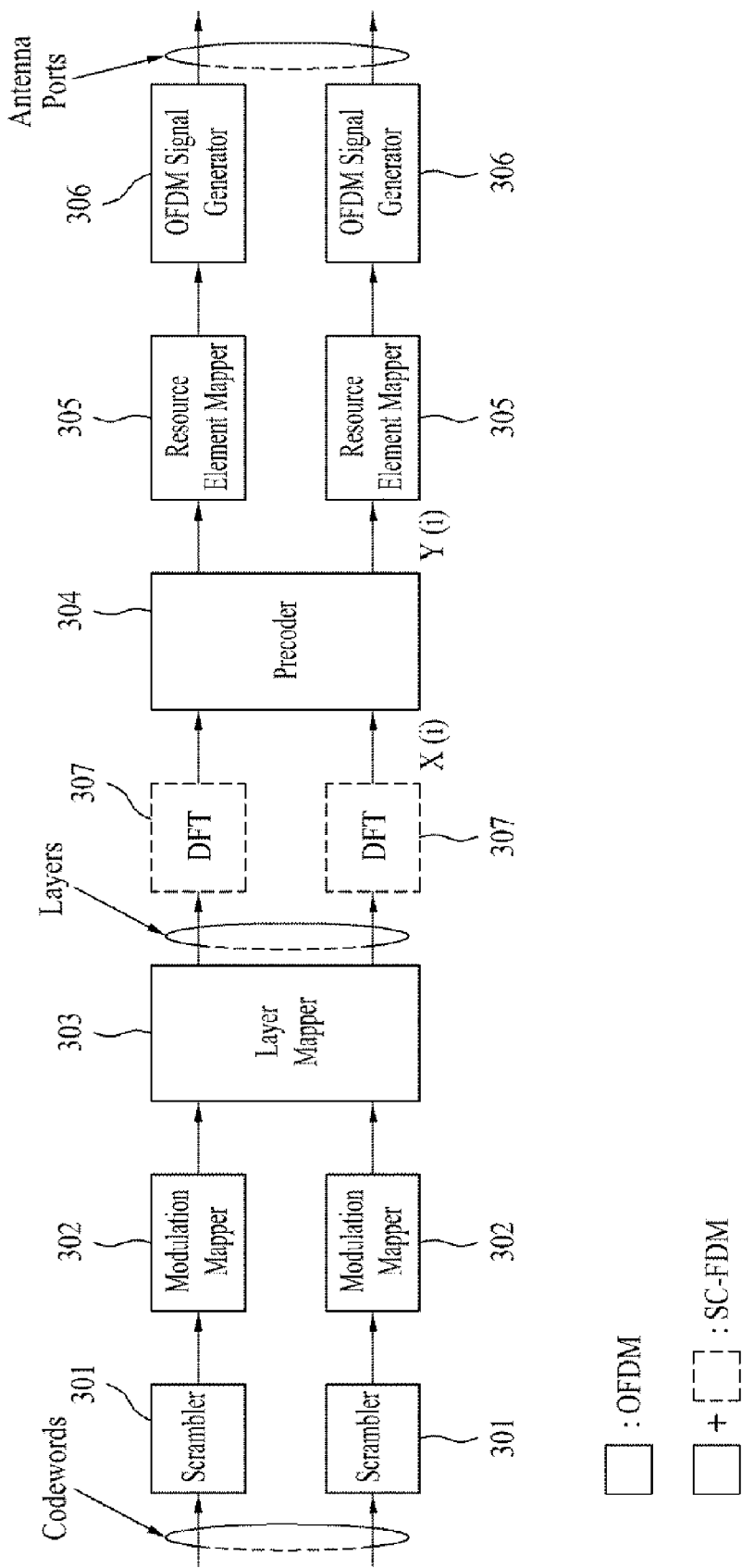
FIG. 2 is a block diagram of an exemplary transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the transmitters 100a and 100b include scramblers 301, modulation mappers 302, a layer mapper 303, a precoder 304, RE mappers 305, Orthogonal Frequency Division Multiplexing (OFDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-N, in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t*M_t$ precoding matrix W and output the resulting product in the form of an $N_t*M_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-N, to a receiver after digital-to-analog conversion, frequency upconversion, etc. The OFDM signal generators 306 may include an IFFT module, a CP inserter, a Digital-to-Analog Converter (DAC), a frequency upconverter, etc.

On the other hand, if the transmitter 100a or 100b applies the SC-FDMA scheme to codeword transmission, the transmitter 100a or 100b may include a Discrete Fourier Transform (DFT) module 307 (or Fast Fourier Transform (FFT) module). The DFT module 307 performs DFT or FFT (hereinafter referred to as DFT/FFT) on the antenna specific symbol, and outputs the DFT/FFT symbol to the resource element mapper 305. In this case, Single Carrier FDMA (SC-FDMA), and a Peak-to-Average Power Ratio (PAPR) or Cubic Metric (CM) of a transmission signal may be reduced and transmitted. In accordance with the SC-FDMA, the transmission signal may be transmitted without overlapping with a non-linear distortion section of a power amplifier. Therefore, although the transmitter transmits signals at a power level lower than that of the conventional OFDM scheme, the receiver is able to receive signals that satisfy a predetermined strength or an error rate. That is, according to the SC-FDMA, power consumption of the transmitter can be reduced.

The conventional OFDM signal generator has a disadvantage in that signals of individual subcarriers are MCM (Multi Carrier modulation)-processed and simultaneously transmitted in parallel while passing through the IFFT, resulting in reduction in efficiency of the power amplifier. In contrast, the SC-FDMA may first perform DFT/FFT of information before mapping signals to subcarriers. PAPRs of the output signals of the DFT/FFT module 307 are increased due to the DFT/FFT effect. The DFT/FFT signals are mapped to subcarriers by the resource element mapper 305, are IFFT-processed, and are then converted into a time-domain signal. That is, the SC-FDMA transmitter may further perform the DFT or FFT operation before performing the OFDM signal generator processing, such that PAPR is increased at an IFFT input terminal such that a PAPR of the final transmission signal is reduced through the IFFT. The above-mentioned format is identical to a DFT module (or FFT module) 307 added to the front of the conventional OFDM signal generator, such that SC-FDMA may be called DFT-spreaded OFDM (DFT-s-OFDM).

Figure 3:
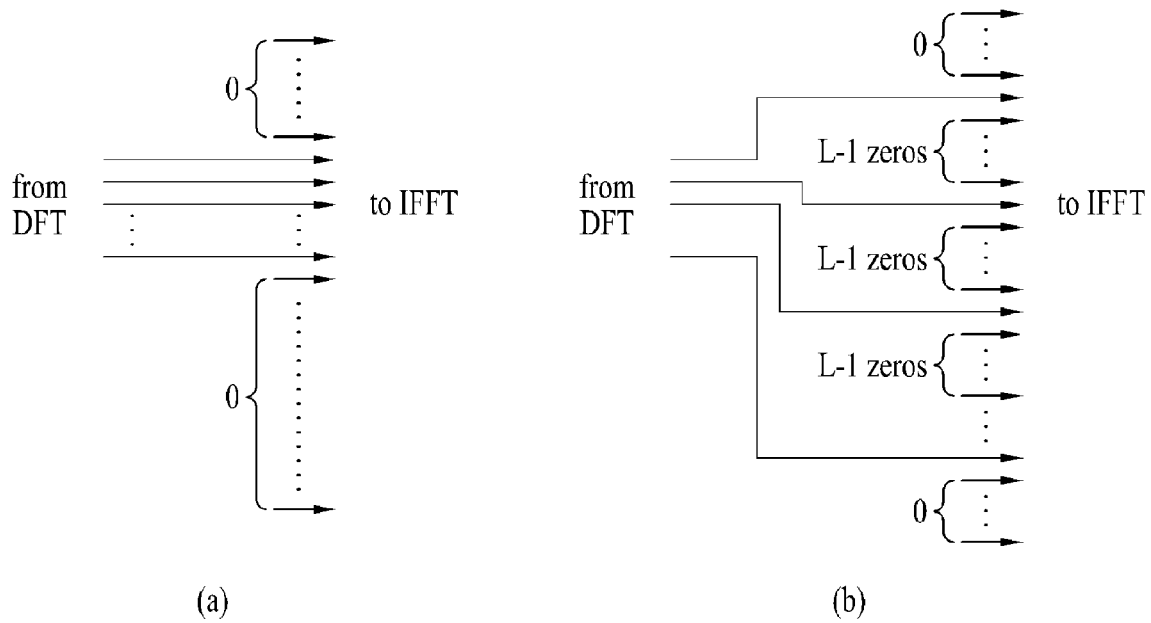
FIG. 3 shows examples for satisfying single carrier characteristics and mapping an input symbol to a subcarrier in a frequency domain.

The SC-FDMA must satisfy single carrier characteristics. FIG. 3 shows examples for satisfying single carrier characteristics and mapping an input symbol to a subcarrier in a frequency domain. In FIG. 3(a) or 3(b), if a DFT-processed symbol is assigned to a subcarrier, a transmission signal satisfying single carrier characteristics can be obtained. FIG. 3(a) shows a localized mapping method, and FIG. 3(b) shows a distributed mapping method.

Figure 4:
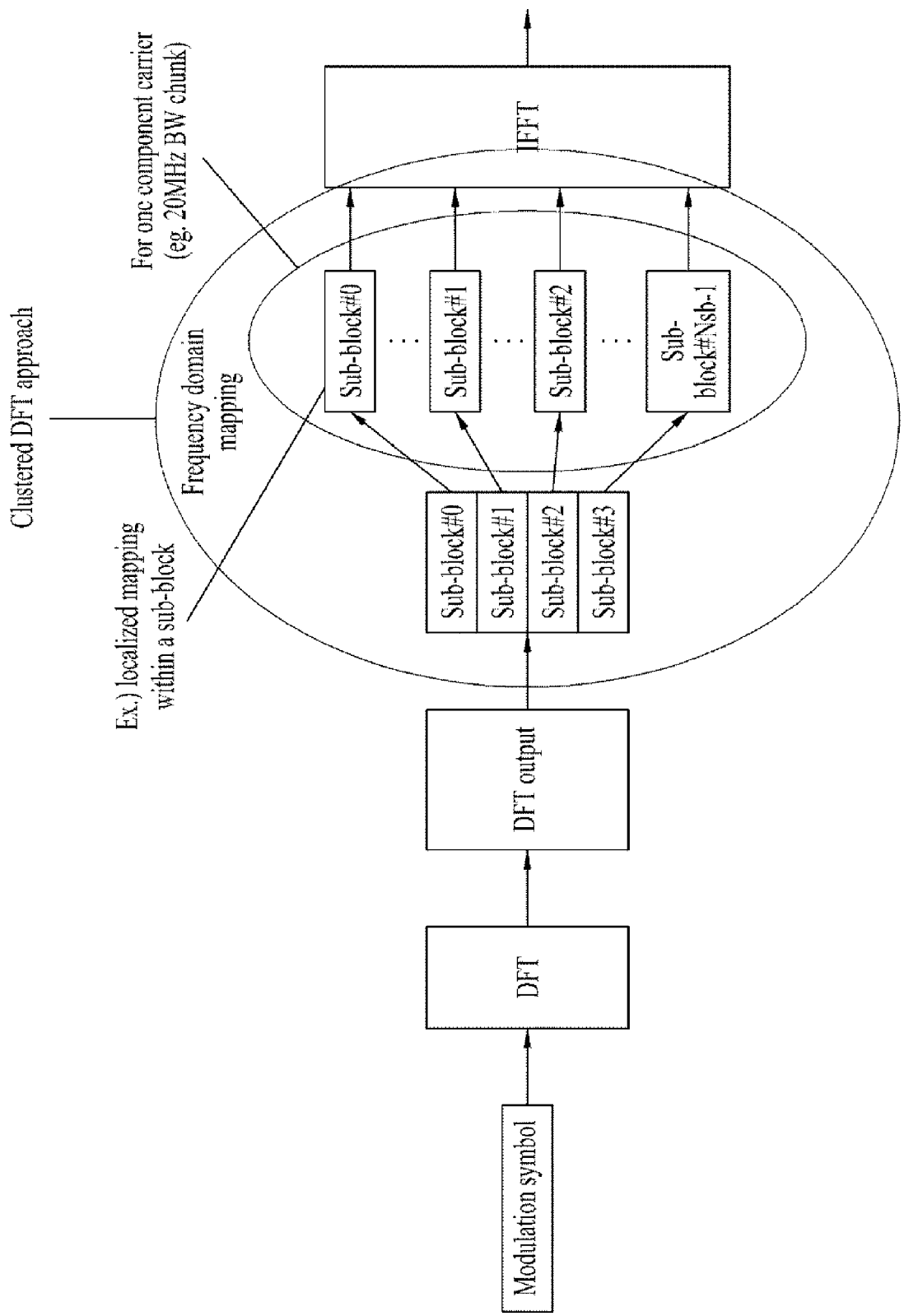
FIG. 4 shows the signal processing in which DFT-process output samples are mapped to one carrier in the clustered SC-FDMA.
Figure 5:
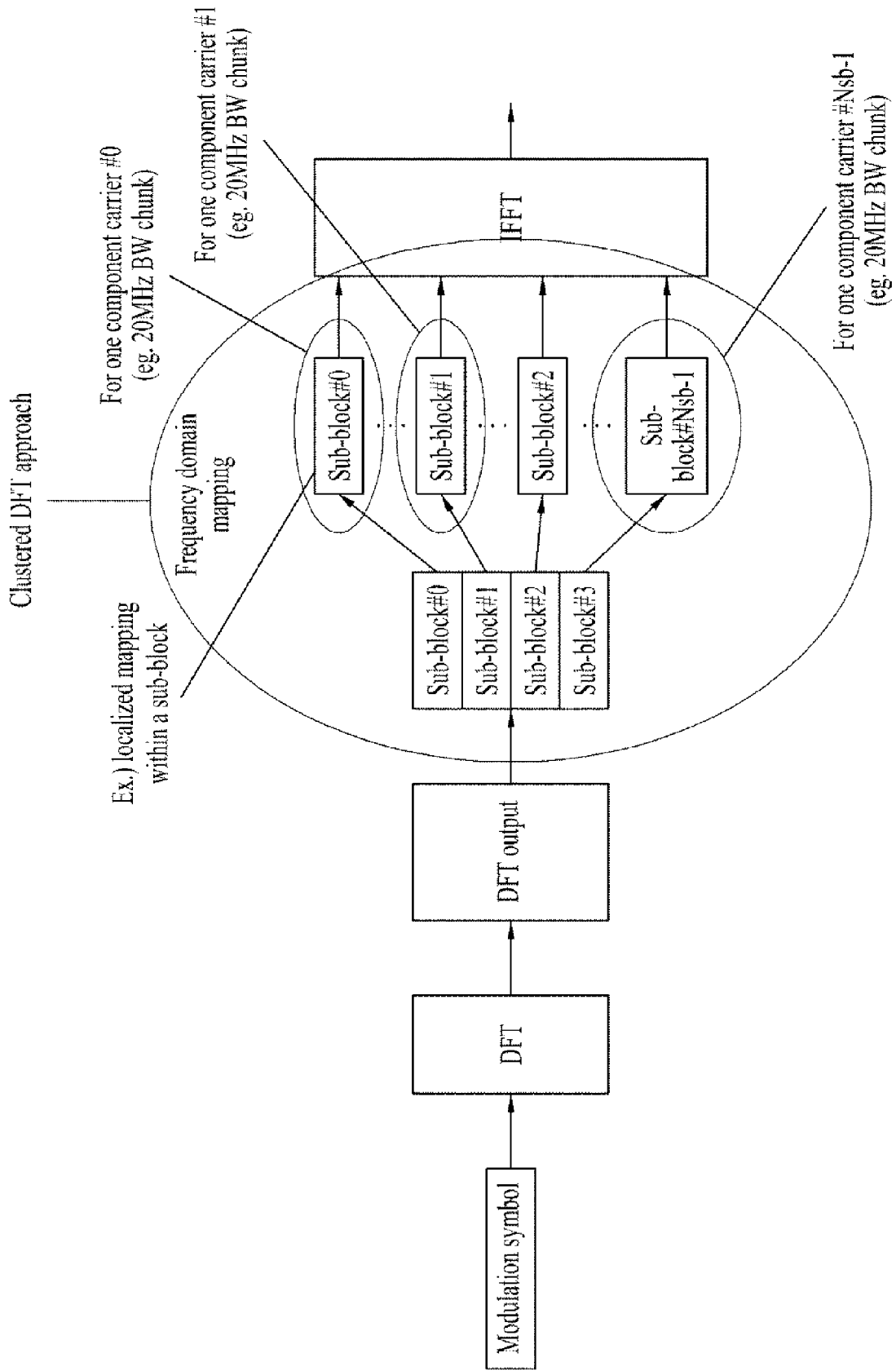
FIGS. 5 and 6 show the signal processing in which DFT process output samples are mapped to multicarriers in a clustered SC-FDMA.
Figure 6:
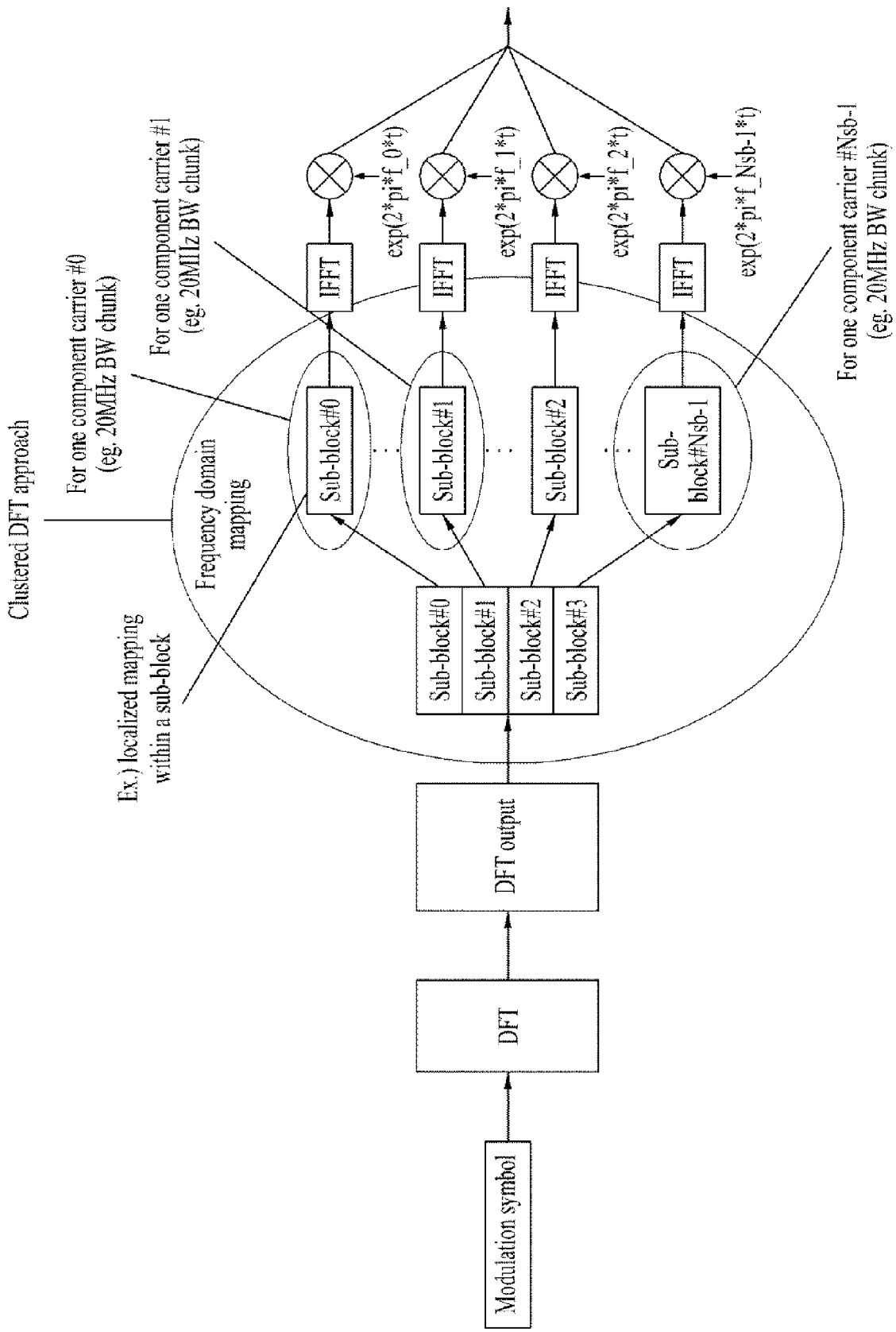

On the other hand, the clustered DFT-s-OFDM scheme may be adapted to the transmitter 100a or 100b. The clustered DFT-s-OFDM is considered to be a modification of the conventional SC-FDMA scheme. In more detail, a signal output from the DFT/FFT module 307 and the precoder 304 is divided into some sub-blocks, and the divided sub-blocks are discontinuously mapped to subcarriers. FIGS. 4 to 6 show examples for mapping an input symbol to a single carrier by a clustered DFT-s-OFDM. FIG. 4 shows the signal processing in which DFT-process output samples are mapped to one carrier in the clustered SC-FDMA. FIGS. 5 and 6 show the signal processing in which DFT process output samples are mapped to multicarriers in a clustered SC-FDMA.

FIG. 4 shows the example of intra-carrier cluster SC-FDMA application. FIGS. 5 and 6 show examples of the inter-carrier cluster SC-FDMA application. FIG. 5 shows the example in which a signal is created through a single IFFT block under the condition that component carriers are contiguously allocated to a frequency domain and the subcarrier spacing between contiguous component carriers is arranged. FIG. 6 shows another example in which a signal is created through several IFFT blocks under the condition that component carriers are non-contiguously allocated to a frequency domain.

Figure 7:
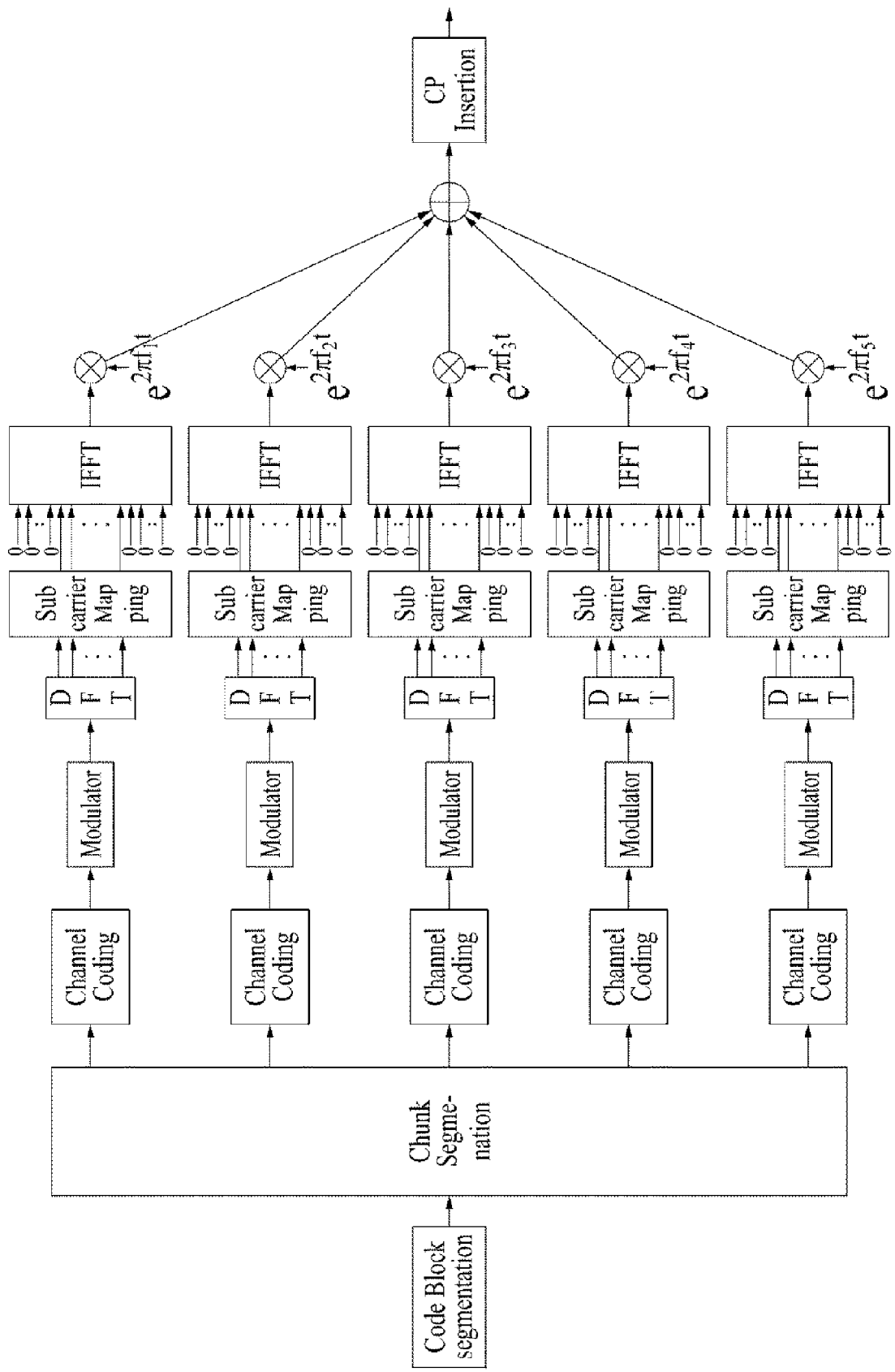
FIG. 7 shows the signal processing of a segmented SC-FDMA.

FIG. 7 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by NxSC-FDMA or NxDFTs-OFDMA. For convenience of description and better understanding of the present invention, the segmented SC-FDMA, NxSC-FDMA and NxDFT-s-OFDMA may be generically as 'segment SC-FDMA'. Referring to FIG. 7, in order to reduce the single carrier characteristic condition, the segment SC-FDMA groups all the time domain modulation symbols into N groups, such that a DFT process is performed in units of a group.

Referring to FIG. 2, the receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is down-converted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

On the other hand, in the case where the receiver 300a or 300b receives signals according to the SC-FDMA scheme illustrated in FIGS. 3 to 7, the receiver 300a or 300b may further include an Inverse Discrete Fourier Transform (IDFT) module (also called an IFFT module). The IDFT/IFFT module performs IDFT/IFFT on an antenna-specific symbol recovered by the resource element mapper, and thus outputs the IDFT/IFFT symbol to the multiplexer.

While it has been described in FIGS. 1 to 7 that each of the transmitters 100a and 100b includes the scramblers 301, the modulation mappers 302, the layer mapper 303, the precoder 304, the RE mappers 305, and the OFDM signal generators 306, it may be further contemplated that the scramblers 301, the modulation mappers 302, the layer mapper 303, the precoder 304, the RE mappers 305, and the OFDM signal generators 306 are incorporated into each of the processors 400a and 400b of the transmitters 100a and 100b. Likewise, while it has been described in FIGS. 1 to 7 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For convenience of description and better understanding of the present invention, it is assumed that the scrambler 301, the modulation mapper 302, the layer mapper 303, the precoder 304, the resource element (RE) mapper 305, and the OFDM signal generator 306 (in case of the SC-FDMA scheme, the DFT module 307 may be further included) are included in the transmitter 100a or 100b separated from the processor 400a or 400b configured to control the operations of the above-mentioned constituent elements 302 to 306. In addition, it is assumed that a signal recoverer, a multiplexer, and a channel demodulator may be included in the receiver 300a or 300b separated from the processor 400a or 400b configured to control the operations of the signal recoverer, the multiplexer and the channel demodulator. However, in the case where the scrambler 301, the demodulation mapper 302, the layer mapper 303, the precoder 304, the RE mapper 305, and the OFDM signal generators 306 and 307 are contained in the processor 400a or 400b, and even in the case where the signal recoverer, the multiplexer, and the channel demodulator (in case of the SC-FDMA scheme, the IFFT module may be further included) are contained in the processor 400a or 400b, the embodiments of the present invention may also be applied.

Figure 8:
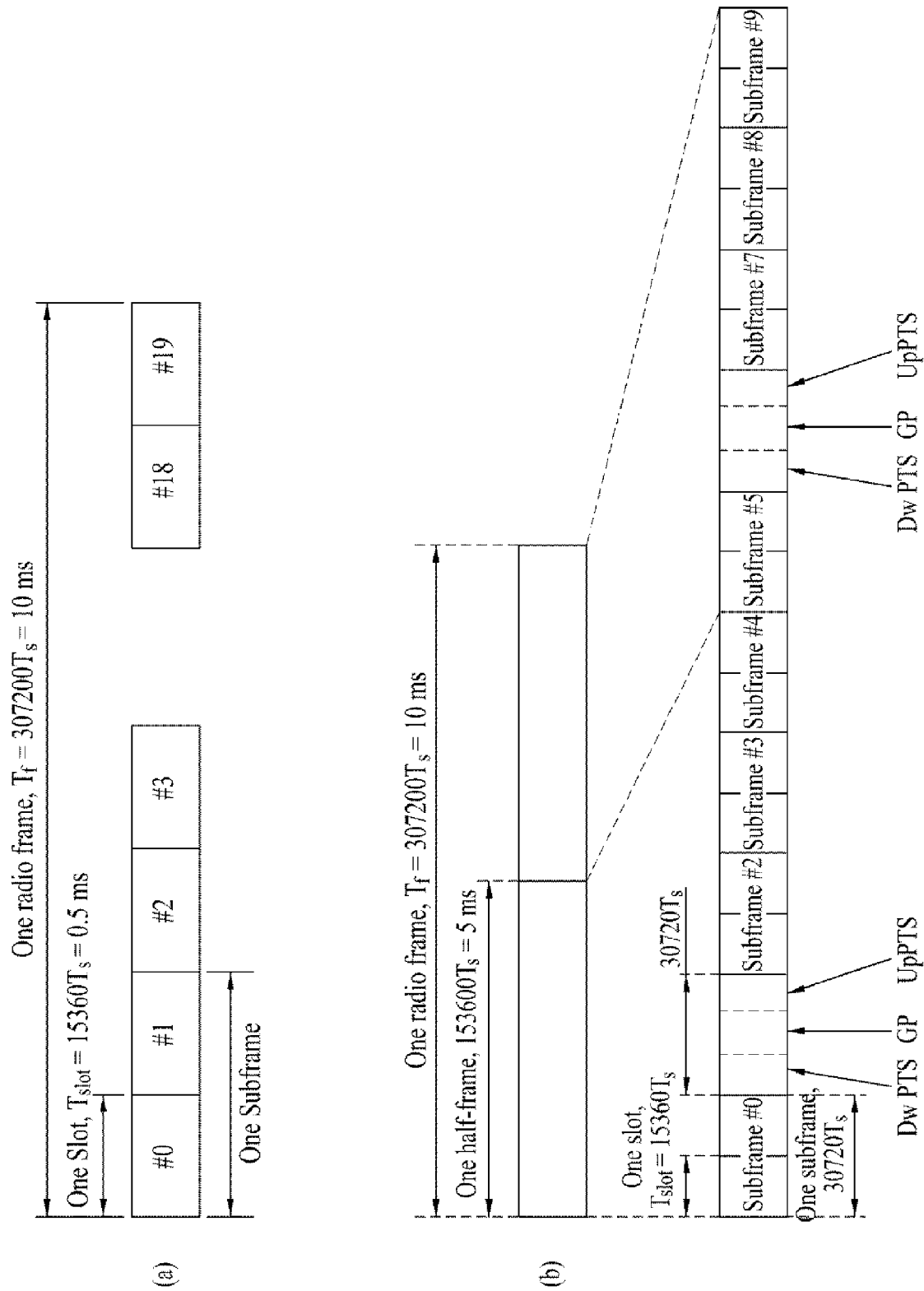
FIG. 8 shows examples of a radio frame structure used in a wireless communication system.

FIG. 8 illustrates an exemplary structure of a radio frame in a wireless communication system. Particularly, FIG. 8(a) illustrates a radio frame according to a Frame Structure type 1 (FS-1) of a 3GPP LTE/LTE-A system, and FIG. 8(b) illustrates a radio frame according to a Frame Structure type 2 (FS-2) of the 3GPP LTE/LTE-A system. The frame structure of FIG. 8(a) may be applied to a Frequency Division Duplexing (FDD) mode and a half-FDD (H-FDD) mode. The frame structure of FIG. 8(b) may be applied to a Time Division Duplexing (TDD) mode.

Referring to FIG. 8, a 3GPP LTE/LTE-A radio frame is 10 ms (307,200$T_s$) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. Each subframe is further divided into two slots, each of 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may be differently constructed according to a duplex mode. For example, in the FDD mode, DL transmission and UL transmission are discriminated according to a frequency, such that the radio frame includes only one of a DL subframe and a UL subframe in a time domain.

On the other hand, in the TDD mode, DL transmission and UL transmission are discriminated according to time, such that subframes contained in a frame may be classified into DL subframes and UL subframes. Table 1 shows an exemplary UL-DL construction in a TDD mode.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, D is a DL subframe, U is a UL subframe, and S is a special subframe. The special subframe denoted by S may include three fields, i.e., Downlink Pilot TimeSlot (DwPTS), Guard Period (GP), and Uplink Pilot TimeSlot (UpPTS). DwPTS is a time period reserved for DL transmission, and UpPTS is a time period reserved for UL transmission.

Figure 9:
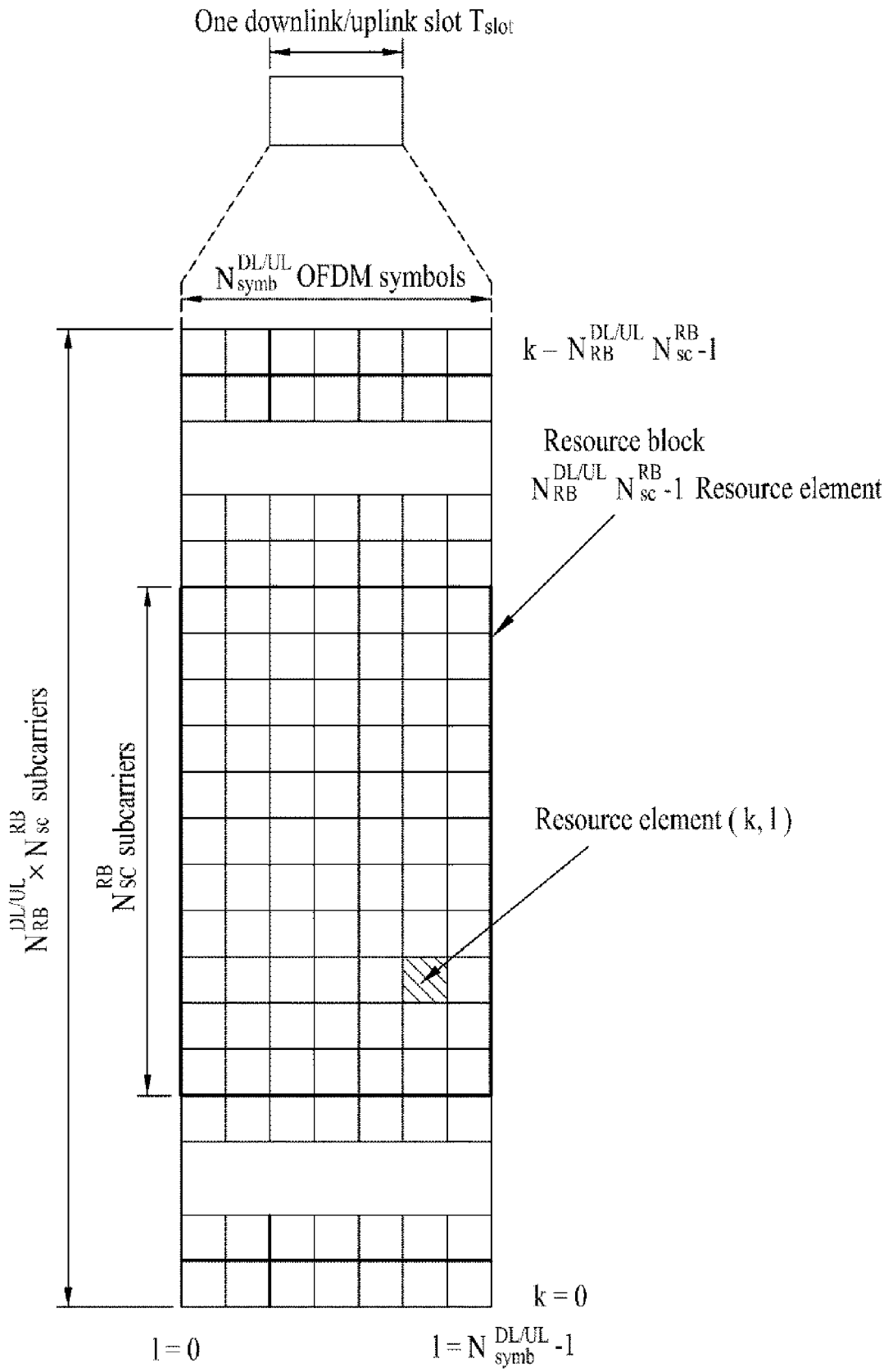
FIG. 9 shows an example of a DL/UL slot structure for use in a wireless communication system.

FIG. 9 illustrates an exemplary structure of a DownLink/UpLink (DL/UL) slot in the wireless communication system. Specifically, FIG. 9 illustrates the structure of a resource grid in the 3GPP LTE/LTE-A system. There is one resource grid per antenna port.

Referring to FIG. 9, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 9 as having a slot with 7 OFDM symbols for illustrative purposes, embodiments of the present invention are also applicable to subframes with any other number of OFDM symbols. Each element in the resource grid for an antenna port is called Resource Element (RE). Each RE is formed by one OFDM symbol by one subcarrier. An RE is also referred to as a tone.

Referring to FIG. 9, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ is dependent upon a DL transmission bandwidth, and $N^{UL}_{RB}$ is dependent upon a UL transmission bandwidth. Each OFDM symbol includes $N^{DL/UL}_{RB}N^{RB}_{sc}$ subcarriers in a frequency domain. The number of subcarriers mapped to one carrier is determined according to the FFT size. The subcarriers may be classified into a data subcarrier for data transmission, a reference signal (RS) subcarrier for RS transmission, and a null subcarrier for a guard band and DC component. The null subcarrier for the DC component is an unused subcarrier, and is mapped to a carrier frequency (f_0) in an OFDM signal generation process. The carrier frequency may also be called a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb}N^{RB}_{sc}$ REs.

Each RE in the resource grid per each antenna port may be uniquely identified by an index pair (k, 1) in a slot. k is a frequency-domain index ranging from 0 to $N^{DL/UL}_{RB}N^{RB}_{sc}-1$ and 1 is a time-domain index ranging from 0 to $N^{DL/UL}_{symb}-1$.

Figure 10:
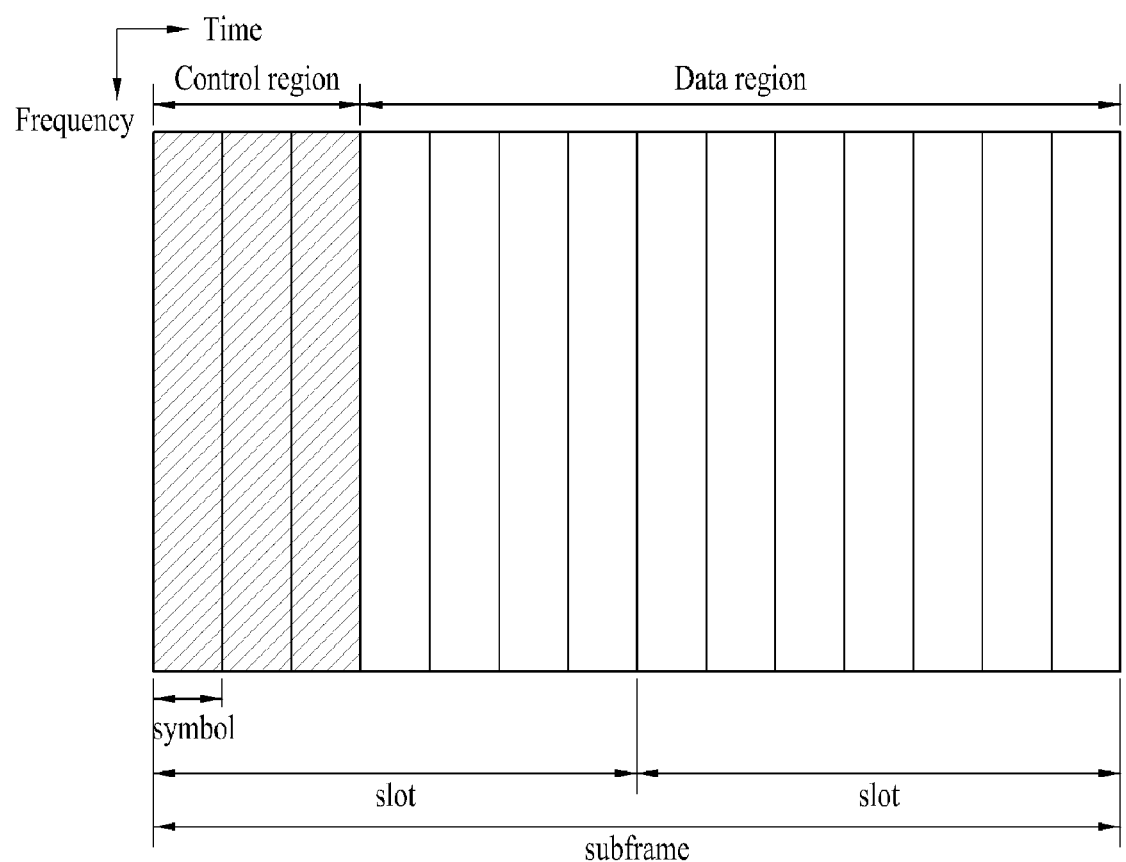
FIG. 10 shows an example of a DL subframe structure for use in a wireless communication system.

FIG. 10 illustrates an exemplary structure of a DL subframe in the wireless communication system.

Referring to FIG. 10, each subframe may be divided into a control region and a data region. The control region includes one or more OFDM symbols, starting from the first OFDM symbol. The number of OFDM symbols used for the control region of a subframe may be set independently on a subframe basis and signaled on a PCFICH (Physical Control Format Indicator CHannel). A BS may transmit control information to a UE or UEs in the control region. To transmit control information, a PDCCH (Physical Downlink Control CHannel), a PCFICH, a PHICH (Physical Hybrid automatic retransmit request Indicator CHannel), etc. may be allocated to the control region.

The BS may transmit information related to resource allocation of a PCH (Paging channel) and DL-SCH (Downlink-shared channel), an uplink scheduling grant, HARQ information, Downlink Assignment Index (DAI), Transmitter Power Control (TPC) command, etc. to each UE or each UE group on a PDCCH.

The BS may transmit data to a UE or UE group in the data region. Data transmitted in the data region is referred to as user data. A PDSCH (Physical Downlink Shared CHannel) may be allocated to the data region to convey data. PCH (Paging channel) and DL-SCH (Downlink-shared channel) may be transmitted on a PDSCH. A UE may decode control information received on a PDCCH and thus read data received on a PDSCH based on the decoded control information. For example, the PDCCH carries information indicating a UE or UE group to which the data of the PDSCH is destined and information indicating how the UE or UE group should receive and decode the PDSCH data. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

Multiple PDCCHs may be transmitted in a control region. The UE monitors the multiple PDCCHs so as to detect its own PDCCH. The DCI carried by one PDCCH has different sizes and usages according to a PUCCH format. If necessary, the DCI size may also be changed according to a coding rate.

The DCI format may be independently applied to each UE. PDCCHs of multiple UEs may be multiplexed in one subframe. PDCCH of each UE may be independently channel-coded such that a CRC (Cyclic Redundancy Check) may be added to the PDCCH. The CRC is masked as a unique ID for each UE in such a manner that each UE can receive its own PDCCH. However, the UE does not know where its own PDCCH is transmitted, such that the UE performs blind detection (also called blind decoding) of all PDCCHs of the corresponding DCI format for each subframe until one PDCCH having a UE ID is received or detected.

Figure 11:
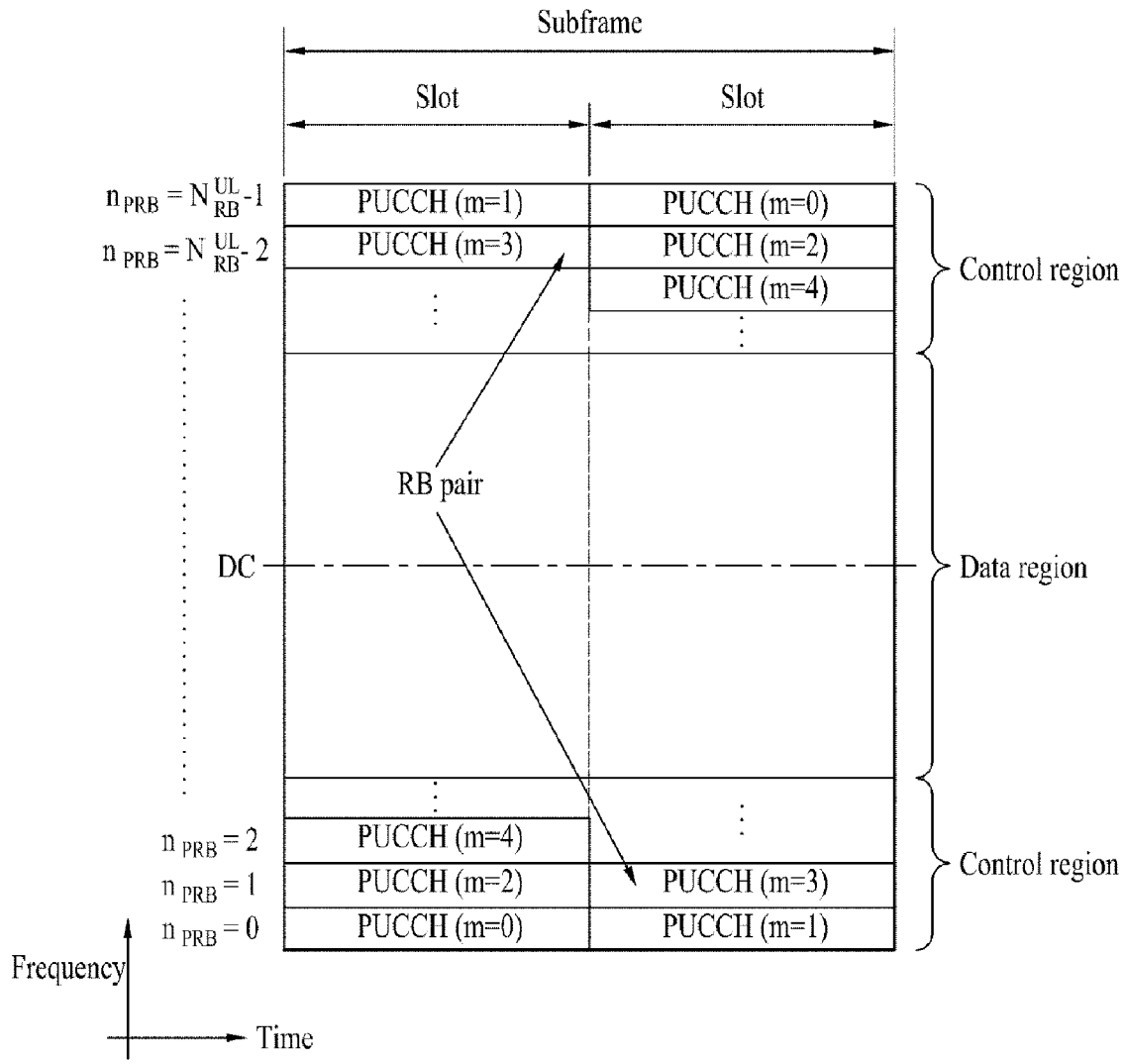
FIG. 11 shows an example of a UL subframe structure for use in a wireless communication system.

FIG. 11 illustrates an exemplary structure of a UL subframe in the wireless communication system.

Referring to FIG. 11, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. In case that a UE adopts the SC-FDMA scheme for UL transmission, the LTE Release 9 or Release 8/9 system does not allow the UE to simultaneously transmit PUCCH and PUSCH, in order to maintain single carrier characteristics. The LTE-A Release 10 may indicate whether simultaneous transmission of PUCCH and PUSCH is supported through higher layer signaling.

The UCI carried by one PUCCH has different sizes and usages according to the PUCCH format, and the UCI size may be changed according to the coding rate. For example, the PUCCH format may be defined as follows.

TABLE 2

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |

TABLE 2-continued

| PUCCH format | Modulation scheme | Number of bits per subframe | Usage | Etc. |
|---|---|---|---|---|
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

1-bit or 2-bit transmission bits may be modulated into complex modulation symbols shown in Table 3, such that the resultant modulation symbols can be transmitted on one PUCCH resource.

TABLE 3

| Modulation | Binary bits | Modulation symbol |
|---|---|---|
| BPSK | 0 | 1 |
| | 1 | −1 |
| QPSK | 00 | 1 |
| | 01 | −j |
| | 10 | j |
| | 11 | −1 |

In a UL subframe, subcarriers distant from a DC (Direct Current) subcarrier may be used as a control region. In other words, subcarriers located at both ends of a UL transmission bandwidth are assigned to UL control information transmission. DC subcarriers are reserved without being used in signal transmission, and are mapped to a carrier frequency ($f_0$) in a frequency upconversion process caused by the OFDM/SC-FDM signal generator 306.

A PUCCH for a UE is allocated to an RB pair in a subframe. The RBs of the RB pair occupy different subcarriers in two slots. This is called frequency hopping of an RB pair allocated to a PUCCH over a slot boundary. However, if the frequency hopping is not used, an RB pair occupies the same subcarriers. Irrespective of the frequency hopping, PUCCHs for one UE are assigned to an RB pair contained in one subframe. Therefore, each PUCCH is transmitted through one RB in each slot contained in one UL subframe that the same PUCCH is transmitted two times in one UL subframe.

Hereinafter, an RB pair used for each PUCCH transmission in one subframe is called a PUCCH region or PUCCH resource. For convenience of description, a PUCCH carrying ACK/NACK from among PUCCHs is called 'ACK/NACK PUCCH', a PUCCH carrying CQI/PMI/RI is called a Channel State Information (CSI) PUCCH, and a PUCCH carrying the SR is called an SR PUCCH.

The UE receives PUCCH resources for UCI transmission from the BS according to higher layer signaling or explicit or implicit scheme.

Uplink Control Information (UCI) such as ACK/NACK (ACKnowlegement/negative ACK), Channel Quality Indicator (CQI), Precoding Matrix Indicator (PMI), Rank Information (RI), Scheduling Request (SR), etc. may be transmitted in a control region of the UL subframe.

In a wireless communication system, the BS and the UE mutually transmit/receive data. If BS/UE transmits data to UE/BS, the UE/BS decodes the received data. If the data is successfully decoded, the UE/BS transmits ACK to the BS/UE. If the data decoding fails, the UE/BS transmits NACK to the BS/UE. Basically, in the 3GPP LTE system, the UE receives a data unit (e.g., PDSCH) from the BS, and transmits ACK/NACK for each data unit to the BS through implicit PUCCH resources decided by PDCCH resources carrying scheduling information of the data unit.

Figure 12:
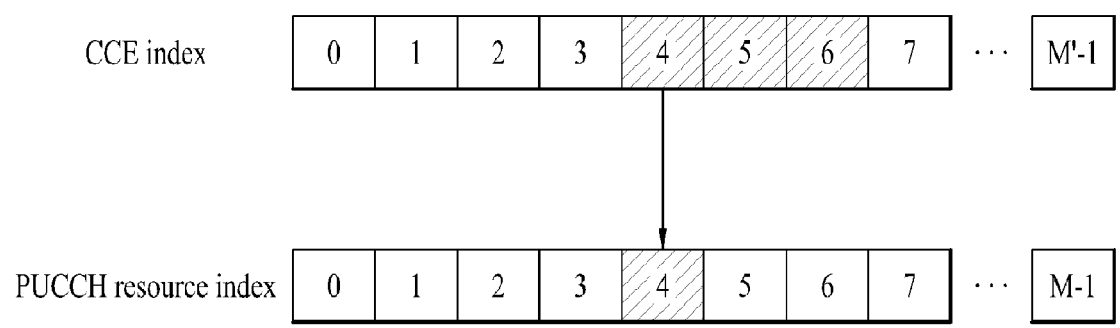
FIG. 12 shows an example for deciding PUCCH resources for ACK/NACK.

FIG. 12 shows an example for deciding PUCCH resources for ACK/NACK.

In the LTE system, PUCCH resources for the ACK/NACK are not pre-allocated to each UE, and several UEs located in the cell are configured to divisionally use several PUCCH resources at every time point. In more detail, PUCCH resources used for ACK/NACK transmission of a UE are implicitly determined on the basis of a PDCCH that carries scheduling information of a PDSCH carrying the corresponding DL data. The entire region through which a PDCCH is transmitted in each DL subframe is comprised of a plurality of Control Channel Elements (CCEs), and a PDCCH transmitted to the UE is comprised of one or more CCEs. Each CCE includes a plurality of Resource Element Groups (REGs) (e.g., 9 REGs). One REG may include neighbor or contiguous REs under the condition that a reference signal (RS) is excluded. The UE may transmit ACK/NACK through implicit PUCCH resources that are derived or calculated by a function of a specific CCE index (e.g., first or lowest CCE index) from among CCEs constructing a PDCCH received by the UE.

Referring to FIG. 12, each PUCCH resource index may correspond to a PUCCH resource for ACK/NACK. As can be seen from FIG. 12, if it is assumed that PDSCH scheduling information is transmitted to the UE through a PDCCH composed of 4-6-indexed CCEs (i.e., NOs. 4, 5, 6 CCEs), the UE transmits ACK/NACK to the BS through the 4-indexed PUCCH corresponding to a CCE having the lowest index (i.e., No. CCE 4) constructing the PDCCH. FIG. 12 shows the example in which a maximum of M' CCEs is present in a DL and a maximum of M PUCCHs is present in a UL. Although M' may be identical to M (M'=M), M' may be different from M as necessary, and CCE resource mapping may overlap with PUCCH resource mapping as necessary.

For example, PUCCH resource index may be obtained from the CCE index as shown in the following Math Figure 1.

MathFigure 1

$$n_{PUCCH}^{(1)} = n_{CCE} + N_{PUCCH}^{(1)} \quad \text{[Math.1]}$$

In Math Figure 1, $n_{PUCCH}^{(1)}$ is a PUCCH resource index for PUCCH format 1/1a/1b, $N_{PUCCH}^{(1)}$ is a signaling value received from a higher layer, and $n_{CCE}$ may be the smallest value from among CCE indexes used for PDCCH transmission.

Figure 13:
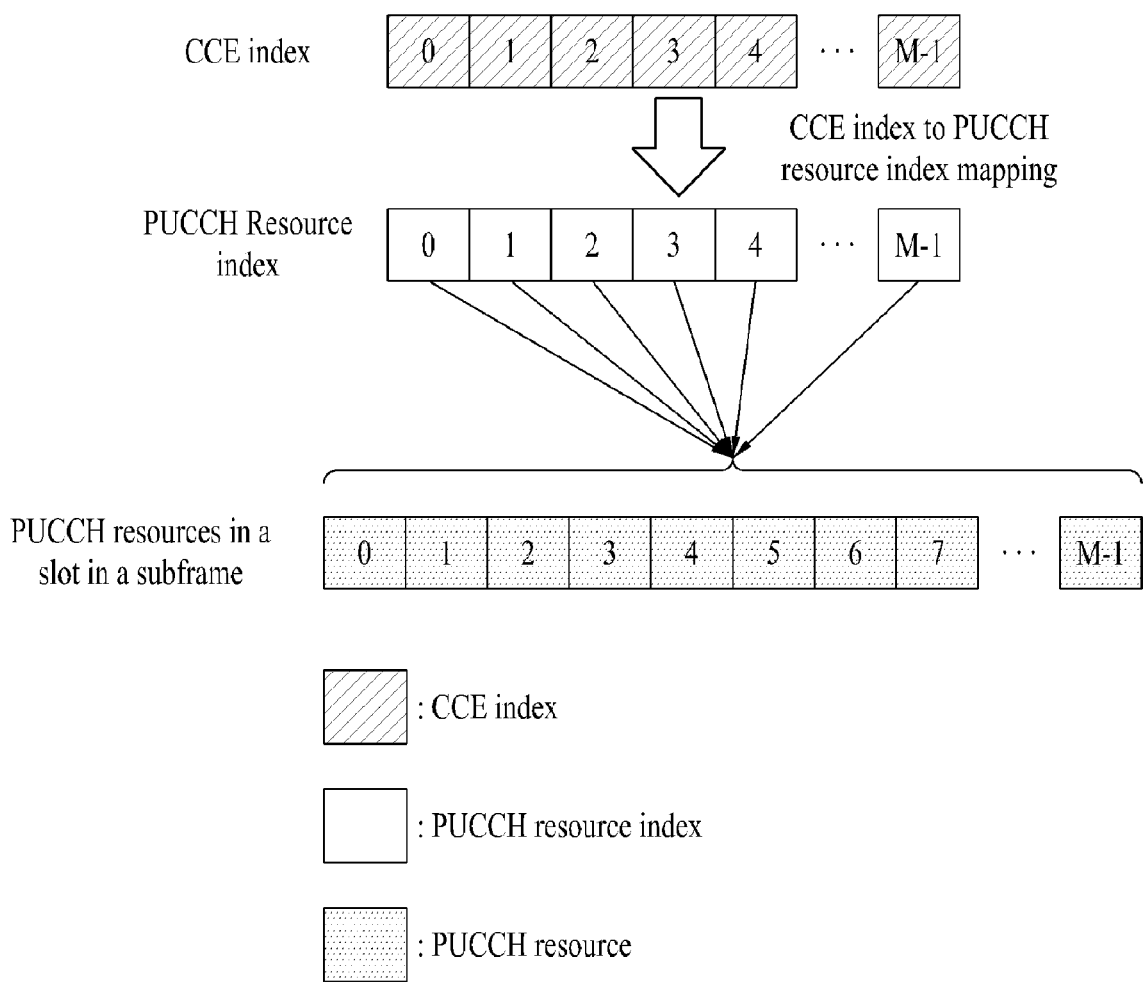
FIG. 13 shows the exemplary mapping of PUCCH resource indexes to PUCCH resources.

FIG. 13 shows the exemplary mapping of PUCCH resource indexes to PUCCH resources.

In the LTE system, provided that a maximum of M' CCEs is present in a DL subframe, a maximum of M PUCCH resource indexes may be defined. Each PUCCH resource index may be implicitly linked to each CCE index. The UE may receive a PDCCH for PDSCH scheduling or SPS release, may derive PUCCH resources using the number (i.e., index) of lowest CCEs from among CCEs constructing the PDCCH, and may transmit UCI such as ACK/NACK using the derived PUCCH resources according to a PUCCH format. In this case, PUCCH resources may represent an orthogonal code (or orthogonal sequence) index used in a specific PUCCH format or a cyclic shift associated with the orthogonal code, and may also represent a physical resource block used when a PUCCH format is mapped to physical resources in a specific slot. In other words, the orthogonal code index used in a specific PUCCH format or a cyclic shift associated with the orthogonal code, and a physical resource block obtained when a PUCCH format is mapped to physical resources in a specific slot may be implicitly derived from the lowest CCE number (index) from among numbers (indexes) of CCEs constructing the PDCCH.

A physical resource variable 'm' used for mapping the PUCCH resource index to PUCCH physical resources may be predetermined or be signaled from the BS. For example, the physical resource variable 'm' may be implicitly linked to a CCE index (e.g., the lowest CCE index) of a CCE constructing a PDCCH. In addition, the physical resource variable 'm' may be explicitly designated through PDCCH or RRC signaling. In addition, the physical resource variable 'm' may be derived from the designated value through PDCCH or RRC signaling. The physical resource variable 'm' may be independently given in units of a subframe, in units of a slot, or in units of several SC-FDMA symbols. Preferably, the physical resource variable 'm' may be changed in units of a subframe, in units of a slot, or in units of several SC-FDMA symbols. That is, the physical resource variable 'm' may be hopped in units of a predetermined time interval.

For example, in association with PUCCH format 1/1a/1b, PUCCH format 2/2a/2b, and PUCCH format 3, the physical resource variable 'm' may be defined as Math Figures 2 to 4, respectively. Math Figure 2 may represent a physical resource variable 'm' for the PUCCH format 1/1a/1b, Math Figure 4 may represent a physical resource variable 'm' for the PUCCH format 2/2a/2b, and Math Figure 4 may represent a physical resource variable 'm' for the PUCCH format 3.

MathFigure 2

$$m = \begin{cases} N_{RB}^{(2)} & \text{if } n_{PUCCH}^{(1)} < c \cdot N_{cs}^{(1)}/\Delta_{shift}^{PUCCH} \\ \left\lfloor \frac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \frac{N_c^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$
[Math. 2]

MathFigure 3

$$m = \lfloor n_{PUCCH}^{(2)}/N_{sc}^{RB} \rfloor$$
[Math. 3]

MathFigure 4

$$m = \lfloor n_{PUCCH}^{(3)}/N_{SF,0}^{PUCCH} \rfloor$$
[Math. 4]

In Math Figure 2, $N^{(2)}_{RB}$ is a bandwidth available to the PUCCH format 2/2a/2b, and is represented by an integer multiple of $N^{RB}_{sc}$. $n^{(1)}_{PUCCH}$ is a PUCCH resource index for the PUCCH format 1/1a/1b. In more detail, in case of the ACK/NACK PUCCH, as can be seen from Math Figure 1, $n^{(1)}_{PUCCH}$ may be derived from the lowest CCE index of a PDCCH carrying scheduling information of the corresponding PDSCH or an SPS release PDCCH. In order to answer a PDSCH having no correspondent PDCCH, a PUCCH resource index may be indicated through higher layer signaling. $N^{(1)}_{cs}$ may represent the number of cyclic shifts that are used not only in a combination of PUCCH formats 1/1a/1b and 2/2a/2b but also in the PUCCH format 1/1a/1b in one resource block. In Math Figure 3, $n^{(2)}_{PUCCH}$ is a PUCCH resource index for the PUCCH format 2/2a/2b, and is transmitted from the BS to the UE through higher layer signaling. In Math Figure 4, $n^{(3)}_{PUCCH}$ is a PUCCH resource index for the PUCCH format 3, and may be derived from the first CCE index of the corresponding PDCCH or be transmitted from the BS to the UE through higher layer signaling. $N^{PUCCH}_{SF,0}$ is the length of an orthogonal sequence applied to Slot 0, i.e., the first slot of a subframe.

By PUCCH resource indexes $n^{(1)}_{PUCCH}$, $n^{(2)}_{PUCCH}$, and $n^{(3)}_{PUCCH}$, PUCCH resources used in transmission of PUCCH format 1/1a/1b, PUCCH format 2/2a/2b, and PUCCH format 3 can be identified. That is, an orthogonal sequence index value, a cyclic shift value, and a physical resource index $n_{PRB}$, etc. applied to each PUCCH may be determined according to PUCCH resource indexes $n^{(1)}_{PUCCH}$, $n^{(2)}_{PUCCH}$, and $n^{(3)}_{PUCCH}$.

For example, the UE may determine a physical resource variable 'm' according to any one of Math Figures 2 to 4 using PUCCH resource indexes, and may map one PUCCH resource index to one physical resource block (PRB) acting as actual PUCCH resources using the physical resource variable 'm'.

In Slot $n_s$, a physical resource block (PRB) used for PUCCH transmission is given as follows.

MathFigure 5

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases}$$
[Math. 5]

In Math Figure 5, $N^{UL}_{RB}$ is the number of RBs used in an uplink slot.

Figure 14:
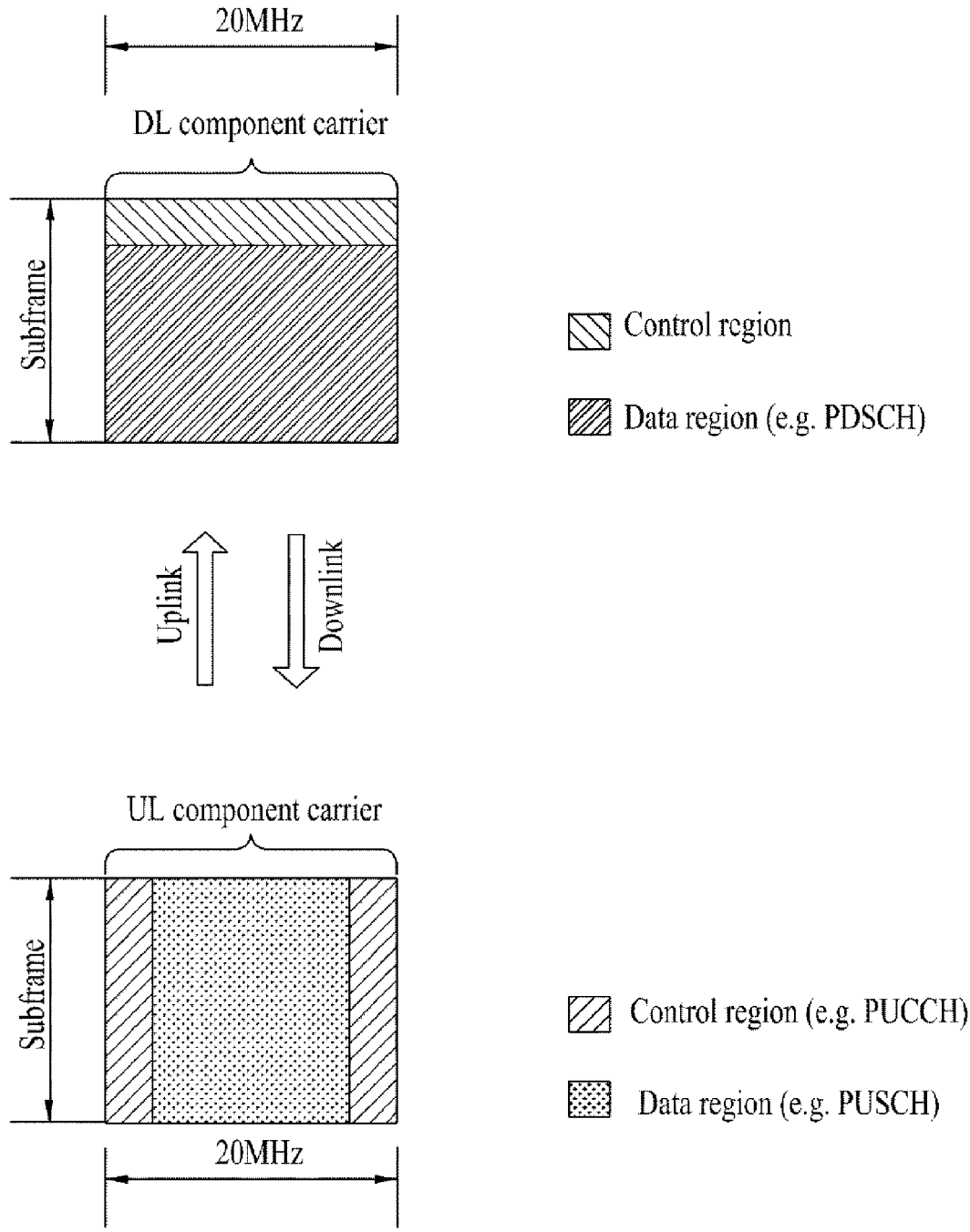
FIG. 14 shows exemplary communication under a single carrier situation.

FIG. 14 shows exemplary communication under a single carrier situation. The communication example shown in FIG. 14 may correspond to exemplary communication for the LTE system.

Referring to FIG. 14, a general FDD-type wireless communication system performs data transmission/reception through one DL band and one UL band corresponding to this DL band. The BS and the UE transmit/receive data and/or control information scheduled in units of a subframe. Data is transmitted/received through a data region configured in a UL/DL subframe, and control information is transmitted/received through a control region configured in a UL/DL subframe. For these operations, the UL/DL subframe may carry signals through various physical channels. Although FIG. 14 has disclosed only the FDD scheme for convenience of description, it should be noted that the scope or spirit of the present invention is not limited thereto, and can also be applied to the TDD scheme by dividing the radio frame of FIG. 8 according to an uplink (UL) and a downlink (DL) in a time domain.

Figure 15:
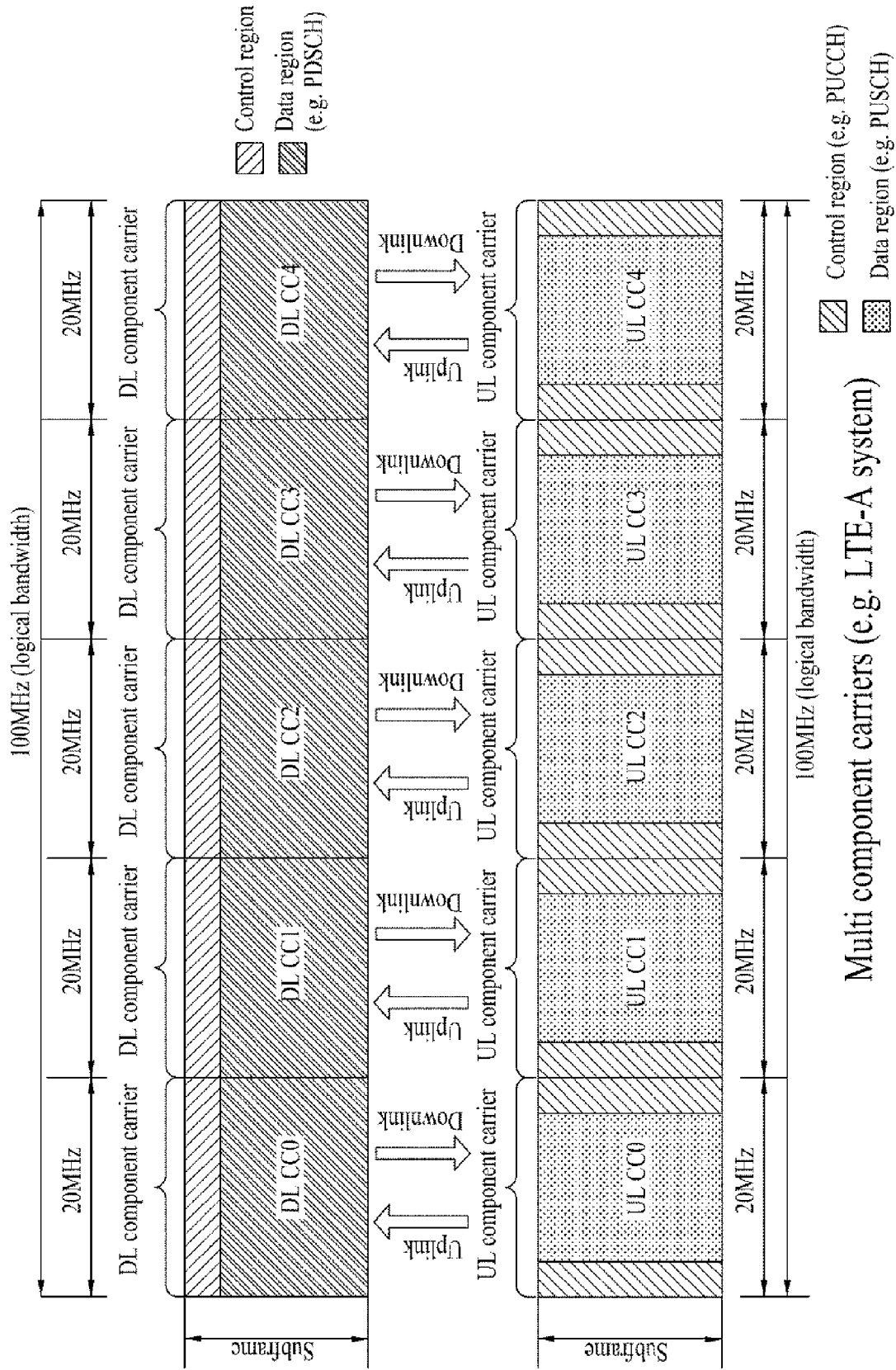
FIG. 15 shows exemplary communication under a multi-carrier situation.

FIG. 15 shows exemplary communication under a multi-carrier situation.

The LTE-A system uses carrier aggregation or bandwidth aggregation technology that uses a larger bandwidth by aggregating several UL/DL frequency blocks. The multicarrier system or the carrier aggregation (CA) system aggregates and uses a plurality of carriers each having a smaller band than a target band to support a broadband. When aggregating several carriers each having a smaller band than the target band, the band of aggregated carriers may be limited to a bandwidth used in a conventional system such that the bandwidth may achieve backward compatibility with the conventional system. For example, the conventional LTE system supports 1.4 MHz, 3 MHz, 5 MHz, 10 MHz, 15 MHz, and 20 MHz bandwidths. The LTE-A (LTE-Advanced) system evolved from the LTE system may support a bandwidth larger than the 20 MHz bandwidth using only bandwidths supported by the LTE system. Alternatively, a new bandwidth is defined irrespective of a bandwidth used in the conventional system, such that carrier aggregation can be supported by the new bandwidth. Multiple carriers (multicarriers), carrier aggregation and bandwidth aggregation may be used interchangeably as necessary. In addition, the carrier aggregation is a generic term of contiguous carrier aggregation and non-contiguous carrier aggregation. For reference, if only one component carrier (CC) is used for communication in the TDD scheme, or if one UL CC and one DL CC are used for communication in the FDD scheme, this means communication under a single carrier situation (non-CA). UL CC may also be referred to as UL resources, and DL CC may also be referred to as DL resources.

For example, as can be seen from FIG. 15, five 20 MHz CCs are aggregated in each of UL and DL such that a 100 MHz bandwidth can be supported. Individual CCs may be contiguous or non-contiguous to each other in a frequency domain. FIG. 15 shows the example in which a UL CC bandwidth is symmetrically identical to a DL CC bandwidth. However, a bandwidth of each CC may be independently determined. For example, the UL CC bandwidth may be comprised of "5 MHz(UL CC0)+20 MHz(UL CC1)+20 MHz (UL CC2)+20 MHz(UL CC3)+5 MHz(UL CC4)". In addition, asymmetrical carrier aggregation in which the number of UL CCs is different from the number of DL CCs may also be achieved. The asymmetrical carrier aggregation may be generated by the limitation of an available frequency band or may be achieved by network configuration. For example, although the BS manages X DL CCs, a frequency band capable of being received in a specific UE may be limited to Y DL CCs (where $Y \leq X$). In this case, it is necessary for the UE to monitor DL signal/data transmitted through Y CCs. In addition, although the BS manages L UL CCs, a frequency band capable of being received in a specific UE may be limited to M UL CCs (where $M \leq L$). In this case, a DL or UL CC limited to a specific UE may be referred to as a configured serving UL or DL CC in the specific UE. The BS may activate some or all of CCs managed by the BS, or may deactivate some CCs, such that a predetermined number of CCs may be assigned to the UE. The BS may change the activated/deactivated CCs, and the number of activated/deactivated CCs may be changed. On the other hand, the BS may configure Z DL CCs (where $1 \leq Z \leq y \leq X$) as main DL CCs. Herein, the Z DL CCs must be primarily monitored and received cell-specifically or UE-specifically. In addition, the BS may configure N UL CCs (where $1 \leq N \leq M \leq L$) as main UL CCs, the N UL CCs being primarily transmitted cell-specifically or UE-specifically. The main DL or UL CCs dedicated to a specific UE may be referred to as a configured serving UL or DL CC in the specific UE. Various parameters for carrier aggregation may be established cell-specifically, UE group-specifically, or UE-specifically.

Once the BS cell-specifically or UE-specifically assigns a CC available to the UE, unless CC allocation to the UE may be wholly reconfigured or the UE is handed over, at least one of the allocated CCs is not deactivated. Hereinafter, the CC unable to be deactivated unless CC allocation to the UE is wholly reconfigured is referred to as a Primary CC (PCC), and a CC capable of being freely activated/deactivated by the BS is referred to as a secondary CC (SCC). Single carrier communication uses one PCC for communication between the UE and the BS, and the SCC is not used in communication. On the other hand, PCC and SCC may be distinguished from each other on the basis of control information. For example, specific control information may be transmitted/received only through a specific CC. Such specific CC is referred to as a PCC, and the remaining CC(s) may be referred to as SCC(s). For example, control information transmitted on a PUCCH may correspond to such specific control information. In this way, if control information transmitted on a PUCCH is transmitted from the UE to the BS only through a PCC, a UL CC carrying the PUCCH of the UE may be referred to as a UL PCC and the remaining UL CC(s) may be referred to as UL SCC(s). For another example, if the UE-specific CC is used, the specific UE may receive a DL synchronization signal (SS) as the specific control information from the BS. In this case, a DL CC through which the specific UE receives the DL SS and with which the UE adjusts initial DL time synchronization (that is, a DL CC the UE uses to establish connection to the network of the BS) may be referred to as a DL PCC, and the remaining DL CC(s) may be referred to as DL SCC(s). In the LTE-A release-10 communication system, the multicarrier communication uses one PCC for each UE or uses 0 or 1 secondary SCC(s) for each UE. However, the above-mentioned description is defined according to the LTE-A standard, and several PCCs for each UE may be used in communication in the future. PCC may also be referred to as a primary CC, an anchor CC or a primary carrier. SCC may also be referred to as a secondary CC or a secondary carrier.

The LTE-A conceptually uses the concept 'cell' in order to manage radio resources. The cell is defined as a combination of DL resources and UL resources. That is, the cell is defined as a combination of DL CC and UL CC, and UL resources are not mandatory. Therefore, the cell may be comprised of only DL resources or may be comprised of DL resources and UL resources. However, the above-mentioned description is defined according to the current LTE-A standard, and the cell may be configured solely in UL resources as necessary. If carrier aggregation is supported, a linkage between DL resource (or DL CC) carrier frequency and UL resource (or UL CC) carrier frequency may be designated by system information. For example, a combination of DL CC and UL CC may be indicated by system information block type2 (SIB2) linkage. In this case, the carrier frequency may indicate the center frequency of each cell or CC. The cell operated on the primary frequency (or PCC) may be referred to as a primary cell (PCell), and the cell(s) operated at a secondary frequency (or SCC) may be referred to as a secondary cell(s) (SCells). The primary frequency (or PCC) may indicate a frequency (or CC) used when the initial connection establishment process is performed or when a connection re-establishment process is started. PCell may also indicate the cell indicated in a handover process. In this case, the secondary frequency (or SCC) may indicate a frequency (or CC) that may be configured after RRC connection establishment and may also be used to provide additional radio resources. PCell and SCell may be generically named as serving cells. Therefore, in the case of the UE that is in an RRC_CONNECTED state, does not establish or support carrier aggregation, there is only one serving cell composed of only PCell. In contrast, in the case of another UE that is in the RRC_CONNECTED state and establishes carrier aggregation, one or more serving cells may be present, one PCell and at least one SCell may form the entire serving cells. However, it should be noted that the serving cells may also include a plurality of PCells in the future. After the initial security activation process is started, the network may add one or more SCells to the initially configured PCell in a connection establishment process for the UE supporting carrier aggregation. However, although the UE supports carrier aggregation, the network may also configure only the PCell for the UE without adding any SCell. The PCell may be referred to as a primary cell, an anchor cell or a primary carrier, and the SCell may be referred to as a secondary cell or a secondary carrier.

In a multicarrier system, the BS may transmit several data units to the UE through given cell(s) (or CC(s)), and the UE may transmit ACK/NACK messages for the several data units in one subframe. The UE may be assigned one or more cells (or DL CC) for receiving a PDSCH carrying DL data. The cell(s) (or DL CC(s)) for the UE may be semi-statically configured through RRC signaling. In addition, cell(s) (or DL CC(s)) for the UE may be dynamically activated/deactivated through L1/L2 (MAC) signaling. Therefore, a maximum number of ACK/NACK bits to be transmitted by the UE may be changed according to the cell (or DL CC) available to the UE. That is, a maximum number of ACK/NACK bits to be transmitted by the UE may be configured/re-configured by RRC signaling, or may be changed according to the DL CC (or the configured serving cell(s)) activated by L1/L2 signaling.

Figure 16:
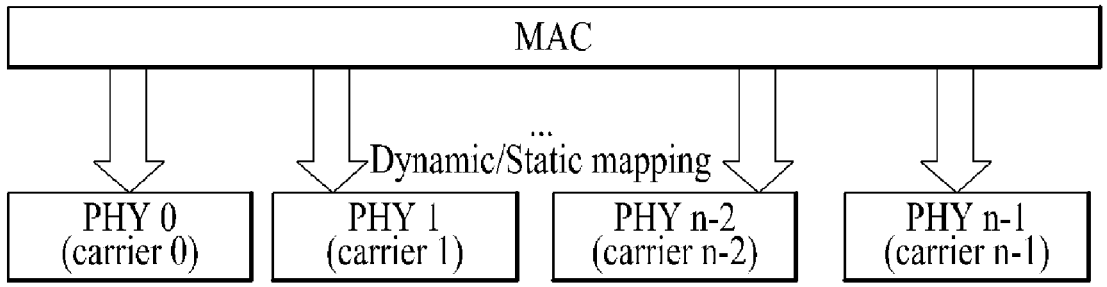
FIG. 16 is a conceptual diagram illustrating a method for enabling one MAC of a BS to manage multicarriers.
Figure 17:
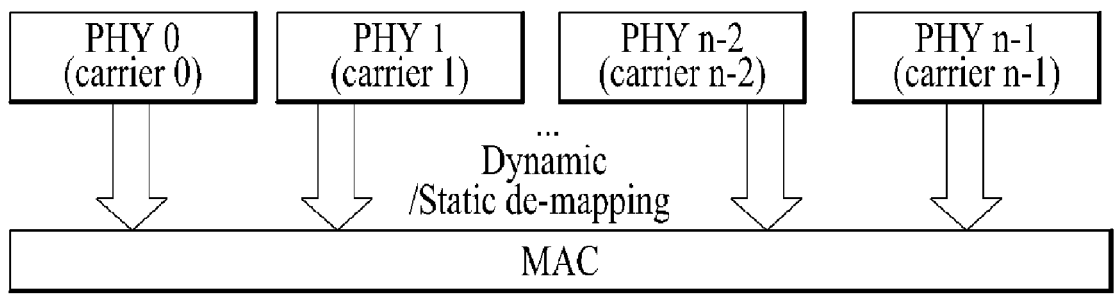
FIG. 17 is a conceptual diagram illustrating a method for enabling one MAC of a UE to manage multicarriers.

FIG. 16 is a conceptual diagram illustrating a method for enabling one MAC of a BS to manage multicarriers. FIG. 17 is a conceptual diagram illustrating a method for enabling one MAC of a UE to manage multicarriers.

Referring to FIGS. 16 and 17, one MAC manages and operates one or more frequency carriers, such that it performs transmission and reception of data. Frequency carriers managed by one MAC need not be contiguous to each other, such that they are more flexible in terms of resource management. In FIGS. 16 and 17, one PHY means one component carrier (CC) for convenience of description. One PHY may not always indicate an independent radio frequency (RF) device. Generally, although one independent RF device may indicate one PHY, the scope or spirit of the present invention is not limited thereto, and one RF device may include a plurality of PHYs.

Figure 18:
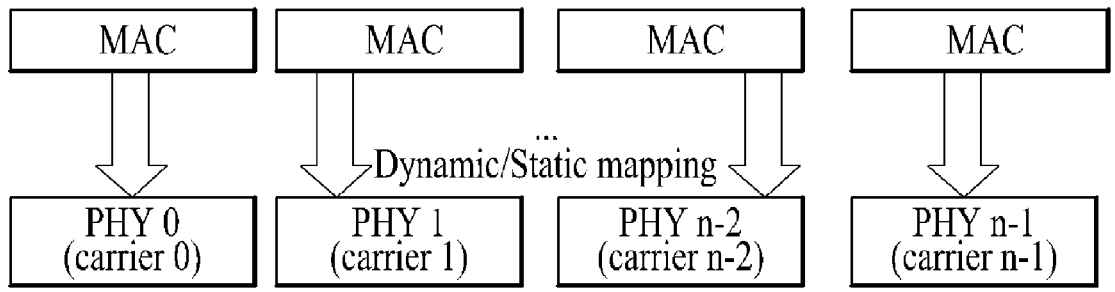
FIG. 18 is a conceptual diagram illustrating a method for enabling several MACs of a BS to manage multicarriers.
Figure 19:
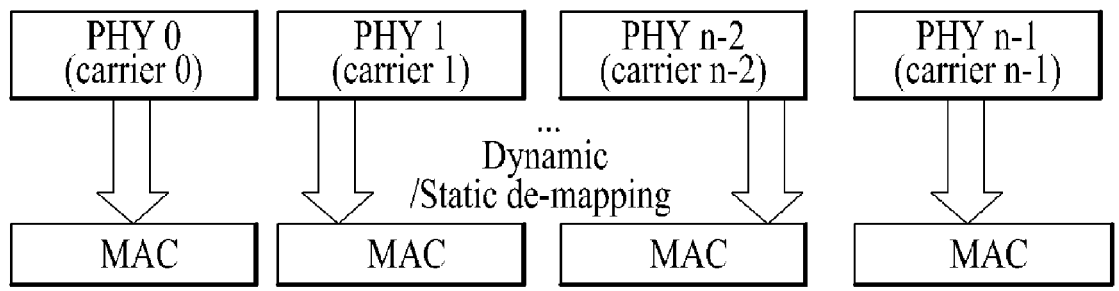
FIG. 19 is a conceptual diagram illustrating a method for enabling several MACs of a UE to manage multicarriers.
Figure 20:
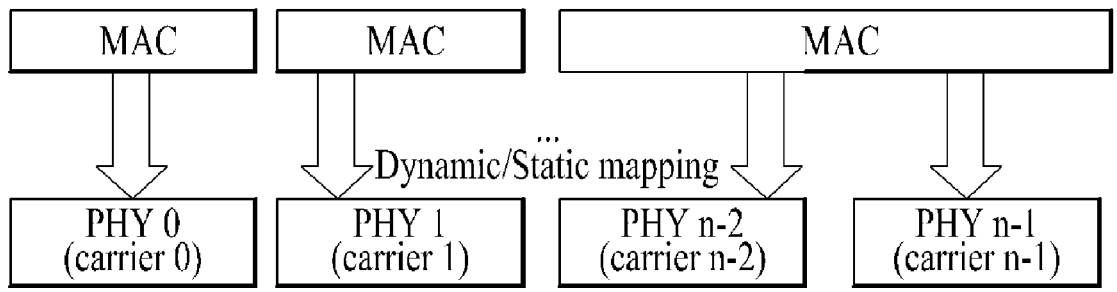
FIG. 20 is a conceptual diagram illustrating another method for enabling several MACs of a BS to manage multicarriers.
Figure 21:
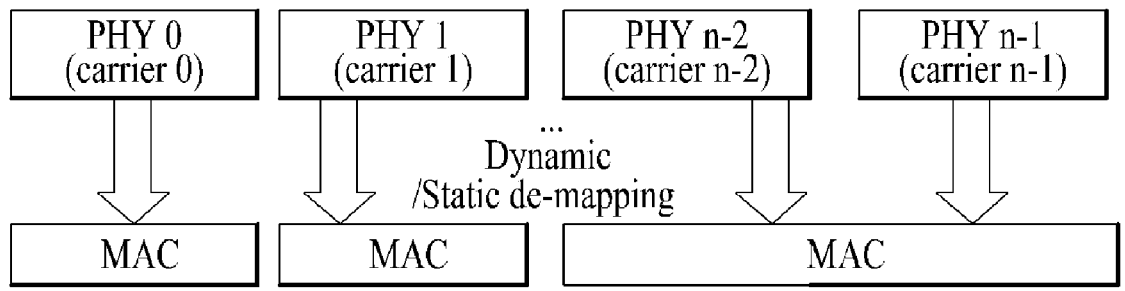
FIG. 21 is a conceptual diagram illustrating another method for enabling several MACs of a UE to manage multicarriers.

FIG. 18 is a conceptual diagram illustrating a method for enabling several MACs of a BS to manage multicarriers. FIG. 19 is a conceptual diagram illustrating a method for enabling several MACs of a UE to manage multicarriers. FIG. 20 is a conceptual diagram illustrating another method for enabling several MACs of a BS to manage multicarriers. FIG. 21 is a conceptual diagram illustrating another method for enabling several MACs of a UE to manage multicarriers.

Referring to not only the structures shown in FIGS. 16 and 17, but also the structures shown in FIGS. 18 to 21, a plurality of MACs but not one MAC may control a plurality of carriers. As can be seen from FIGS. 18 and 19, each carrier may be controlled by each MAC on a one to one basis. As can be seen from FIGS. 20 and 21, each of some carriers may be controlled by each MAC on a one to one basis, and the remaining one or more carriers may be controlled by one MAC.

The above-mentioned system manages a plurality of carriers (i.e., 1 to N carriers), and individual carriers may be contiguous or non-contiguous to each other. The above-mentioned system may be applied to UL transmission and DL transmission without distinction. The TDD system is configured to manage N carriers for DL and UL transmission in each carrier, and the FDD system is configured to use N carriers separately for UL transmission and DL transmission. The FDD system may also support asymmetrical carrier aggregation (CA) in which the number of carriers and/or the bandwidth of carriers aggregated in UL and DL are/is different.

In the case where the number of component carriers (CCs) aggregated in UL is identical to the number of CCs aggregated in DL, all CCs may be compatible with those of the conventional system. However, it should be noted that CCs that do not consider the compatibility are not always excluded.

For convenience of description, although it is assumed that the corresponding PDSCH is transmitted on DL CC #0 on the condition that a PDCCH is transmitted on DL CC #0, it is obvious to those skilled in the art that the cross-carrier scheduling can be applied such that the corresponding PDSCH can be transmitted through other DL CCs without departing from the spirit or scope of the invention.

Figure 22:
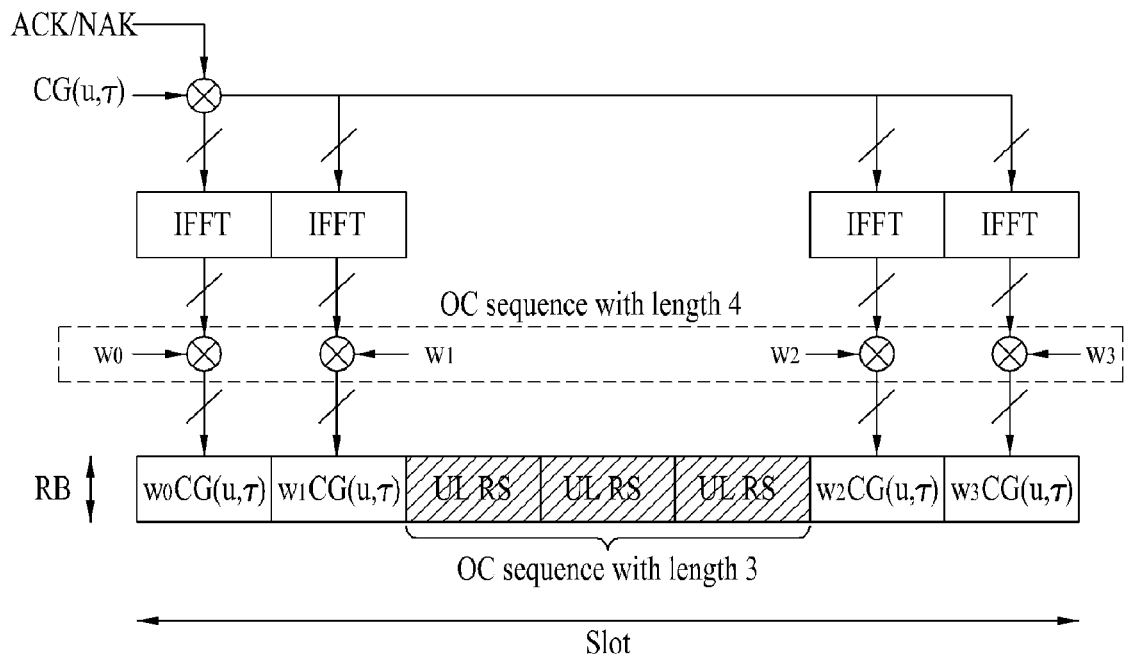
FIGS. 22 and 23 exemplarily show PUCCH format 1a and 1b slot level structures.
Figure 23:
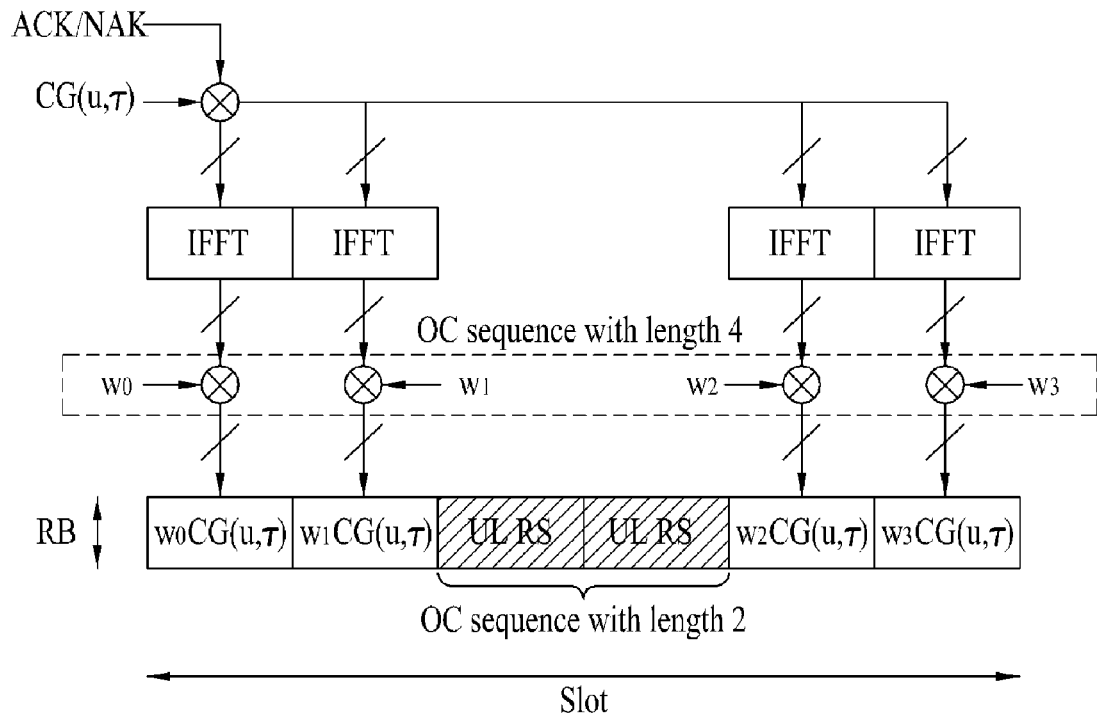

FIGS. 22 and 23 exemplarily show PUCCH format 1a and 1b slot level structures.

FIG. 22 shows the PUCCH format 1a and 1b structure in case of a normal CP. FIG. 23 shows the PUCCH format 1a and 1b structure in case of the extended CP. In the PUCCH format 1a and 1b structure, the same control information may be repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences (w0, w1, w2, w3) may be applied to either an arbitrary time domain (after FFT modulation) or an arbitrary frequency domain (before FFT modulation). The PUCCH format 1 slot level structure for Scheduling Request (SR) transmission may be identical to the PUCCH format 1a and 1b, but the PUCCH format 1 slot level structure and the PUCCH format 1a and 1b structure have different modulation methods.

For ACK/NACK feedback for SR transmission and semi-persistent scheduling (SPS), PUCCH resources composed of CS, CC and PRB may be assigned to the UE through RRC signaling. As previously illustrated in FIG. 12, not only for dynamic ACK/NACK (or ACK/NACK for non-persistent scheduling) feedback but also for ACK/NACK feedback for a PDCCH indicating SPS release, PUCCH resources may be implicitly assigned to the UE using the lowest or smallest CCE index of either a PDCCH corresponding to the PDSCH or a PDCCH indicating the SPS release.

Figure 24:
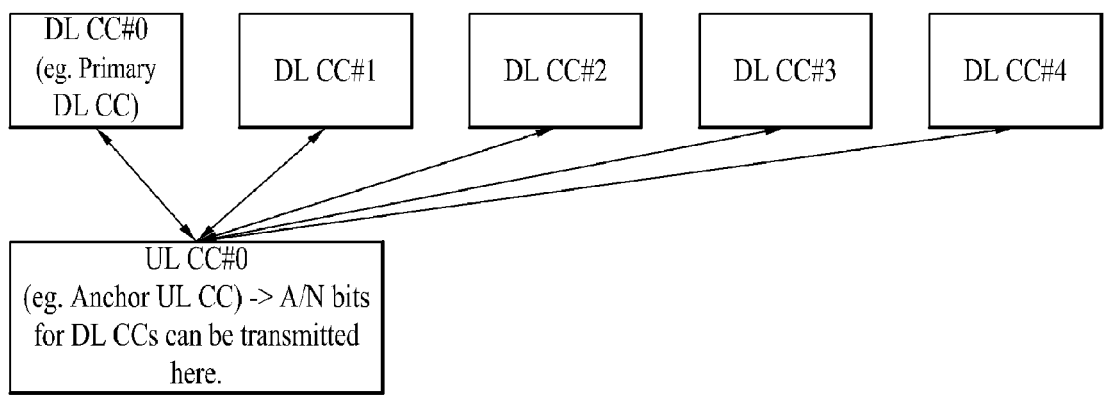
FIG. 24 shows an exemplary scenario for transmitting uplink control information (UCI) in a wireless communication system supporting carrier aggregation.

FIG. 24 shows an exemplary scenario for transmitting uplink control information (UCI) in a wireless communication system supporting carrier aggregation. For convenience of description, the example of FIG. 24 assumes that the UCI is ACK/NACK (A/N). However, the above-mentioned description is disclosed only for illustrative purposes, and the UCI may include channel state information (e.g., CQI, PMI, RI) and control information such as scheduling request (SR) information without any limitation.

FIG. 24 shows an asymmetric carrier aggregation in which 5 DL CCs are linked to one UL CC. The illustrated asymmetric carrier aggregation may be established at UCI transmission viewpoint. That is, DL CC-UL CC linkage for UCI and DL CC-UL CC linkage for data may be differently established. For convenience of description, assuming that each DL CC may carry a maximum of two codeword blocks (or two transport blocks) and the number of ACK/NACK responses for each CC is dependent upon a maximum number of established codewords per CC (for example, if a maximum number of codewords established by the BS at a specific CC is set to 2, although a specific PDCCH uses only one codeword in the above-mentioned CC, the number of associated ACK/NACK responses is set to a maximum number (i.e., 2) of codewords per CC), at least two UL ACK/NACK bits are needed for each DL CC. In this case, in order to transmit ACK/NACK for data received through 5 DL CCs through one UL CC, ACK/NACK comprised of at least 10 bits is needed. In order to separately discriminate a DTX (discontinuous transmission) state for each DL CC, at least 12 bits ($=5^5=3125=11.61$ bits) for ACK/NACK transmission are needed. The conventional PUCCH format 1a/1b can transmit ACK/NACK to the range of a maximum of 2 bits, such that the conventional PUCCH cannot carry the extended ACK/NACK information. For convenience of description, although the amount of UCI information is increased due to the carrier aggregation, this situation may be generated due to the increased number of antennas and the presence in a backhaul subframe in the TDD or relay system. Similar to ACK/NACK, even when control information associated with several DL CCs is transmitted through one UL CC, the amount of control information to be transmitted on one CC is increased. For example, in case of transmitting CQI/PMI/RI for several DL CCs, UCI payload may be increased.

In FIG. 24, the UL anchor CC (UL PCC or UL Primary CC) is a CC through which PUCCH or UCI is transmitted, and the UL anchor CC may be cell-specifically or UE-specifically determined. In addition, the DTX state may be explicitly fed back, i.e, fed back separately from the NACK state, and may also be fed back in such a manner that the DTX and the NACK share the same state.

The method for effectively transmitting the increased UL control information (UCI) will hereinafter be described with reference to the accompanying drawings. In more detail, the following description proposes the new PUCCH format/signal processing/resource allocation method capable of transmitting the increased UL control information (UCI). For convenience of description, the new PUCCH format proposed by the present invention is referred to as CA (Carrier Aggregation) PUCCH format or as a PUCCH format 3 because PUCCH formats up to the PUCCH format 2 is defined in the conventional LTE Release 8/9. The technical idea of the PUCCH format proposed in the present invention can be easily applied to an arbitrary physical channel (e.g., PUSCH) capable of carrying UL control information (UCI) using the same or similar scheme. For example, the embodiment of the present invention can be applied to a periodical PUSCH structure for periodically transmitting control information or to an aperiodic PUSCH structure for aperiodically transmitting control information.

The following drawings and embodiments basically show an exemplary case in which the UCI/RS symbol structure of the PUCCH format 1/1a/1b (normal CP) of the conventional LTE is used as a UCI/RS symbol structure of the subframe/slot level applied to the PUCCH format 3. However, the subframe/slot level UCI/RS symbol structure prescribed in the PUCCH format 3 is disclosed only for illustrative purposes for convenience of description, and the scope or spirit of the present invention is not limited only to a specific structure. In the PUCCH format 3, the number of UCI/RS symbols, the positions of the UCI/RS symbols, etc. may be freely modified according to the system design. For example, the PUCC format 3 according to the embodiment of the present invention may be defined using RS symbol structures of the PUCCH format 2/2a/2b of the conventional LTE.

The PUCCH format 3 according to the embodiment of the present invention may be used to carry arbitrary categorized/sized uplink control information (UCI). For example, the PUCCH format 3 according to the embodiment of the present invention may carry a variety of information, for example, HARQ ACK/NACK, CQI, PMI, RI, SR, etc., and these information may have arbitrary-sized payload. For convenience of description, the present embodiment is focused upon the exemplary case in which the PUCCH format 3 carries the ACK/NACK information, and a detailed description thereof will be described later.

FIGS. 25 to 28 exemplarily show a PUCCH format 3 and associated signal processing according to the embodiments of the present invention. Particularly, FIGS. 25 to 28 exemplarily show the DFT-based PUCCH format structure. According to the DFT-based PUCCH structure, DFT precoding is performed in PUCCH and a time domain orthogonal cover (OC) is applied to the PUCCH at SC-FDMA level before the PUCCH is transmitted. The DFT-based PUCCH format is generically named as a PUCCH format 3.

Figure 25:
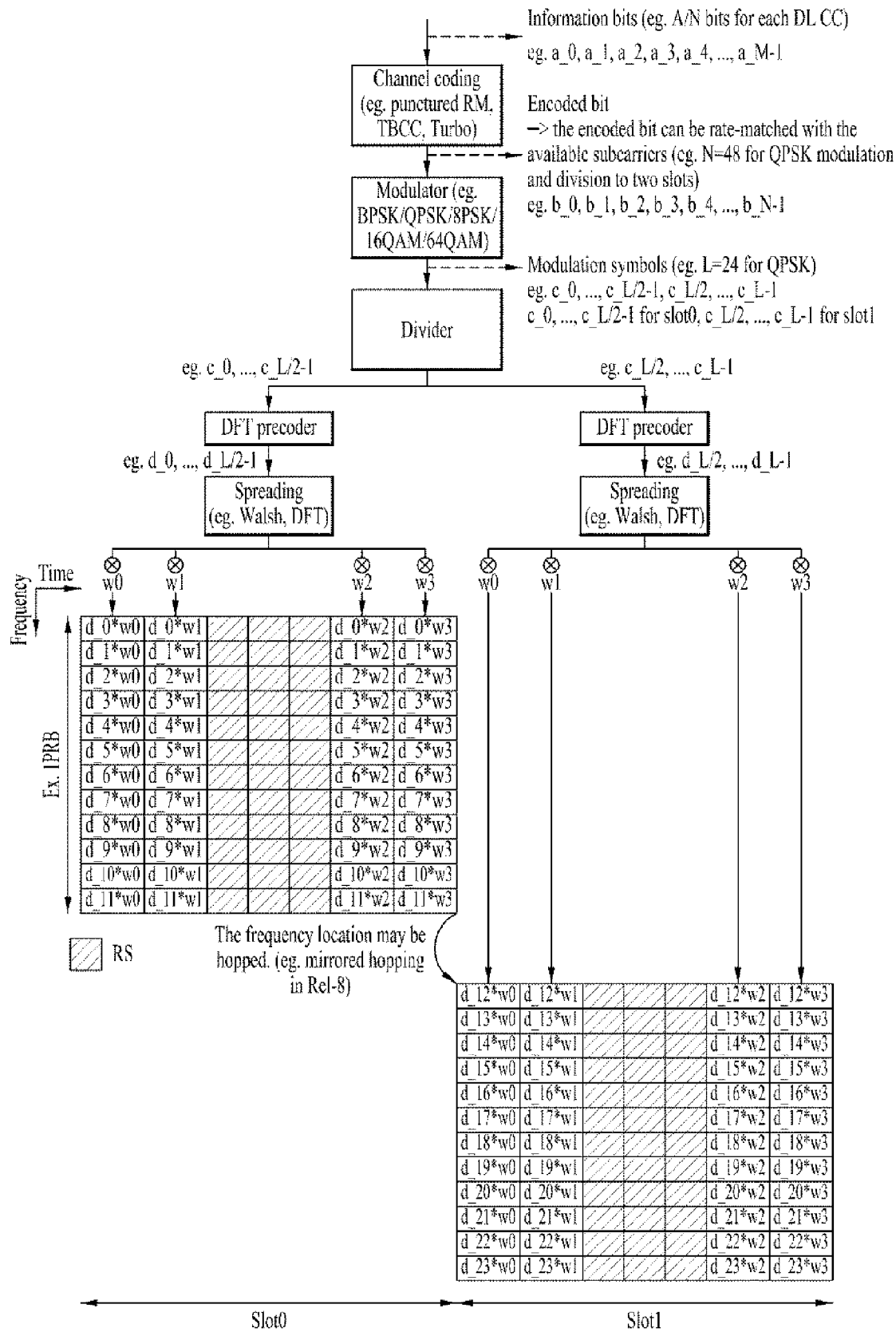
FIGS. 25 to 28 exemplarily show a PUCCH format 3 structure and associated signal processing according to the embodiments of the present invention.

FIG. 25 exemplarily shows the PUCCH format 3 structure using the orthogonal code (OC) of SF=4. Referring to FIG. 25, the channel coding block performs channel coding of the information bits ($a\_0, a\_1, \ldots, a\_M-1$) (e.g., multiple ACK/NACK bits), thereby generating the encoded bits (coded bit or coding bit)(or codeword) ($b\_0, b\_1, \ldots, b\_N-1$). M is the size of information bit, and N is the size of coding bit. The information bit may include UCI, for example, multiple ACK/NACK data for multiple data units (or PDSCHs) received through multiple DL CCs. In this case, the information bit ($a\_0, a\_1, \ldots, a\_M-1$) is joint-coded irrespective of categories/numbers/sizes of UCIs constructing the information bit. For example, if the information bit includes multiple ACK/NACK data of several DL CCs, the channel coding is not performed per DL CC or per ACK/NACK bit, but performed for the entire bit information, such that a single codeword is generated. The channel coding is not limited thereto, and includes simple repetition, simplex coding, Reed Muller (RM) coding, punctured RM coding, Tail-biting convolutional coding (TBCC), low-density parity-check (LDPC) or turbo-coding. Although not shown in the drawings, the coding bit may be rate-matched in consideration of a modulation order and the amount of resources. The rate matching function may be included in some parts of the channel coding block or may be performed through a separate functional block. For example, the channel coding block may perform the (32,0) RM coding for several control information to obtain a single codeword, and cyclic buffer rate-matching for the obtained codeword may be performed.

The modulator modulates the coding bit ($b\_0, b\_1, \ldots, b\_N-1$) so as to generate the modulation symbol ($c\_0, c\_1, \ldots, c\_L-1$). L is the size of a modulation symbol. The modulation method may be performed by modifying the size and phase of a transmission (Tx) signal. For example, the modulation method may include n-PSK (Phase Shift Keying), n-QAM (Quadrature Amplitude Modulation) (where n is an integer of 2 or higher). In more detail, the modulation method may include BPSK (Binary PSK), QPSK (Quadrature PSK), 8-PSK, QAM, 16-QAM, 64-QAM, etc.

The divider distributes the modulation symbols ($c\_0$, $c\_1, \ldots, c\_L-1$) to individual slots. The order/pattern/scheme for distributing the modulation symbols to individual slots may not be specially limited. For example, the divider may sequentially distribute the modulation symbols to individual slots (i.e., localized scheme). In this case, as shown in the drawings, the modulation symbols ($c\_0, c\_1, \ldots, c\_L/2-1$) are distributed to Slot 0, the modulation symbols ($c\_L/2$, $c\_L/2+1, \ldots, c\_L-1$) may be distributed to Slot 1. In addition, the modulation symbols may be interleaved (or permuted) while being distributed to individual slots. For example, the even-th modulation symbols may be distributed to Slot 0, and the odd-th modulation symbols may be distributed to Slot 1. If necessary, the modulation process and the distribution process may be replaced with each other in order.

The DFT precoder performs DFT precoding (e.g., 12-point DFT) for the modulation symbols distributed to individual slots so as to generate a single carrier waveform. Referring to FIG. 25, the modulation symbols ($c\_0, c\_1, \ldots, c\_L/2-1$) distributed to Slot 0 may be DFT-precoded to DFT symbols ($d\_0, d\_1, \ldots, d\_L/2-1$), ad the modulation symbols ($c\_L/2$, $c\_L/2+1, \ldots, c\_L-1$) distributed to Slot 1 may be DFT-precoded to DFT symbols ($d\_L/2, d\_L/2+1, \ldots, d\_L-1$). The DFT precoding may be replaced with another linear operation (e.g., Walsh precoding).

The spreading block performs spreading of the DFT-processed signal at the SC-FDMA symbol level. The time domain spreading at the SC-FDMA symbol level may be performed using the spreading code (sequence). The spreading code may include a Quasi-orthogonal code and an orthogonal code. The Quasi-orthogonal code is not limited thereto, and may include a PN (Pseudo Noise) code as necessary. The orthogonal code is not limited thereto, and may include a Walsh code, a DFT code, etc. as necessary. Although the present embodiment is focused only upon the orthogonal code as a representative spreading code for convenience of description, the orthogonal code may be replaced with a Quasi-orthogonal code. A maximum value of the spreading code size (or the spreading factor (SF)) is limited by the number of SC-FDMA symbols used for control information transmission. For example, if four SC-FDMA symbols are used to transmit control information in one slot, orthogonal codes (w0, w1, w2, w3) each having the length of 4 may be used in each slot. SF means the spreading degree of control information, and may be relevant to the UE multiplexing order or antenna multiplexing order. SF may be changed according to system requirements, for example, in the order of 1 2 3 4. The SF may be pre-defined between the BS and the UE, or may be notified to the UE through DCI or RRC signaling. For example, if one of SC-FDMA symbols for control information is punctured to achieve SRS transmission, the SF-reduced spreading code (e.g., SF=3 spreading code instead of SF=4 spreading code) may be applied to control information of the corresponding slot.

The signal generated through the above-mentioned process may be mapped to subcarriers contained in the PRB, IFFT-processed, and then converted into a time domain signal. The CP may be added to the time domain signal, and the generated SC-FDMA symbol may be transmitted through the RF unit.

Detailed description of individual process on the assumption that ACK/NACK for 5 DL CCs is transmitted will hereinafter be described. If each DL CC transmits two PDSCHs, associated ACK/NACK data includes a DTX state, and the ACK/NACK data may be composed of 12 bits. Assuming that QPSK modulation and 'SF=4' time spreading are used, the coding block size (after the rate matching) may be composed of 48 bits. The coding bit may be modulated into 24 QPSK symbols, and 12 QPSK symbols are distributed to each slot. In each slot, 12 QPSK symbol may be converted into 12 DFT symbols through the 12-point DFT operation. 12 DFT symbols in each slot may be spread and mapped to four SC-FDMA symbols using the SF=4 spreading code in a time domain. Since 12 bits are transmitted through [2 bits*12 subcarriers*8 SC-FDMA symbols], the coding rate is set to 0.0625(=12/192). In case of SF=4, a maximum of four UEs may be multiplexed to one PRB.

Figure 26:
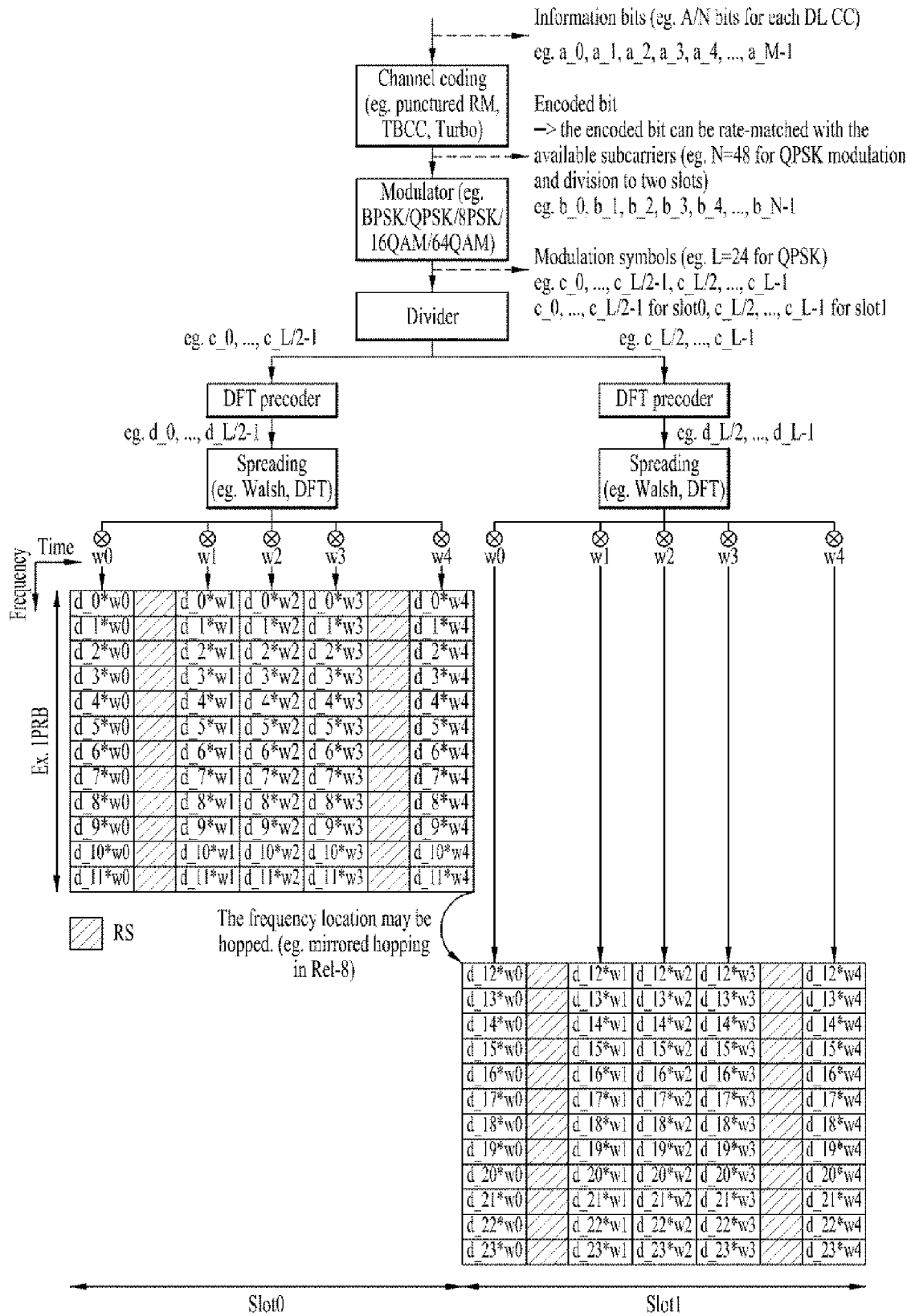

FIG. 26 exemplarily shows the PUCCH format 3 structure using the orthogonal code (OC) of SF=5.

The basic signal processing of FIG. 26 is identical to that of FIG. 25. Compared to FIG. 25, the number/position of UCI SC-FDMA symbols and the number/position of RS SC-FDMA symbols shown in FIG. 26 are different from those of FIG. 25. In this case, the spreading block may also be pre-applied to the previous stage of the DFT precoder as necessary.

In FIG. 26, the RS may succeed to the LTE system structure. For example, cyclic shift (CS) may be applied to a basic sequence. Since the data part includes SF=5, the multiplexing capacity becomes 5. However, the multiplexing capacity of the RS part is determined according to a cyclic shift (CS) interval ($\Delta_{shift}^{PUCCH}$) For example, the multiplexing capacity is given as $12/\Delta_{shift}^{PUCCH}$. In case of $\Delta_{shift}^{PUCCH}=1$, the multiplexing capacity is set to 12. In case of $\Delta_{shift}^{PUCCH}=2$, the multiplexing capacity is set to 6. In case of $\Delta_{shift}^{PUCCH}=3$, the multiplexing capacity is set to 4. In FIG. 26, while the multiplexing capacity of the data part is set to 5 because of SF=5, the RS multiplexing capacity is set to 4 in case of $\Delta_{shift}^{PUCCH}$, such that the resultant multiplexing capacity may be limited to 4 corresponding to the smaller one of two capacity values 5 and 4.

Figure 27:
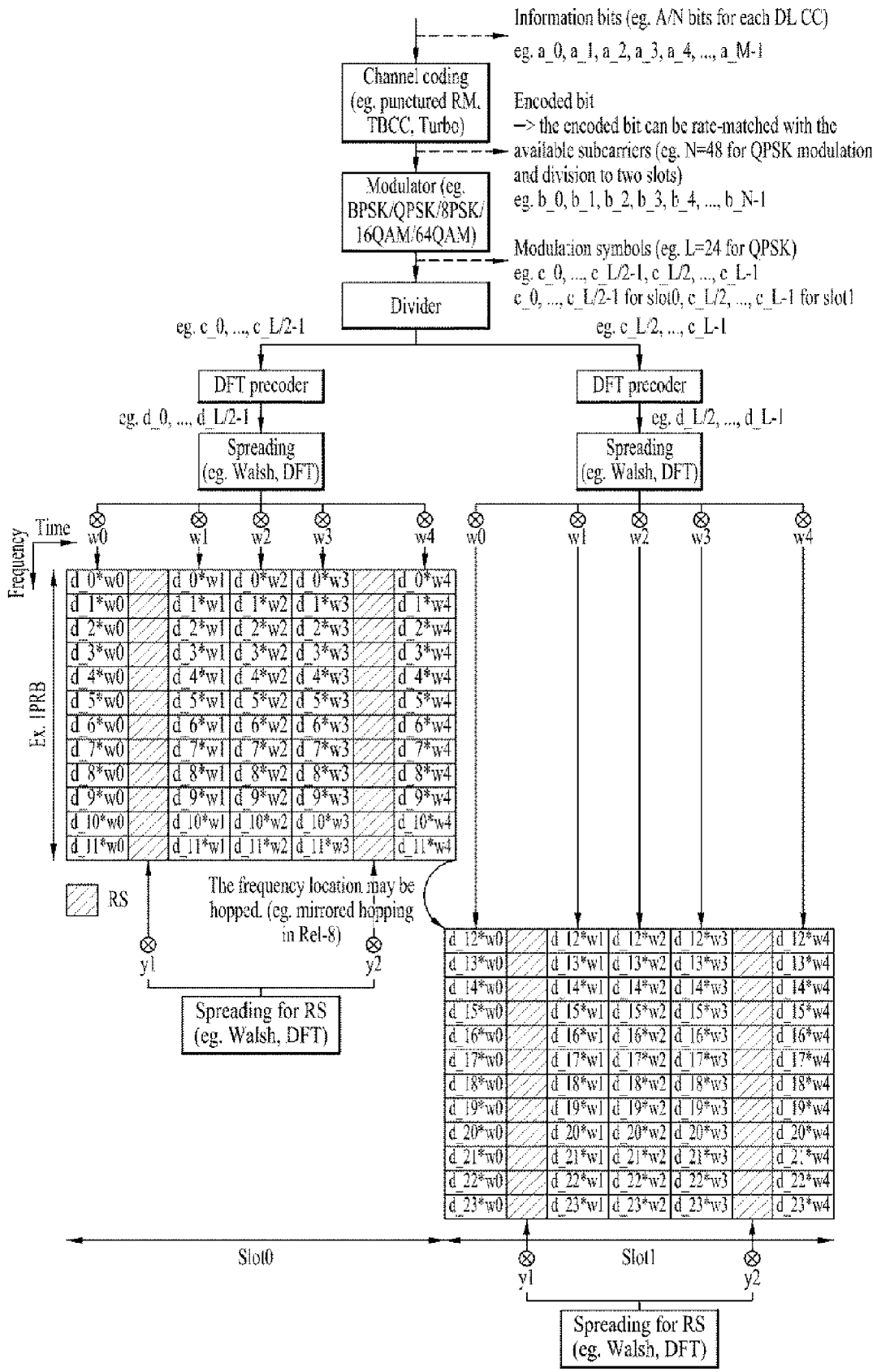

FIG. 27 exemplarily shows the PUCCH format 3 structure in which the multiplexing capacity is increased at a slot level.

The SC-FDMA symbol level spreading illustrated in FIGS. 25 and 26 is applied to RS, resulting in increase in the entire multiplexing capacity. Referring to FIG. 27, if a Walsh cover (or DFT code cover) is applied in the slot, the multiplexing capacity is doubled. Therefore, even in the case of $\Delta_{shift}^{PUCCH}$, the multiplexing capacity is set to 8, such that the multiplexing capacity of the data section is not decreased. In FIG. 27, [y1 y2]=[1 1] or [y1 y2]=[1−1], or linear conversion format (e.g., [j j] [j−j], [1 j] [1−j], or the like) may also be used as an orthogonal cover code for RS.

Figure 28:
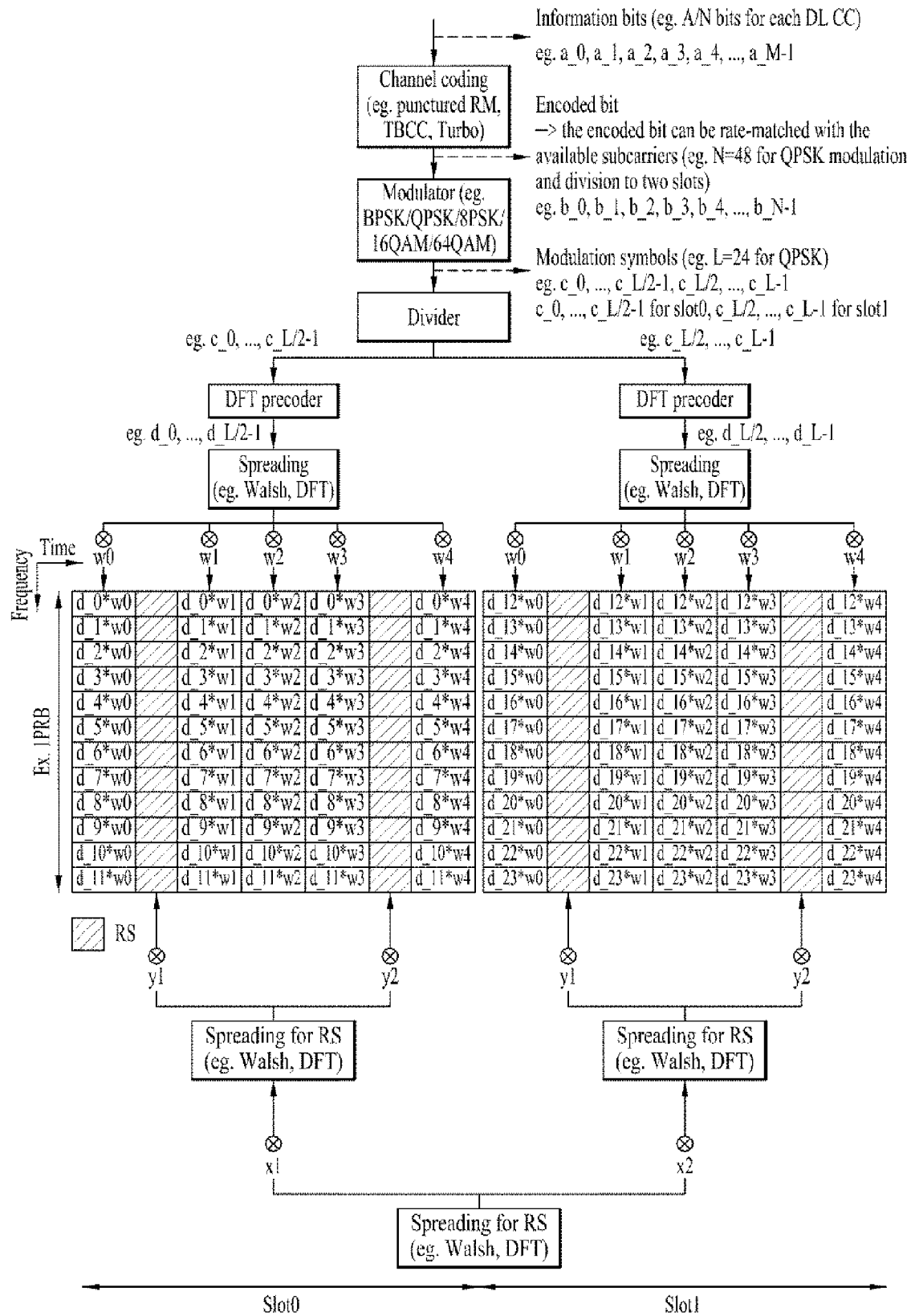

FIG. 28 exemplarily shows a PUCCH format 3 structure in which the multiplexing capacity can be increased at a sub-frame level.

If the frequency hopping is not applied to the slot level, the Walsh cover is applied in slot units, and the multiplexing capacity may be re-increased two times. In this case, as previously stated above, [x1 x2]=[1 1] or [1−1] may be used as the orthogonal cover code, and its modification format may also be used as necessary.

For reference, the PUCCH format 3 processing may be free of the orders shown in FIGS. 25 to 28.

Multiple carriers in carrier aggregation may be classified into PCell and SCell(s). The UE may accumulate responses to one or more PDCCHs and/or PDSCH having no PDCCH received on a DL PCell and/or DL SCell(s), and may transmit the accumulated responses on a PUCCH using a UL PCell. In this way, subframe(s) and/or CC(s) carrying a plurality of PDCCHs of which corresponding responses are transmitted through one UL PUCCH may be referred to as a bundling window. Although the time domain or the CC domain bundling described in the present embodiment may indicate the logical AND operation, it may also be performed through another method such as the logical OR operation, etc. That is, the time domain or the CC domain bundling may be a generic term of a variety of methods for representing a plurality of ACK/NACK parts covering several subframes or several CCs in the ACK/NACK response using a single PUCCH format. That is, X-bit ACK/NACK information may generically represent an arbitrary method for expressing X-bit ACK/NACK information using Y-bits (where X≥Y).

In the CA TDD, multiple ACK/NACK responses for each CC may be transmitted by channel selection using the PUCCH format 1a/1b or by another channel selection using PUCCH format 3 or by PUCCH format 3. Implicit mapping or explicit mapping may be applied to the PUCCH resource index for the above-mentioned PUCCH formats, or a combination of the implicit mapping and the explicit mapping may also be applied thereto as necessary. For example, the implicit mapping may be used as a method for deriving a PUCCH resource index on the basis of the lowest CCE index of the corresponding PDCCH. For example, the explicit mapping may be used as a method for indicating or deriving the corresponding PUCCH resource index from among predetermined sets according to the RRC structure by the ACK/NACK Resource Indicator (ARI) value contained in the corresponding PDCCH.

Cases in which ACK/NACK feedback for DL is needed in a subframe n can be largely classified into the following three cases (Case 1, Case 2, Case 3).

- Case 1: ACK/NACK feedback is needed for PDSCH(s) indicated by PDCCH(s) detected at the subframe(s) (n-k). In this case, K is denoted by (k∈K), K is changed according to the subframe index (n) and UL-DL structure, and is comprised of M elements $\{k_0, k_1, \ldots k_{M-1}\}$. Table 4 shows K composed of M elements $\{k_0, k_1, \ldots k_{M-1}\}$ (i.e., K: $\{k_0, k_1, \ldots k_{M-}\}$). Case 1 relates to PDSCH(s), each of which requires general ACK/NACK feedback. In the following description, Case 1 is referred to as 'ACK/NACK for PDSCH with PDCCH'.
- Case 2: ACK/NACK feedback is needed for PDCCH(s) indicating DL SPS (Semi-Persistent Scheduling) release in subframe(s) (n-k). In this case, K is denoted by (k∈K), and K is identical to that of Case 1. The ACK/NACK of Case 2 may indicate ACK/NACK feedback for PDCCH(s) for SPS release. In contrast, although ACK/NACK feedback for DL SPS release is performed, ACK/NACK feedback for PDCCH(s) indicating SPS activation is not performed. In the following description, Case 2 is referred to as 'ACK/NACK for DL SPS release'.
- Case 3: ACK/NACK feedback is needed for transmission of PDSCH(s) having no PDCCH(s) detected at the subframe(s) n-k. In this case, K is denoted by (k∈K), and K is identical to that of Case 1. Case 3 relates to PDSCH(s) without PDCCH(s), and may indicate ACK/NACK feedback for SPS PDSCH(s). In the following description, Case 3 is referred to as 'ACK/NACK for DL SPS'.

In the following description, the above-mentioned PDSCHs and PDCCHs, each of which requires the ACK/NACK feedback, may be generically named as DL allocation or DL transmission. That is, the PDSCH with PDCCH (i.e., PDSCH with corresponding PDCCH), the PDCCH for DL SPS release, and the PDSCH without PDCCH (i.e., PDSCH without corresponding PDCCH) may be generically named as DL allocation or DL transmission.

TABLE 4

Downlink association set index K: $\{k_0, k_1, \ldots k_{M-1}\}$ for TDD

| UL-DLConfiguration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of the FDD, M is always set to 1, and K is denoted by $(\{k_0\}=\{4\})$.

Figure 29:
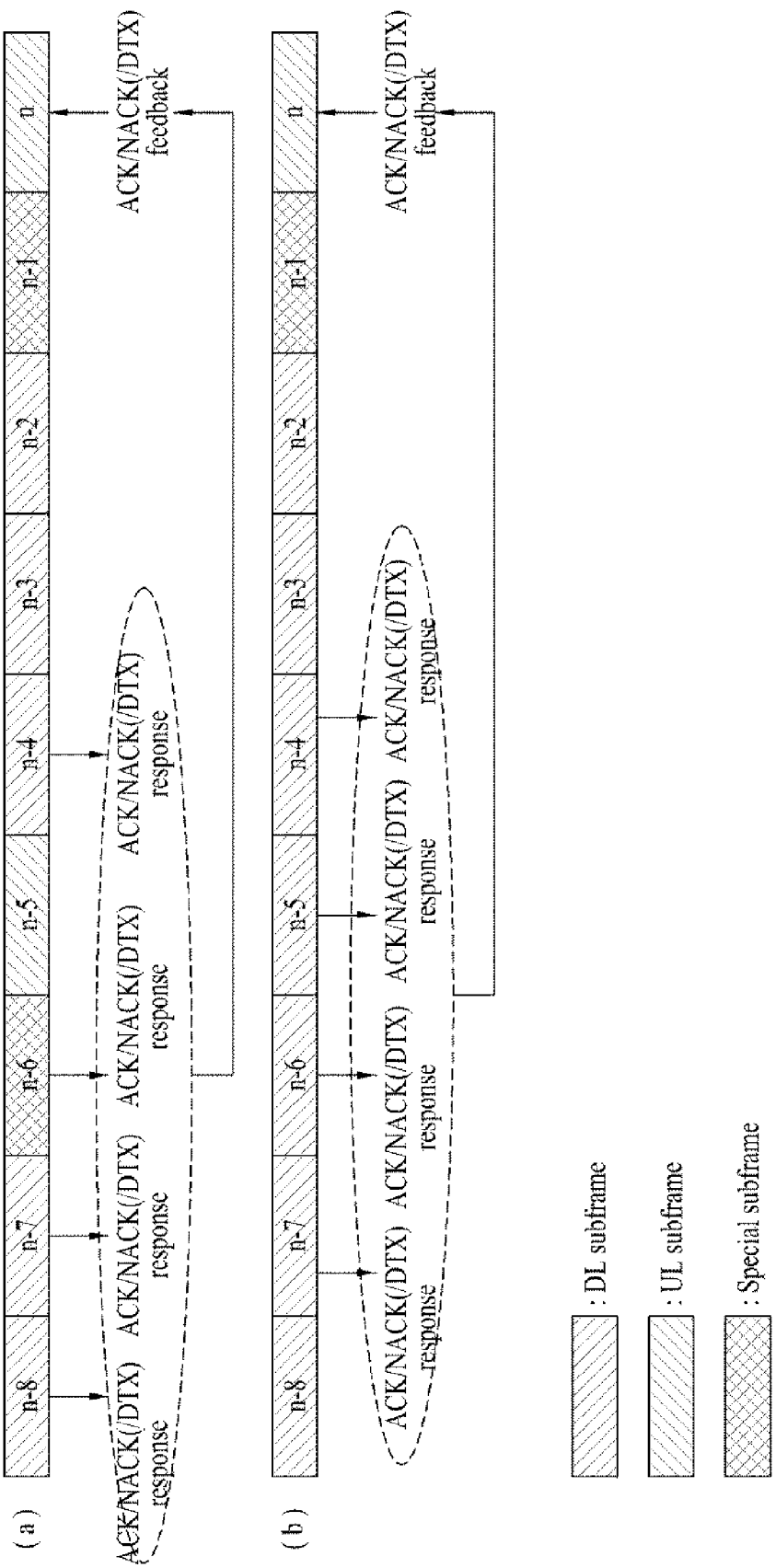
FIG. 29 shows an exemplary TDD UL-DL structure.

FIG. 29 shows an exemplary TDD UL-DL structure. Specifically, FIG. 29 shows a 4DL:1UL structure in which one UL ACK/NACK feedback is performed for 4 DL transmissions.

In case of the TDD UL-DL structure 2, as can be seen from FIG. 29(a), ACK/NACK (/DTX) responses for DL transmission at the subframes n-8, n-7, n-4 and n-6 may be transmitted as one ACK/NACK feedback to the BS at the subframe n of which subframe number is 2.

In case of the TDD UL-DL structure 4, as can be seen from FIG. 29(b), ACK/NACK(/DTX) responses for DL transmission at the subframes n-6, n-5, n-4 and n-7 may be transmitted as one ACK/NACK feedback to the BS at the subframe n of which subframe number is 3.

Figure 30:
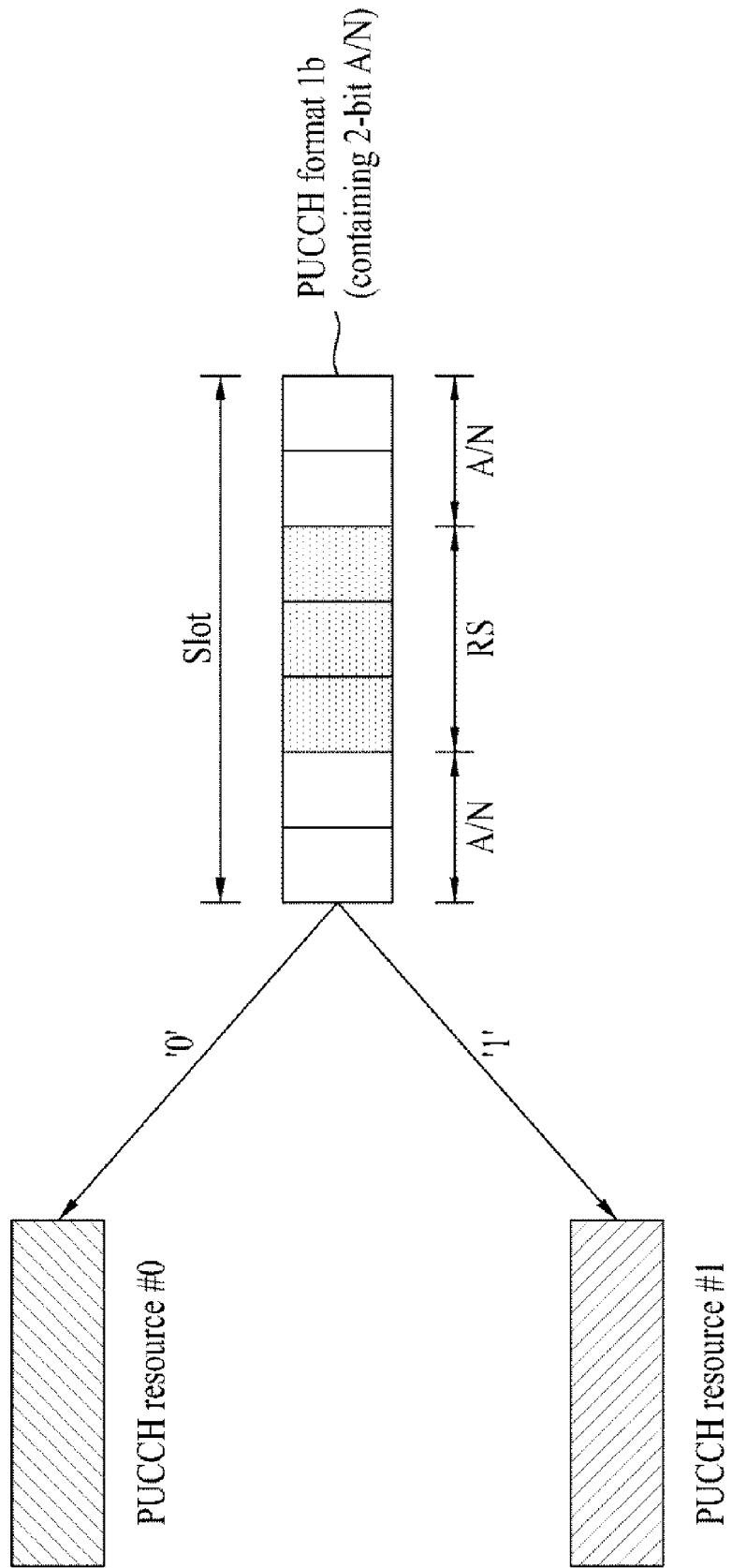
FIGS. 30 and 31 exemplarily show ACK/NACK transmission based on channel selection.
Figure 31:
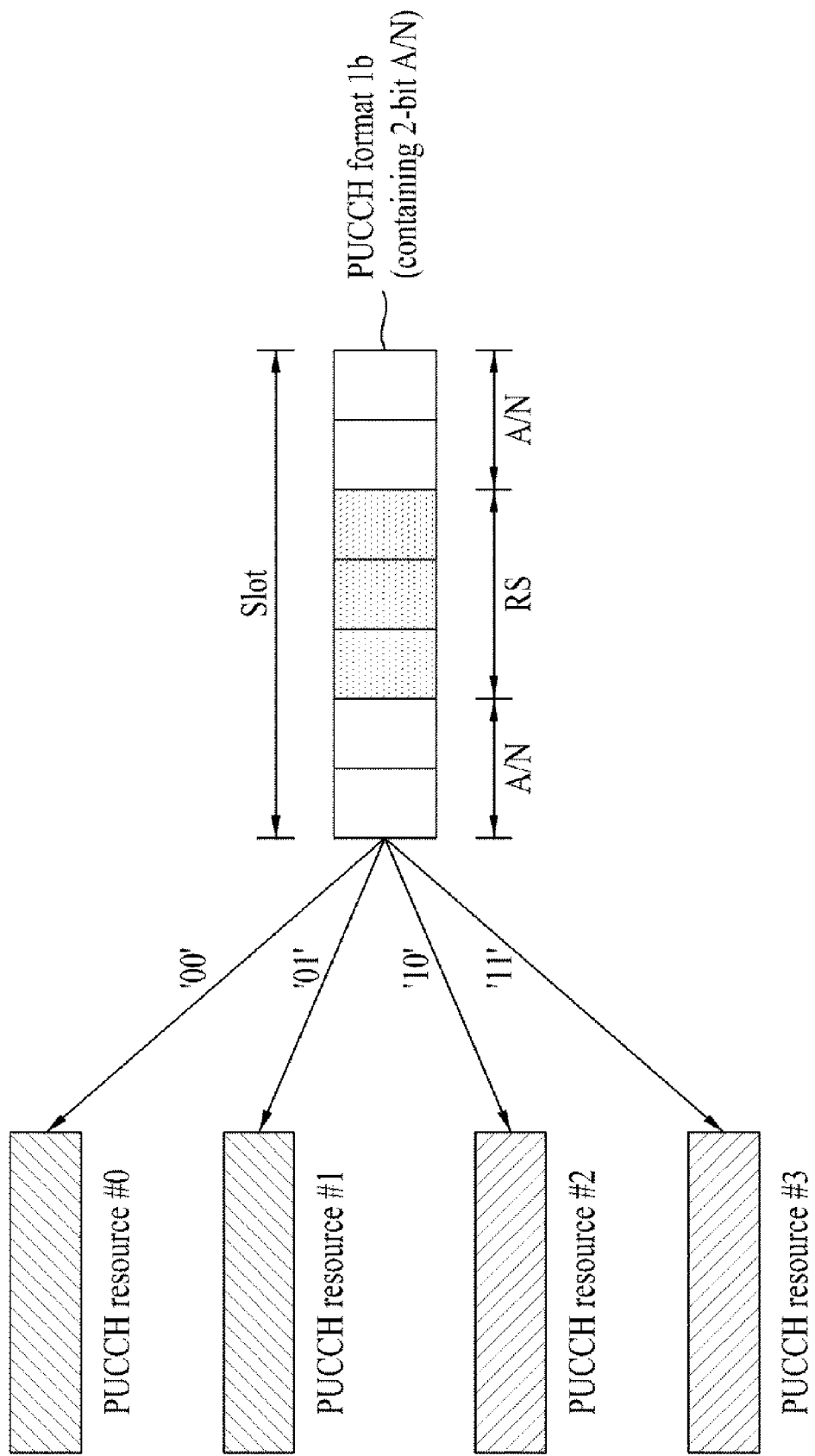

FIGS. 30 and 31 exemplarily show ACK/NACK transmission based on channel selection.

Referring to FIG. 30, in association with the PUCCH format 1b for 2-bit ACK/NACK feedback, two PUCCH resources (PUCCH resources #0 and #1) may be configured. When transmitting the 3-bit ACK/NACK information, 2 bits from among 3-bit ACK/NACK information may be expressed through the PUCCH format 1b, and the remaining one bit may be expressed according to a PUCCH resource selected from among two PUCCH resources. For example, if UCI is transmitted using the PUCCH resource #0, this means information '0'. If UCI is transmitted using the PUCCH resource #1, this means information '1'. Therefore, 1 bit (0 or 1) can be expressed by selecting one of two PUCCH resources, thereby expressing the additional 1-bit ACK/NACK information along with the 2-bit ACK/NACK information expressed through the PUCCH format 1b.

Referring to FIG. 30, in association with the PUCCH format 1b for 2-bit ACK/NACK feedback, four PUCCH resources (PUCCH resources #0 to #4) may be configured. When transmitting the 4-bit ACK/NACK information, 2 bits from among 4-bit ACK/NACK information may be expressed through 2-bit information carried by the PUCCH format 1b, and the remaining 2 bits may be expressed according to a PUCCH resource selected from among four PUCCH resources. For example, if UCI is transmitted using the PUCCH resource #0, this means information '00'. If UCI is transmitted using the PUCCH resource #1, this means information '01'. Therefore, 2 bits (00, 01, 10, or 11) can be expressed by selecting one of four PUCCH resources, thereby expressing the additional 2-bit ACK/NACK information along with the 2-bit ACK/NACK information expressed through the PUCCH format 1b.

In other words, n bits explicitly carried by one PUCCH resource may originally represent a maximum of 2n ACK/NACK states. In contrast, provided that x (where (m≥1≥x) PUCCH resources from among m (where m>1) PUCCH resources used for channel selection are selected for ACK/NACK information transmission, the number of ACK/NACK states capable of being expressed is increased to $(2^n)*(_mC_x)$. For example, referring to FIG. 30, a maximum of 4 ACK/NACK states $((2^1)*(_2C_1)=4)$ (i.e., 4-bit ACK/NACK information) may be expressed by channel selection using the PUCCH format 1b carrying transmission bits composed of 2 bits. In another example, referring to FIG. 31, a maximum of 16 ACK/NACK states $((2^2)*(_4C_1)=16)$ (i.e., 16-bit ACK/NACK information) may be expressed by channel selection using the PUCCH format 1b carrying 2-bit transmission bits.

In the present embodiment, it may be predetermined which bit must be transmitted on a certain PUCCH resource under a certain ACK/NACK state. That is, the mapping relationship of ACK/NACK state/PUCCH resource/transmission bits (or complex modulation symbol) is predefined, such that the predefined mapping relationship may be prestored in the BS and UE. Tables 5 to 10 exemplarily show the mapping tables for channel selection. Specifically, Tables 5 to 7 shows the mapping table for ACK/NACK transmission for multiple CCs, and Tables 8 to 10 shows the mapping table for ACK/NACK transmission for multiple subframes.

TABLE 5

Transmission of PUCCH Format 1b ACK/NACK channel selection for A = 2

| HARQ-ACK(0) | HARQ-ACK(1) | $n^{(1)}_{PUCCH,i}$ | b(0), b(1) |
|---|---|---|---|
| ACK | ACK | $n^{(1)}_{PUCCH,1}$ | 1, 1 |
| ACK | NACK/DTX | $n^{(1)}_{PUCCH,0}$ | 1, 1 |
| NACK/DTX | ACK | $n^{(1)}_{PUCCH,1}$ | 0, 0 |
| NACK | NACK/DTX | $n^{(1)}_{PUCCH,0}$ | 0, 0 |
| DTX | NACK/DTX | No transmission | |

TABLE 6

Transmission of PUCCH Format 1b ACK/NACK channel selection for A = 3

| HARQ-ACK(0) | HARQ-ACK(1) | HARQ-ACK(2) | $n^{(1)}_{PUCCH,i}$ | b(0), b(1) |
|---|---|---|---|---|
| ACK | ACK | ACK | $n^{(1)}_{PUCCH,1}$ | 1, 1 |
| ACK | NACK/DTX | ACK | $n^{(1)}_{PUCCH,1}$ | 1, 0 |
| NACK/DTX | ACK | ACK | $n^{(1)}_{PUCCH,1}$ | 0, 1 |
| NACK/DTX | NACK/DTX | ACK | $n^{(1)}_{PUCCH,2}$ | 1, 1 |
| ACK | ACK | NACK/DTX | $n^{(1)}_{PUCCH,0}$ | 1, 1 |
| ACK | NACK/DTX | NACK/DTX | $n^{(1)}_{PUCCH,0}$ | 1, 0 |
| NACK/DTX | ACK | NACK/DTX | $n^{(1)}_{PUCCH,0}$ | 0, 1 |
| NACK/DTX | NACK/DTX | NACK | $n^{(1)}_{PUCCH,2}$ | 0, 0 |
| NACK | NACK/DTX | DTX | $n^{(1)}_{PUCCH,0}$ | 0, 0 |
| NACK/DTX | NACK | DTX | $n^{(1)}_{PUCCH,0}$ | 0, 0 |
| DTX | DTX | DTX | No transmission | |

TABLE 7

Transmission of PUCCH Format 1b ACK/NACK channel selection for A = 4

| HARQ-ACK(0) | HARQ-ACK(1) | HARQ-ACK(2) | HARQ-ACK(3) | $n^{(1)}_{PUCCH,i}$ | b(0), b(1) |
|---|---|---|---|---|---|
| ACK | ACK | ACK | ACK | $n^{(1)}_{PUCCH,1}$ | 1, 1 |
| ACK | NACK/DTX | ACK | ACK | $n^{(1)}_{PUCCH,2}$ | 0, 1 |
| NACK/DTX | ACK | ACK | ACK | $n^{(1)}_{PUCCH,1}$ | 0, 1 |
| NACK/DTX | NACK/DTX | ACK | ACK | $n^{(1)}_{PUCCH,3}$ | 1, 1 |
| ACK | ACK | ACK | NACK/DTX | $n^{(1)}_{PUCCH,1}$ | 1, 0 |
| ACK | NACK/DTX | ACK | NACK/DTX | $n^{(1)}_{PUCCH,2}$ | 0, 0 |
| NACK/DTX | ACK | ACK | NACK/DTX | $n^{(1)}_{PUCCH,1}$ | 0, 0 |
| NACK/DTX | NACK/DTX | ACK | NACK/DTX | $n^{(1)}_{PUCCH,3}$ | 1, 0 |
| ACK | ACK | NACK/DTX | ACK | $n^{(1)}_{PUCCH,2}$ | 1, 1 |
| ACK | NACK/DTX | NACK/DTX | ACK | $n^{(1)}_{PUCCH,2}$ | 1, 0 |
| NACK/DTX | ACK | NACK/DTX | ACK | $n^{(1)}_{PUCCH,3}$ | 0, 1 |
| NACK/DTX | NACK/DTX | NACK/DTX | ACK | $n^{(1)}_{PUCCH,3}$ | 0, 0 |
| ACK | ACK | NACK/DTX | NACK/DTX | $n^{(1)}_{PUCCH,0}$ | 1, 1 |
| ACK | NACK/DTX | NACK/DTX | NACK/DTX | $n^{(1)}_{PUCCH,0}$ | 1, 0 |
| NACK/DTX | ACK | NACK/DTX | NACK/DTX | $n^{(1)}_{PUCCH,0}$ | 0, 1 |
| NACK/DTX | NACK | NACK/DTX | NACK/DTX | $n^{(1)}_{PUCCH,0}$ | 0, 0 |
| NACK | NACK/DTX | NACK/DTX | NACK/DTX | $n^{(1)}_{PUCCH,0}$ | 0, 0 |
| DTX | DTX | NACK/DTX | NACK/DTX | No transmission | |

In Tables 5 to 7, A is the number of PUCCH resources available to channel selection, and $n^{(1)}_{PUCCH,i}$ (i=0, ..., A−1) is the index of the i-th PUCCH resource from among A PUCCH resources used for channel selection. From among A CCs configured for the UE, HARQ-ACK(j) means an ACK/NACK response for the j-th CC (i=0, ..., A−1), and b(0) and b(1) indicate bit information actually transmitted on a corresponding PUCCH resource.

TABLE 8

Transmission of ACK/NACK multiplexing for M = 2

| HARQ-ACK(0) | HARQ-ACK(1) | $n^{(1)}_{PUCCH,i}$ | b(0), b(1) |
|---|---|---|---|
| ACK | ACK | $n^{(1)}_{PUCCH,1}$ | 1, 1 |
| ACK | NACK/DTX | $n^{(1)}_{PUCCH,0}$ | 0, 1 |
| NACK/DTX | ACK | $n^{(1)}_{PUCCH,1}$ | 0, 0 |
| NACK/DTX | NACK | $n^{(1)}_{PUCCH,1}$ | 1, 0 |
| NACK | DTX | $n^{(1)}_{PUCCH,0}$ | 1, 0 |
| DTX | DTX | No transmission | |

TABLE 9

Transmission of ACK/NACK multiplexing for M = 3

| HARQ-ACK(0) | HARQ-ACK(1) | HARQ-ACK(2) | $n^{(1)}_{PUCCH,i}$ | b(0), b(1) |
|---|---|---|---|---|
| ACK | ACK | ACK | $n^{(1)}_{PUCCH,2}$ | 1, 1 |
| ACK | ACK | NACK/DTX | $n^{(1)}_{PUCCH,1}$ | 1, 1 |
| ACK | NACK/DTX | ACK | $n^{(1)}_{PUCCH,0}$ | 1, 1 |
| ACK | NACK/DTX | NACK/DTX | $n^{(1)}_{PUCCH,0}$ | 0, 1 |
| NACK/DTX | ACK | ACK | $n^{(1)}_{PUCCH,2}$ | 1, 0 |
| NACK/DTX | ACK | NACK/DTX | $n^{(1)}_{PUCCH,1}$ | 0, 0 |
| NACK/DTX | NACK/DTX | ACK | $n^{(1)}_{PUCCH,2}$ | 0, 0 |
| DTX | DTX | NACK | $n^{(1)}_{PUCCH,2}$ | 0, 1 |
| DTX | NACK | NACK/DTX | $n^{(1)}_{PUCCH,1}$ | 1, 0 |
| NACK | NACK/DTX | NACK/DTX | $n^{(1)}_{PUCCH,0}$ | 1, 0 |
| DTX | DTX | DTX | No transmission | |

TABLE 10

Transmission of ACK/NACK multiplexing for M = 4

| HARQ-ACK(0) | HARQ-ACK(1) | HARQ-ACK(2) | HARQ-ACK(3) | $n^{(1)}_{PUCCH,i}$ | b(0), b(1) |
|---|---|---|---|---|---|
| ACK | ACK | ACK | ACK | $n^{(1)}_{PUCCH,1}$ | 1, 1 |
| ACK | ACK | ACK | NACK/DTX | $n^{(1)}_{PUCCH,1}$ | 1, 0 |
| NACK/DTX | NACK/DTX | NACK/DTX | DTX | $n^{(1)}_{PUCCH,2}$ | 1, 1 |
| ACK | ACK | NACK | DTX | $n^{(1)}_{PUCCH,1}$ | 1, 0 |
| NACK | DTX | DTX | DTX | $n^{(1)}_{PUCCH,0}$ | 1, 0 |
| ACK | ACK | NACK/DTX | NACK/DTX | $n^{(1)}_{PUCCH,1}$ | 1, 0 |
| ACK | NACK/DTX | ACK | ACK | $n^{(1)}_{PUCCH,3}$ | 0, 1 |
| NACK/DTX | NACK/DTX | NACK/DTX | NACK | $n^{(1)}_{PUCCH,3}$ | 1, 1 |
| ACK | NACK/DTX | ACK | NACK/DTX | $n^{(1)}_{PUCCH,2}$ | 0, 1 |
| ACK | NACK/DTX | NACK/DTX | ACK | $n^{(1)}_{PUCCH,0}$ | 0, 1 |
| ACK | NACK/DTX | NACK/DTX | NACK/DTX | $n^{(1)}_{PUCCH,0}$ | 1, 1 |
| NACK/DTX | ACK | ACK | ACK | $n^{(1)}_{PUCCH,3}$ | 0, 1 |
| NACK/DTX | NACK | DTX | DTX | $n^{(1)}_{PUCCH,1}$ | 0, 0 |
| NACK/DTX | ACK | ACK | NACK/DTX | $n^{(1)}_{PUCCH,2}$ | 1, 0 |
| NACK/DTX | ACK | NACK/DTX | ACK | $n^{(1)}_{PUCCH,3}$ | 1, 0 |
| NACK/DTX | ACK | NACK/DTX | NACK/DTX | $n^{(1)}_{PUCCH,1}$ | 0, 1 |
| NACK/DTX | NACK/DTX | ACK | ACK | $n^{(1)}_{PUCCH,3}$ | 0, 1 |
| NACK/DTX | NACK/DTX | ACK | NACK/DTX | $n^{(1)}_{PUCCH,2}$ | 0, 0 |
| NACK/DTX | NACK/DTX | NACK/DTX | ACK | $n^{(1)}_{PUCCH,3}$ | 0, 0 |
| DTX | DTX | DTX | DTX | No transmission | |

In Tables 8 to 10, M is the number of PUCCH resources capable of being used for channel selection, $n^{(1)}_{PUCCH,i}$ (i=0, ..., M−1) is an index of the i-th PUCCH resource from among A PUCCH resources used for channel selection. From among DL transmission in M subframes that allow the UE to operate as one ACK/NACK feedback, HARQACK(j) means the ACK/NACK response for the j-th DL transmission (i=0, ..., M−1), and b(0) and b(1) indicate bit information actually transmitted on the corresponding PUCCH resource.

The mapping tables shown in Tables 5 to 10 are disclosed only illustrative purposes. The mapping tables different from those of Tables 5 to 10 may be defined and stored in the BS and UE.

ACK/NACK information indicating multiple ACK/NACK responses for several subframes, and/or ACK/NACK information indicating multiple ACK/NACK responses for several CCs may be fed back to the BS at one ACK/NACK feedback instance using the PUCCH format 1b and channel selection, the PUCCH format 3, or the PUCCH format 3 and channel selection.

For convenience of description, the embodiments of the present invention will hereinafter be described on the following assumption. However, the scope or spirit of the present embodiments is not limited only to the following assumptions (1) to (6), and the present embodiments can also be applied to other examples as necessary.

(1) One PCell and one or more SCells may be present.
(2) PDSCH with corresponding PDCCH may be present in PCell and SCell(s).
(3) PDCCH indicating SPS release may be present only in PCell.
(4) PDSCH without PDCCH (=SPS PDSCH) may be present only in PCell.
(5) Cross-scheduling by PCell for SCell(s) is supported.
(6) Cross-scheduling by SCell(s) for PCell is not supported.
(7) Cross-scheduling by SCell(s) for other SCell(s) can be supported.

The PUCCH formats 1/1a/1b, 2 and 3 for use in the LTE-A system can independently support Spatial Orthogonal-Resource Transmit Diversity (SORTD), and the SORTD supported by each PUCCH format may be independently configured for each UE through RRC signaling. The SORTD may indicate a transmission scheme for transmitting the same information using several physical resources (code and/or time/frequency region, etc.). Differently from the LTE system in which the UE supports only one transmission antenna point, the UE for use in the LTE-A system can support one or more Tx antenna ports. Therefore, the LTE-A system may use the SORTD that supports multiple Tx antenna ports for PUCCH transmission.

In the conventional LTE system (e.g., LTE Release 8 system), the UE supports only one Tx antenna port, such that a method for transmitting a PUCCH through two or more Tx antenna ports is not defined. PUCCH transmission is defined on the assumption of only one Tx antenna port, such that it is impossible for several antenna ports to use the SORTD according to the LTE standard. In contrast, the conventional LTE system (LTE Release 8 system) supports the scheme for repeatedly transmitting one ACK/NACK feedback for a plurality of subframes so as to support the same coverage as in other channels (e.g., PRACH and the like). The above-mentioned scheme is called ACK/NACK repetition (hereinafter referred to as A/N repetition). The conventional LTE system enables the UE to support only one Tx antenna port, and does not define the method for transmitting PUCCH through two or more Tx antenna ports. Even in the case of A/N repetition transmission, a method for repeatedly transmitting ACK/NACK information through two or more antenna ports is not defined yet. In addition, when supporting the SORTD and/or A/N repetition, a method for performing ACK/NACK feedback by channel selection using PUCCH format 1a/1b and a method for performing ACK/NACK feedback using the PUCCH format 3 are not defined. Therefore, a method for operating the SORTD in relation to the A/N repetition transmission will be given below.

The present invention relates to a method for operating/performing the SORTD in association with the A/N repetition under the carrier aggregation (CA) environment for aggregating one or more carriers to provide a communication service. If the A/N repetition is configured under the condition that the SORTD is configured, or if the SORTD and A/N repetition are simultaneously configured, the embodiments of the present invention can support the SORTD and the A/N repetition. A detailed description of the embodiments in association with the following methods is as follows.

• Case in which PUCCH format 1/1a/1b with is configured and then (or simultaneously) A/N repetition is configured.

1. In case of ACK/NACK feedback for PDSCH with PDCCH or PDCCH indicating SPS release, i.e. in case that at least one PDCCH being subjected to ACK/NACK feedback is detected, the following methods 1 to 3 may be used.

METHOD 1: In case of A/N repetition, the SORTD is used in every A/N transmission.

METHOD 2: In case of A/N repetition, the SORTD is not used in every transmission.

METHOD 3: In case of A/N repetition, the SORTD is used only in the first transmission.

2. In case of ACK/NACK feedback for DL SPS only, i.e., in case that no PDCCH is detected but a DL SPS being subjected to ACK/NACK feedback is detected, the following methods 1 to 3 may be used.

METHOD 1: In case of A/N repetition, the SORTD is used in every transmission.

METHOD 2: In case of A/N repetition, the SORTD is not used in every transmission.

METHOD 3: In case of A/N repetition, the SORTD is used only in the first transmission.

• Case in which PUCCH format 3 with SORTD is configured and then (or simultaneously) A/N repetition is configured.

1. In case of ACK/NACK feedback for PDSCH with PDCCH or PDCCH indicating SPS release, i.e. in case that at least one PDCCH being subjected to ACK/NACK feedback is detected, the following methods 1 to 3 may be used.

METHOD 1: In case of A/N repetition, the SORTD is used in every transmission.

METHOD 2: In case of A/N repetition, the SORTD is not used in every transmission.

METHOD 3: In case of A/N repetition, the SORTD is used only in the first transmission.

• Case in which channel selection with SORTD is configured and then (or simultaneously) A/N repetition is configured.

1. In case of ACK/NACK feedback for PDSCH with PDCCH or PDCCH indicating SPS release, i.e. in case that at least one PDCCH being subjected to ACK/NACK feedback is detected, the following methods 1 to 6 may be used.

METHOD 1: In case of A/N repetition, the SORTD is used in every transmission.

METHOD 2: In case of A/N repetition, the SORTD is not used in every transmission.

METHOD 3: In case of A/N repetition, the SORTD is used only in the first transmission.

METHOD 4: In case of A/N repetition, the SORTD is used in every transmission, and channel selection is used only in the first transmission.

METHOD 5: In case of A/N repetition, the SORTD is not used in every transmission, and channel selection is used only in the first transmission.

METHOD 6: In case of A/N repetition, the SORTD is used only in first transmission, and channel selection is used only in the first transmission.

• Method for Preventing SORTD and A/N Repetition from being Simultaneously Used

The embodiments of the present invention according to individual cases will hereinafter be described. In the drawings illustrating the embodiments, the reference symbol 'A/N' with SORTD means that ACK/NACK information is transmitted through two antenna ports such that SORTD is used, and the other reference symbol 'A/N' without SORTD means that ACK/NACK information is transmitted through one antenna port such that SORTD is not used.

In the embodiments of the present invention, implicit mapping may be applied not only to PUCCH resource allocation for ACK/NACK feedback in association with 'PDSCH with PDCCH' but also to PUCCH resource allocation for ACK/NACK feedback in association with DL SPS release without additional signaling. For example, the PUCCH resource index may be calculated from the lowest CCE number of a PDCCH that is subjected to ACK/NACK feedback and received or detected first. That is, the PUCCH resource index may be calculated as a function of the lowest CCE index $n_{CCE}$. For example, if SORTD is configured, i.e., if SORTD is activated, a PUCCH resource index for the first antenna port (hereinafter referred to as 'p0') may be denoted by $n^{(1,p0)}_{PUCCH}$ as shown in the following Math Figure 6, and a PUCCH resource index for the second antenna port (hereinafter referred to as 'p1') may be denoted by $n^{(1,p1)}_{PUCCH}$ as shown in the following Math Figure 7.

MathFigure 6

$$n_{PUCCH}^{(1,p0)} = n_{CCE} + N_{PUCCH}^{(1)} \quad \text{[Math.6]}$$

MathFigure 7

$$n_{PUCCH}^{(1,p1)} = n_{CCE} + 1 + N_{PUCCH}^{(1)} \quad \text{[Math.7]}$$

If the value of $n^{(1,p)}_{PUCCH}$ is changed, PUCCH resources are changed. That is, at least one of various values (e.g., PRB index $n_{PRB}$, orthogonal sequence index $n^{(p)}{}_{OC}(n_s)$, and cyclic shift value $n^{(p)}{}_{OC}(n_s,1)$) constructing PUCCH resources is changed. In this case, $n_s$ is a slot index within a radio frame, and 1 is a subcarrier index. For reference, Tables 11 and 12 exemplarily show orthogonal sequences for PUCCH format 1/1a/1b. Specifically, Table 11 exemplarily shows the orthogonal sequence for $N^{PUCCH}{}_{SF}=4$, and Table 12 exemplarily shows the orthogonal sequence for $N^{PUCCH}{}_{SF}=3$.

TABLE 11

| Orthogonal sequences $[w(0) \ldots w(N^{PUCCH}{}_{SF} - 1)]$ for $N^{PUCCH}{}_{SF} = 4$ | |
|---|---|
| Sequence index $n^{(p)}{}_{oc}(n_s)$ | Orthogonal sequences $[w(0) \ldots w(N^{PUCCH}{}_{SF} - 1)]$ |
| 0 | [+1 +1 +1 +1] |
| 1 | [+1 −1 +1 −1] |
| 2 | [+1 −1 −1 +1] |

TABLE 12

| Orthogonal sequences $[w(0) \ldots w(N^{PUCCH}{}_{SF} - 1)]$ for $N^{PUCCH}{}_{SF} = 3$ | |
|---|---|
| Sequence index $n^{(p)}{}_{oc}(n_s)$ | Orthogonal sequences $[w(0) \ldots w(N^{PUCCH}{}_{SF} - 1)]$ |
| 0 | [+1 +1 +1] |
| 1 | [+1 $+e^{j2\pi/3}$ $+e^{j4\pi/3}$] |
| 2 | [+1 $+e^{j4\pi/3}$ $+e^{j3\pi/3}$] |

In the embodiments associated with ACK/NACK feedback for 'PDSCH with PDCCH' and/or DL SPS, it is assumed that the resource allocation method for deriving PDCCH resource index using the lowest CCE index is applied to the embodiments of the present invention.

On the other hand, in the embodiments of the present invention, A/N repetition may be configured through RRC signaling. The A/N repetition setting or release configured in the UE may be notified through the RRC message. The RRC message may include specific information indicating the number ($N_{ANRep}$) of repetitions. That is, the BS may configure or release the A/N repetition in the UE. Information regarding the number ($N_{ANRep}$) of ACK/NACK repeated transmissions may be transmitted to the UE. Although the following embodiments are focused upon the specific case of $N_{ANRep}=4$ for convenience of description, the scope or spirit of the present invention is not limited thereto, and can also be applied to other numbers ($N_{ANRep}$) other than $N_{ANRep}=4$. In addition, the A/N repetition configuration and/or SORTD activation, and the channel selection construction may be transmitted from the BS to the UE through higher layer signaling (e.g., the RRC message).

• PUCCH Format 1/1a/1b with SORTD Vs. ACK/NACK Repetition

The embodiment for the case in which A/N repetition is configured under the condition that (or at the same time that) SORTD is activated using PUCCH format 1/1a/1b will hereinafter be described.

1. In case of ACK/NACK feedback for 'PDSCH with PDCCH' or ACK/NACK feedback for 'DL SPS release', i.e., if at least one PDCCH capable of being applied to the implicit mapping is detected, Embodiment 1 to Embodiment 3 may be used.

Embodiment 1

Method 1

In case of A/N repetition, SORTD is used in all transmission.

_$1^{st}$ transmission to $N_{ANRep}$-th transmission: Transmission of PUCCH format 1/1a/1b using SORTD (denoted by 'PUCCH format 1/1a/1b with SORTD')

In general, A/N repetition may be used to increase the coverage of a UE having a limited coverage. That is, compared to other channels such as PRACH and the like, if the ACK/NACK channel has an insufficient Signal-to-Noise Ratio (SNR) margin on a link budget, A/N repetition may be configured in such a manner that the ACK/NACK channel can support the same coverage as in other channels. Therefore, the A/N repetition configuration may be interpreted that the corresponding UE has the small coverage. Herein, the coverage means a specific range to which the UL signal transmitted by the corresponding UE can be successfully delivered. In view of the above-mentioned situation, according to the first embodiment (Embodiment 1), in the case where SORTD is pre-configured or A/N repetition and SORTD are simultaneously configured, the UE continuously uses the SORTD in order that an UL signal of the UE can be well detected by the BS. The UE may be configured to transmit ACK/NACK information to the BS using the SORTD irrespective of A/N repetition, and the BS may be configured to determine the execution of ACK/NACK information transmission using the SORTD irrespective of A/N repetition. That is, if the configured SORTD is present in case of the A/N repetition, a communication system is configured in such a manner that SORTD and A/N repetition are simultaneously applied to the communication system.

Figure 32:
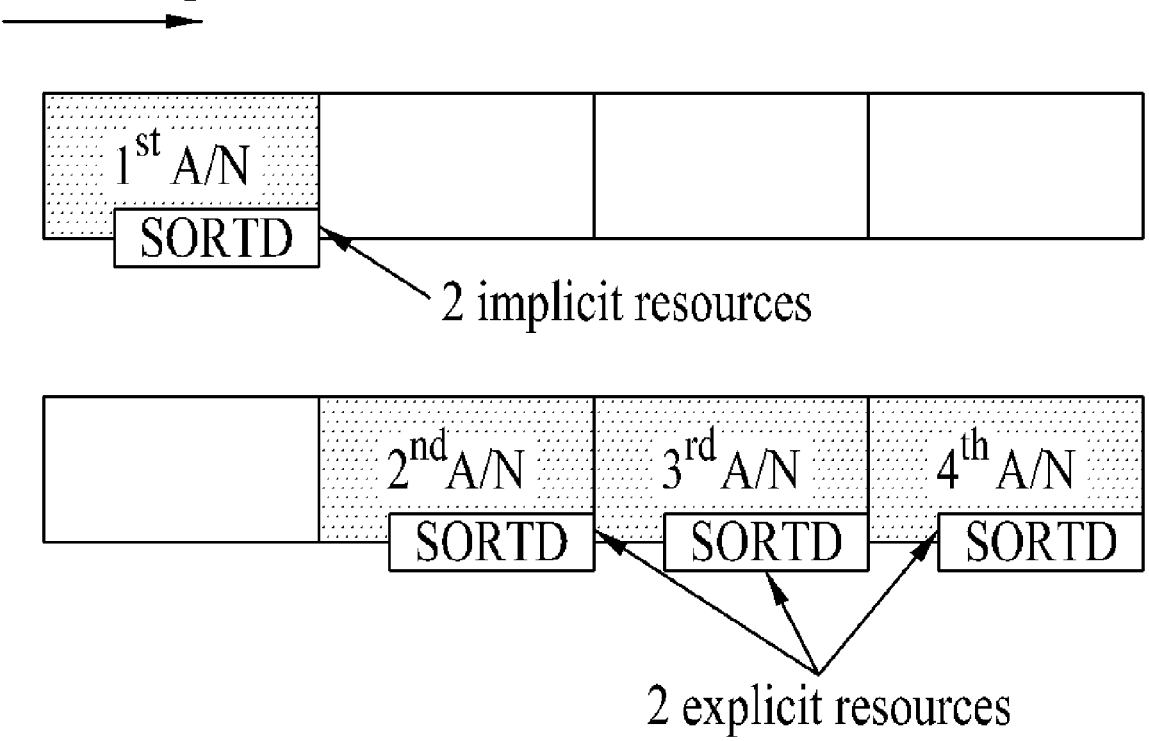
FIG. 32 exemplarily shows ACK/NACK feedback according to a first embodiment of the present invention.

FIG. 32 exemplarily shows ACK/NACK feedback according to a first embodiment of the present invention.

The UE configured to perform SORTD using two antenna ports may perform the ACK/NACK repetition using the following resources.

(1) First Transmission:

The PUCCH resource index derived from the lowest CCE index and the PUCCH resource index derived from the lowest CCE index+1 are used for SORTD based on two antenna ports. That is, for first transmission of the ACK/NACK information, the UE may use the SORTD using PUCCH resources decided by the implicit mapping. In this case, in association with the antenna port (p0), PUCCH resource index for ACK/NACK transmission may be determined according to Math Figure 6. In association with the antenna port (p1), PUCCH resource index for first ACK/NACK transmission may be determined according to Math Figure 7.

(2) Second Transmission~$N_{ANRep}$-th Transmission:

Two PUCCH resource indexes signaled by the higher layer (e.g., RRC) may be used for two antenna ports. That is, transmission actions starting from the second transmission may support the SORTD using PUCCH resources decided by the explicit mapping. One of the following embodiments may be used for the explicit mapping.

(2-1) If SORTD is configured, i.e., if UCI transmission through several antenna ports is configured, the BS may inform the UE of PUCCH resource indexes to be used for each antenna port through higher layer signaling. For example, if UL transmission through two antenna ports is configured for the UE, the BS may signal two PUCCH resource indexes for the two antenna ports, respectively. That is, PUCCH resource index ($n^{(1,p0)}{}_{PUCCH-AN-Rep}$) to be used by the antenna port (p0) from the second transmission and PUCCH resource index ($n^{(1,p1)}{}_{PUCCH-AN-Rep}$) to be used by the antenna port (p1) from the second transmission may be transmitted from the BS to the UE through higher layer signaling.

(2-2) As shown in the explicit mapping embodiment (2-1), although both PUCCH resource index ($n^{(1,p1)}{}_{PUCCH-AN-Rep}$)

to be used by the antenna port (p0) and PUCCH resource index ($n^{(1,p1)}_{PUCCH-AN-Rep}$) to be used by the antenna port (p1) may be directly signaled to the UE, other predetermined parameters, (for example, offset values for CCE index used for the explicit mapping and PUCCH resource index determined by the explicit mapping) may be used to indicate $n^{(1,p0)}_{PUCCH-AN-Rep}$ and $n^{(1,p1)}_{PUCCH-AN-Rep}$ to the UE. Alternatively, only $n^{(1,p0)}_{PUCCH-AN-Rep}$ may be directly signaled to the UE. $n^{(1,p1)}_{PUCCH-AN-Rep}$ may be signaled in the form of an offset format for $n^{(1,p0)}_{PUCCH-AN-Rep}$, and may also be determined from $n^{(1,p0)}_{PUCCH-AN-Rep}$ by the explicit mapping.

(2-3) Predetermined numbers of PUCCH resource index pairs ($n^{(1,p0)}_{PUCCH-AN-Rep}$ and $n^{(1,p1)}_{PUCCH-AN-Rep}$)s may be pre-signaled. One of the predetermined number of PUCCH resource index pairs may be indicated when the A/N repetition is configured, whereby PUCCH resource indexes to be used by the antenna ports (p0 and p1) is specified in case of the A/N repetition transmission.

According to the above description of the first embodiment (Embodiment 1), a method for deciding the PUCCH resource index at the $N_{ANRep}$-th transmission is changed from the first ACK/NACK transmission and the second ACK/NACK transmission. That is, whereas the PUCCH resource index for the first ACK/NACK transmission is decided by the implicit mapping, PUCCH resource index for the second~$N_{ANRep}$-th ACK/NACK transmission is decided by the explicit mapping. In contrast, the UE and the BS may also be configured in such a manner that only one of the implicit mapping and the explicit mapping is used in all transmission (i.e., first transmission~$N_{ANRep}$-th transmission)

Embodiment 2

Method 2

In case of A/N repetition, SORTD is not used in every transmission.
_First transmission~$N_{ANRep}$-th transmission: Transmission of PUCCH format 1/1a/1b without SORTD In order to implement SORTD, additional PUCCH resources are needed. If A/N repetition is applied, the number of PUCCH resources needed for ACK/NACK feedback is increased in proportion to the number of A/N repetition times and the number of antenna ports participating in the SORTD. For example, if there is a need to support the SORTD based on two antenna ports and $N_{ARep}$ A/N repetitions, the UE may further require a maximum of $2*N_{ARep}$-times PUCCH resources for one ACK/NACK feedback, as compared to the other case in which the SORTD and the A/N repetition are not configured, such that the ACK/NACK feedback may result in large overhead in the system. In order to reduce large resource overhead, if the A/N repetition is configured, the SORTD may be turned off until the A/N repetition is released. The BS that has signaled the A/N repetition to the UE may be configured to receive ACK/NACK information from the UE on the assumption that the UE performs the A/N repetition only through one antenna port. The coverage of the PUCCH extended by the SORTD may be kept in a similar range by such A/N repetition. Therefore, the second embodiment (Embodiment 2) constructs the communication system in such a manner that the A/N feedback is transmitted from the UE to the BS by switching off the SORTD during the A/N repetition, resulting in reduction in resource overhead encountered by the A/N feedback. According to the second embodiment (Embodiment 2), only the PUCCH resource index to be used when the first antenna port performs A/N repetition needs to be signaled to the UE. That is, PUCCH resource index for the second antenna port need not be separately signaled to the UE. Therefore, the second embodiment (Embodiment 2) has an advantage in that not only UL resource overhead but also higher layer (e.g., RRC) signaling overhead can be reduced.

Figure 33:
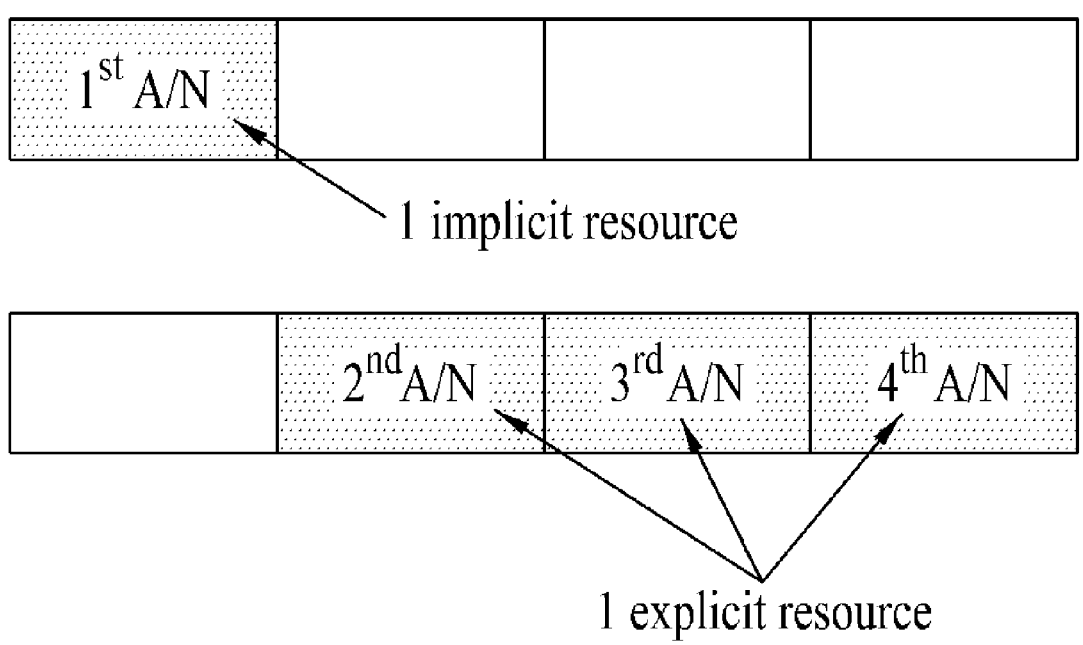
FIG. 33 exemplarily shows ACK/NACK feedback according to a second embodiment of the present invention.

FIG. 33 exemplarily shows ACK/NACK feedback according to a second embodiment of the present invention.

Referring to FIG. 33, the UE having two or more antenna ports may perform ACK/NACK repetition using the following resources.

(1) First transmission: In the first transmission, first ACK/NACK transmission may be performed through one antenna port using PUCCH resource index derived from the CCE index. PUCCH resource index used by the antenna port may be determined according to Math Figure 6 (or Math Figure 1). Since SORTD is not used, the UE does not transmit ACK/NACK information through other antenna ports.

(2) Second Transmission~$N_{ANRep}$-th Transmission:

From the second transmission, PUCCH resource index for A/N repetition may be determined using parameters that are signaled to the UE by the BS for such A/N repetition through higher layer signaling (e.g., RRC signaling). That is, PUCCH resources decided by the explicit mapping are used for the A/N repetition from the second transmission. From the second transmission, the UE may perform A/N repetition through one antenna port on PUCCH resources indicated by PUCCH resource index decided by the above-mentioned parameters. By the higher layer signaling, PUCCH resource index may enable the BS to directly inform the UE of ACK/NACK transmission starting from the second transmission. Alternatively, PUCCH resource index for ACK/NACK transmission starting from the second transmission may also be indirectly indicated by specific other parameters (for example, the CCE index used for the implicit mapping or the offset of the PUCCH resource index decided by the implicit mapping).

According to the second embodiment (Embodiment 2), the PUCCH resource index is determined by the implicit mapping in the first ACK/NACK transmission. However, from the second transmission, PUCCH resource index is determined by the explicit mapping for which the BS explicitly signals PUCCH resources for ACK/NACK transmission to the UE. In contrast, the UE and the BS may also be configured in such a manner that only one of the implicit mapping and the explicit mapping is used in all transmission (i.e., first transmission~$N_{ANRep}$-th transmission).

Embodiment 3

Method 3

In case of A/N repetition, SORTD is used only in the first transmission.
_First transmission: Transmission of PUCCH format 1/1a/1b supporting SORTD (denoted by 'PUCCH format 1/1a/1b with SORTD')
_Second transmission~$N_{ANRep}$-th transmission: PUCCH format 1/1a/1b without SORTD In the first ACK/NACK transmission from among the A/N repetition, PUCCH resources to be used in the second antenna ports can be implicitly determined, such that SORTD can be supported without signaling. Especially, if SORTD is configured in the UE, the BS may not assign a PUCCH resource derived from the ($n_{CCE}+1$) function for the second antenna port for the SORTD to other UEs, and may reserve the PUCCH resource. In this case, if the SORTD is not used even in the first transmission during the A/N repetition, the reserved PUCCH resource is not used, resulting in a waste of reserved PUCCH resource. In order to solve the above-mentioned problems, under the condition that the SORTD is pre-configured or the SORTD is configured simultaneously with the A/N repetition configuration, the third embodiment (Embodiment 3) supports the SORTD only in the first transmission from among the A/N repetition, and turns off the SORTD in the remaining transmissions (second transmission~$N_{ANRep}$-th transmission). According to the third embodiment (Embodiment 3), instead of turning off the SORTD in all transmission, the SORTD is supported in the first transmission in which PUCCH resources are determined by the implicit mapping, such that the PUCCH resource derived from $n_{CCE}+1$ is prevented from being unused and wasted. In addition, from the second transmission, since the A/N repetition is performed only through one antenna port without using the SORTD, resource overhead for UCI transmission is reduced, and PUCCH resources to be used in the second antenna port need not be separately signaled, resulting in a reduction in higher layer signaling overhead.

Figure 34:
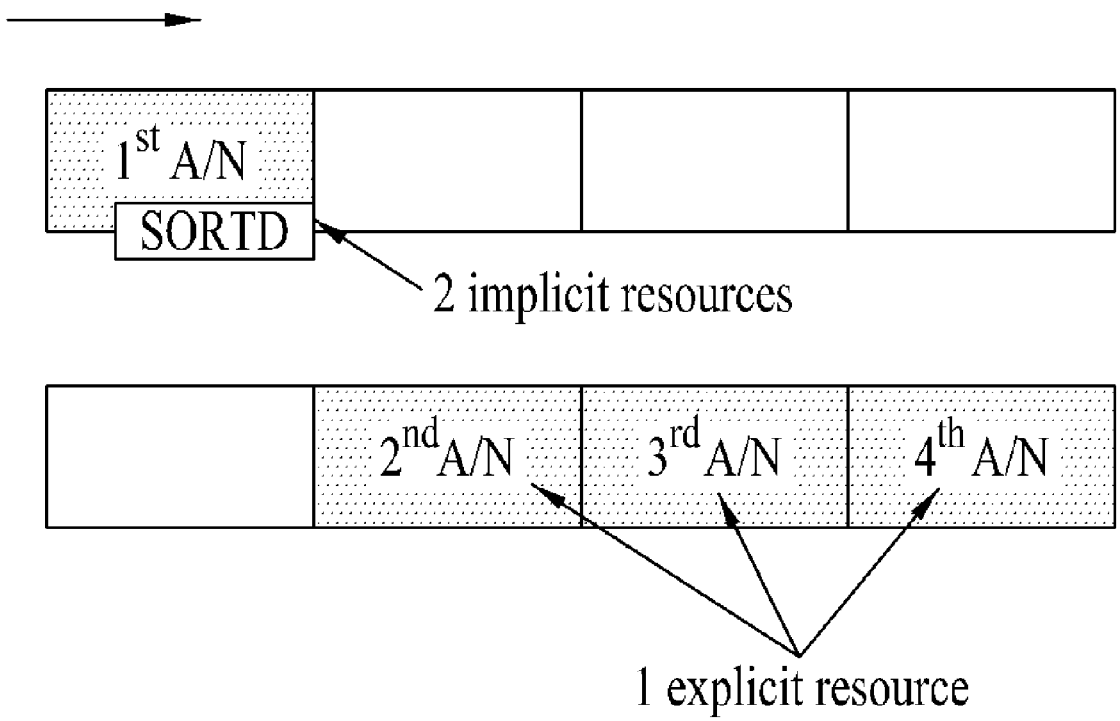
FIG. 34 exemplarily shows ACK/NACK feedback according to a third embodiment of the present invention.

FIG. 34 exemplarily shows ACK/NACK feedback according to a third embodiment of the present invention.

Referring to FIG. 34, if A/N repetition is configured in the UE that supports SORTD through two antenna ports using two PUCCH resource indexes decided by Math Figures 7 and 8, the A/N repetition can be performed using the following PUCCH resource indexes.

(1) First Transmission:

PUCCH resource index derived from a CCE index and PUCCH resource index derived from the CCE index+1 are used for SORTD based on two antenna ports. That is, for the first transmission of ACK/NACK information, the UE may support the SORTD using PUCCH resources decided by the implicit mapping. In this case, in association with the antenna port (p0), PUCCH resource index for ACK/NACK transmission may be determined according to Math Figure 6. In association with the antenna port (p1), PUCCH resource index for first ACK/NACK transmission may be determined according to Math Figure 7.

(2) Second Transmission~$N_{ANRep}$-th Transmission:

From the second transmission, PUCCH resource index for A/N repetition may be determined using parameters that are signaled to the UE by the BS for such A/N repetition through higher layer signaling (e.g., RRC signaling). That is, PUCCH resources decided by the explicit mapping are used for the A/N repetition from the second transmission. From the second transmission, the UE may perform A/N repetition through one antenna port on a PUCCH resource indicated by a PUCCH resource index decided by the above-mentioned parameters. By the higher layer signaling, PUCCH resource index may enable the BS to directly inform the UE of ACK/NACK transmission starting from the second transmission. Alternatively, PUCCH resource index for ACK/NACK transmission starting from the second transmission may also be indirectly indicated by specific other parameters (for example, the CCE index used for the implicit mapping or the offset of the PUCCH resource index decided by the implicit mapping).

According to the third embodiment (Embodiment 3), the PUCCH resource indexes are determined by the implicit mapping in the first ACK/NACK transmission. However, from the second transmission, PUCCH resource index is determined by the explicit mapping for which the BS explicitly informs the UE of a PUCCH resource for ACK/NACK transmission. In contrast, the UE and the BS may also be configured in such a manner that only one of the implicit mapping and the explicit mapping is used in all transmission (i.e., first transmission~$N_{ANRep}$-th transmission).

2. In case of ACK/NACK feedback for DL SPS only, i.e., in the case where ACK/NACK feedback is needed under the condition that any PDCCH is not detected but the DL SPS is detected: Embodiment 4) to Embodiment 6)

In the case where the ACK/NACK feedback for DL SPS only needs to be transmitted to the BS using the PUCCH format 1/1a/1b, PUCCH resources for ACK/NACK feedback is assigned through separated higher layer (e.g., RRC) signaling. Through higher layer signaling, a PUCCH resource candidate set for DL SPS is transmitted from the BS to the UE so as to transmit a predetermined indication message to the UE in such a manner that one of the candidate sets can be used in ACK/NACK feedback for DL SPS by a Transmitter Power Control (TPC) command (2 bits) contained in the PDCCH that performs SPS activation. A PUCCH resource set indicated by the higher layer signaling may include 4 PUCCH resources when the SORTD is not used. In case of using the SORTD, the PUCCH resource set may include 8 PUCCH resources (i.e., 4 PUCCH resource index pairs, each of which includes two PUCCH resource indexes). That is, the entirety of PUCCH resource allocation for the ACK/NACK feedback only for DL SPS may be achieved by the explicit mapping.

Embodiment 4

Method 1

In case of A/N repetition, SORTD is used in every transmission.

_1st transmission to $N_{ANRep}$-th transmission: Transmission of PUCCH format 1/1a/1b supporting SORTD (denoted by 'PUCCH format 1/1a/1b with SORTD')

In general, A/N repetition may be used to increase the coverage of a UE having a limited coverage. That is, compared to other channels such as PRACH and the like, if the ACK/NACK channel has an insufficient Signal-to-Noise Ratio (SNR) margin on a link budget, A/N repetition may be configured in such a manner that the ACK/NACK channel can support the same coverage as in other channels. Therefore, the A/N repetition configuration may be interpreted that the corresponding UE has the small coverage. Herein, the coverage means a specific range to which the UL signal transmitted by the corresponding UE can be successfully delivered. In view of the above-mentioned situation, according to the fourth embodiment (Embodiment 4), in the case where SORTD is pre-configured or A/N repetition and SORTD are simultaneously configured, the UE continuously uses the SORTD in such a manner that an UL signal of the UE can be well detected by the BS. The UE may be configured to transmit ACK/NACK information to the BS using the SORTD irrespective of A/N repetition, and the BS may be configured to determine the execution of ACK/NACK information transmission using the SORTD irrespective of A/N repetition. That is, if the configured SORTD is present in case of the A/N repetition, a communication system is configured in such a manner that SORTD and A/N repetition are simultaneously applied in the communication system.

Figure 35:
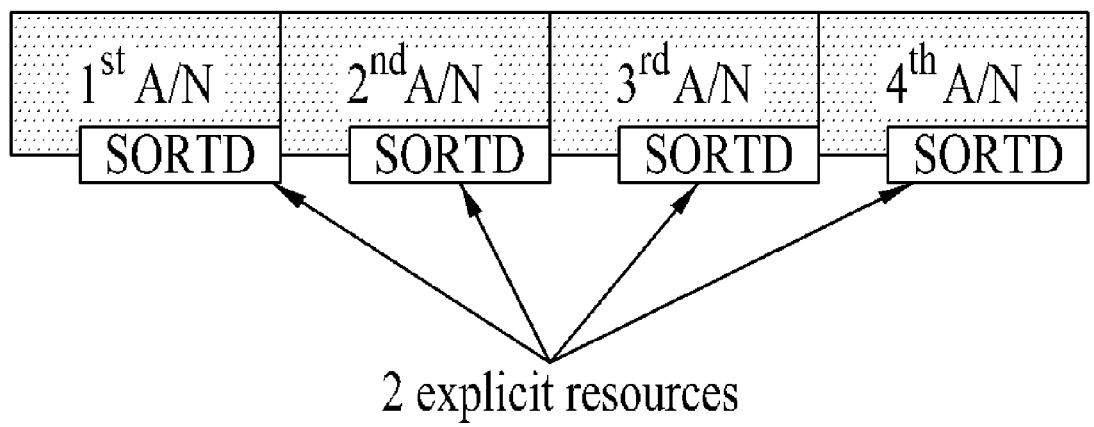
FIG. 35 exemplarily shows ACK/NACK feedback according to a fourth embodiment of the present invention.

FIG. 35 exemplarily shows ACK/NACK feedback according to a fourth embodiment of the present invention.

The UE configured to perform SORTD using two antenna ports may perform the ACK/NACK repetition using the following resources.

(1) $1^{st}$ transmission~$N_{ANRep}$-th transmission:

From among PUCCH resource candidate sets signaled for SORTD based on two antenna ports, ACK/NACK information transmission at the corresponding UE may be repeated $N_{ANRep}$ times through 2 antenna ports using one pair of PUCCH resource indexes explicitly assigned to the corresponding UE for the SORTD. That is, in the first to $N_{ANRep}$-th transmission, PUCCH resource index to be used by each antenna port may be decided by the explicit mapping. The UE may transmit ACK/NACK information using one of PUCCH resource index pairs at the antenna port (p0), and may transmit ACK/NACK information using the remaining one of the allocated PUCCH resource index pairs at the antenna port (p1).

Embodiment 5

Method 2

In case of A/N repetition, SORTD is not used in every transmission.
_1st transmission to $N_{ANRep}$-th transmission: Transmission of PUCCH format 1/1a/1b without SORTD (denoted by 'PUCCH format 1/1a/1b without SORTD')
In order to implement the SORTD in the same manner as in Embodiment 4, additional PUCCH resources are needed. If the A/N repetition is applied, the number of PUCCH resources needed for ACK/NACK feedback is increased in proportion to the number of A/N repetition times and the number of antenna ports participating in the SORTD. For example, if there is a need to support the SORTD based on two antenna ports and $N_{ARep}$ A/N repetitions, the UE may further require a maximum of $2*N_{ARep}$-times PUCCH resources for one ACK/NACK feedback, as compared to the other case in which the SORTD and the A/N repetition are not configured, such that the ACK/NACK feedback may result in large overhead in the system. In order to reduce large resource overhead, if the A/N repetition is configured, the SORTD may be turned off until the A/N repetition is released. The BS that has instructed the UE to perform the A/N repetition may be configured to receive ACK/NACK information from the UE on the assumption that the UE performs the A/N repetition only through one antenna port. The coverage of the PUCCH extended by the SORTD may be kept in a similar range by such A/N repetition. Therefore, the fifth embodiment (Embodiment 5) constructs the communication system in such a manner that the A/N feedback is transmitted from the UE to the BS by switching off the SORTD during the A/N repetition, resulting in reduction in resource overhead encountered by the A/N feedback. According to the fifth embodiment (Embodiment 5), only the PUCCH resource index to be used when the first antenna port performs A/N repetition needs to be signaled to the UE. That is, PUCCH resource index for the second antenna port need not be separately signaled to the UE. Therefore, the fifth embodiment (Embodiment 5) has an advantage in that not only UL resource overhead but also higher layer (e.g., RRC) signaling overhead can be reduced.

Figure 36:
FIG. 36 exemplarily shows ACK/NACK feedback according to a fifth embodiment of the present invention.

FIG. 36 exemplarily shows ACK/NACK feedback according to the fifth embodiment of the present invention.

Referring to FIG. 36, the UE having two or more antenna ports may perform ACK/NACK repetition using the following resources.

(1) $1^{st}$ Transmission~$N_{ANRep}$-th Transmission:
From among PUCCH resource candidate sets signaled for SORTD based on two antenna ports, one PUCCH resource index, that is decided by the predetermined rules (e.g., use of the low PUCCH resource index, etc.) from among one pair of PUCCH resource indexes explicitly allocated to the corresponding UE for the SORTD, may be used for ACK/NACK feedback. In other words, by means of one PUCCH resource decided by the predetermined rule from among two PUCCH resource indexes allocated for the SORTD, the UE may repeatedly transmit ACK/NACK information $N_{ANRep}$ times through one antenna port. That is, one PUCCH resource decided by the explicit mapping extending from the first transmission to the $N_{ANRep}$-th transmission may be used for ACK/NACK feedback.

Embodiment 6

Method 3

In case of A/N repetition, SORTD is used only in the first transmission.
_First transmission: Transmission of PUCCH format 1/1a/1b supporting SORTD (denoted by 'PUCCH format 1/1a/1b with SORTD')
_$2^{nd}$ transmission~$N_{ANRep}$-th transmission: Transmission of PUCCH format 1/1a/1b using no SORTD (denoted by 'PUCCH format 1/1a/1b without SORTD')
According to the fifth embodiment (Embodiment 5), in the case where SORTD may be pre-configured prior to A/N repetition configuration or the SORTD is configured along with A/N repetition, the BS may allow one pair of PUCCH resources for the SORTD to be reserved for the corresponding UE. In this case, if the SORTD is not used even in the first transmission during the A/N repetition, the reserved PUCCH resources are not used, resulting in a waste of reserved PUCCH resources. In order to solve the above-mentioned problems, under the condition that the SORTD is preconfigured or the SORTD is configured along with the A/N repetition configuration, the sixth embodiment (Embodiment 6) supports the SORTD only in the first transmission from among the A/N repetition, and turns off the SORTD in the remaining transmissions (second transmission~$N_{ANRep}$-th transmission). According to the sixth embodiment (Embodiment 6), instead of turning off the SORTD in all transmission, the SORTD is supported in the first transmission in which PUCCH resources are determined by the implicit mapping, such that reserved resources are prevented from being unused and discarded. In addition, from the second transmission, since the A/N repetition is performed only through one antenna port without using the SORTD, resource overhead for UCI transmission is reduced, and PUCCH resources to be used in the second antenna port need not be separately signaled, resulting in a reduction in higher layer signaling overhead.

Figure 37:
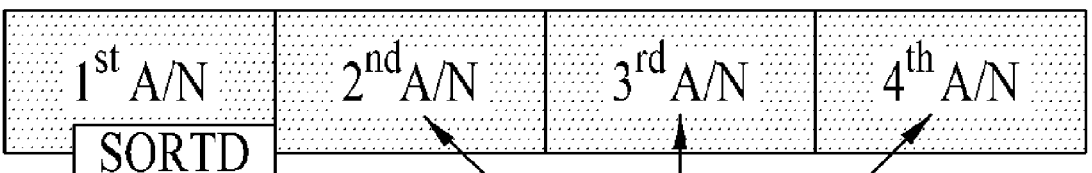
FIG. 37 exemplarily shows ACK/NACK feedback according to a sixth embodiment of the present invention.

FIG. 37 exemplarily shows ACK/NACK feedback according to the sixth embodiment of the present invention.

Referring to FIG. 37, the UE having two or more antenna ports may perform ACK/NACK repetition using the following resources.

(1) First Transmission:
PUCCH resources to be used for ACK/NACK information transmission may be determined in each of two antenna ports using two PUCCH resource indexes explicitly allocated for the SORTD. That is, the UE may support the SORTD using PUCCH resources decided by the explicit mapping. In this case, in association with the antenna port (p0), ACK/NACK PUCCH resources may be determined by one of the two PUCCH resource indexes. In association with the antenna port (p1), ACK/NACK PUCCH resources may be determined by the remaining one.

(2) $2^{nd}$ Transmission~$N_{ANRep}$-th Transmission:
From the second transmission, from among one pair of PUCCH resource indexes explicitly assigned to the corresponding UE for the SORTD, one PUCCH resource index, that is decided by the predetermined rules (e.g., use of the low PUCCH resource index, etc.) from among the one pair of PUCCH resource indexes explicitly allocated to the UE, may be used for ACK/NACK feedback. In other words, in the second to $N_{ANRep}$-th transmission, the UE may transmit ACK/NACK information using one PUCCH resource decided by the predetermined rule from among two PUCCH resource indexes allocated for the SORTD. That is, one PUCCH resource decided by the explicit mapping extending from the second transmission to the $N_{ANRep}$-th transmission may be used for ACK/NACK feedback.

In FIG. 37, if two PUCCH resource indexes displayed in the first transmission and two PUCCH resource indexes displayed in the second to $N_{ANRep}$-th transmission are SPS-activated, the SPS-activated PUCCH resource indexes indicate the same resources as PUCCH resources indicated by a TPC command field of a PDCCH.

In the first to sixth embodiments, METHOD 1 (SORTD is used in every transmission) may be applied not only to ACK/NACK feedback for 'PDSCH with PDCCH' but also to ACK/NACK feedback for 'PDCCH for DL SPS release' or METHOD 2 (SORTD is not used in every transmission) may also be applied thereto. Alternatively, different methods from among METHOD 1, METHOD 2, and METHOD 3 may also be applied depending on ACK/NACK feedback for 'PDSCH with PDCCH' or ACK/NACK feedback for 'PDCCH for DL SPS release'.

- PUCCH Format 3 with SORTD Vs. ACK/NACK Repetition

1. In case of ACK/NACK feedback for 'PDSCH with PDCCH' or ACK/NACK feedback for DL SPS release, i.e., if at least one PDCCH is detected, Embodiment 7 to Embodiment 9 may be used.

If the PUCCH format 3 is used for ACK/NACK feedback for 'PDSCH with PDCCH' and/or ACK/NACK feedback for DL SPS release, a usage and resource allocation of the PUCCH format 3 may be changed according to the number and/or condition of CCs constructed for UE. Conditions capable of being generated in the UE configured to perform ACK/NACK feedback using the PUCCH format 3 are as follows (1) to (4).

(1) Case in which the number of DL CCs configured in the UE is only one.

(2) Case in which all 'PDSCH with PDCCH' and 'DL SPS release' are present in PCell, that is, condition in which either 'PDSCH with PDCCH' or 'DL SPS release' may be received only in PCell.

(3) Case in which 'PDSCH with PDCCH' or 'DL SPS release' is not present and only ACK/NACK for DL SPS is needed.

(4) Case in which 'PDSCH with PDCCH' or 'DL SPS release' is present in SCell.

As described above, in association with the above-mentioned cases (1) to (3) from among conditions of the UE configured to perform ACK/NACK feedback using the PUCCH format 3, the UE may be considered to be in a single carrier situation in such a manner that the UE communicates with the BS using a single carrier. Under the above-mentioned single carrier situation, although the UE may be configured to use the PUCCH format 3 through the higher layer signaling, the above-mentioned embodiments 1 to 6, each of which performs ACK/NACK repetition using the PUCCH format 1/1a/1b (along with SORTD or without SORTD) can be equally applied to the UE.

On the other hand, the case (4) from among the above-mentioned cases of the UE means a multicarrier situation, such that the explicit mapping can be applied to SORTD and/or ACK/NACK repetition. Under the above-mentioned multicarrier situation, if the UE is configured through higher layer signaling to perform ACK/NACK feedback using the PUCCH format, the UE may perform SORTD and/or A/N repetition using the PUCCH format 3.

As described above, although the PUCCH format 3 is configured through higher layer signaling to be used in the UE, it should be noted that the PUCCH format 3 may not be actually used as necessary. That is, in the case (1) in which the number of DL CCs configured for the UE is set to 1, in the case (2) in which a DL SPS release or a PDSCH with PDCCH, having been detected in the UE, are present only in PCell, or in the case (3) in which 'PDSCH with PDCCH' or 'DL SPS release' is detected in the UE is not present and only ACK/NACK for DL SPS is needed, it may be possible to perform ACK/NACK feedback using the PUCCH format 1/1a/1b shown in the first to sixth embodiments (Embodiments 1 to 6) instead of the PUCCH format 3. Next, under the condition that the UE is configured through higher layer signaling to perform ACK/NACK feedback using the PUCCH format 3 from the BS and the PUCCH format 3 is actually used, various embodiments illustrating a method for performing SORTD and/or A/N repetition will hereinafter be described in detail.

In case of using the PUCCH format 3, the explicit mapping based on separate signaling (e.g., a TPC command field) may be used to determine PUCCH resources for ACK/NACK feedback. That is, PUCCH resources for the PUCCH format 3 may be assigned through additional higher layer signaling (e.g., RRC signaling). For example, a PUCCH resource candidate set for the PUCCH format 3 is informed to the UE through higher layer signaling. The BS may command the UE to perform a specific operation using an ACK/NACK Resource Indicator (ARI) on SCell(s) in such a manner that the UE can use one of PUCCH resources pertaining to the PUCCH resource candidate set for ACK/NACK feedback. The TPC command field contained in a PDCCH may be reused as the ARI. That is, the UE may detect PDCCH(s) transmitted for the UE, and may determine PUCCH resources to be used for ACK/NACK feedback on the basis of the TPC command field contained in the detected PDCCH(s). For example, if SORTD is not used, the PUCCH resource candidate set may be composed of 4 resource indexes. If SORTD is used, the PUCCH resource candidate set may be composed of four resource index pairs such that it is composed of a total of 8 resource indexes.

Although the above-mentioned description illustrating PUCCH format 3 resource allocation has exemplarily disclosed that the PUCCH format 3 resource allocation is performed by the explicit mapping for convenience of description, the scope or spirit of the present invention is not limited thereto, and the implicit mapping can also be applied to the PUCCH format 3 resource allocation as necessary. For example, a communication system for use in the FDD system may be configured in such a manner that PUCCH resources are decided by the explicit mapping, and a communication system for use in the TDD system may be configured in such a manner that the implicit mapping can be applied to all or some parts (e.g., in case that PDCCH is received only in PCell).

Embodiment 7

Method 1

In case of A/N repetition, SORTD is used in every transmission.

_1st transmission to $N_{ANRep}$-th transmission: Transmission of PUCCH format 3 supporting SORTD (denoted by 'PUCCH format 3 with SORTD')

In general, A/N repetition may be used to increase the coverage of a UE having a limited coverage. That is, compared to other channels such as PRACH and the like, if the ACK/NACK channel has an insufficient Signal-to-Noise Ratio (SNR) margin on a link budget, A/N repetition may be configured in such a manner that the ACK/NACK channel can support the same coverage as in other channels. Therefore, the A/N repetition configuration may be interpreted that the corresponding UE has the small coverage. Herein, the coverage means a specific range to which the UL signal transmitted by the corresponding UE can be successfully delivered. In view of the above-mentioned situation, according to the 7$^{th}$ embodiment (Embodiment 7), in the case where SORTD is pre-configured or A/N repetition and SORTD are simultaneously configured, the UE continuously uses the SORTD in such a manner that an UL signal of the UE can be well detected by the BS. The UE may be configured to transmit ACK/NACK information to the BS using the SORTD irrespective of A/N repetition, and the BS may be configured to determine the execution of ACK/NACK information transmission using the SORTD irrespective of A/N repetition. That is, if the configured SORTD is present in case of the A/N repetition, a communication system is configured in such a manner that SORTD and A/N repetition are simultaneously applied to the communication system.

Figure 38:
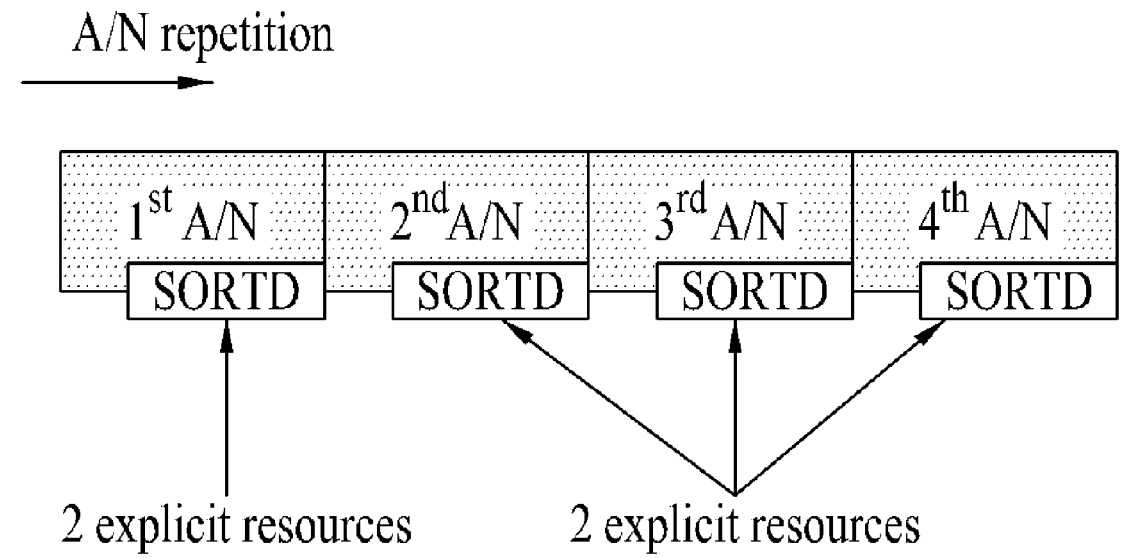
FIG. 38 exemplarily shows ACK/NACK feedback according to a seventh embodiment of the present invention.

FIG. 38 exemplarily shows ACK/NACK feedback according to the seventh embodiment of the present invention.

Referring to FIG. 38, the UE configured to perform the SORTD using two antenna ports explicitly receives two PUCCH resource indexes for the two antenna ports through a PDCCH received from the BS. The two PUCCH resource indexes make one pair, such that the resultant pair of the PUCCH resource indexes may be assigned to the UE by the ARI. Only one of the two PUCCH resource indexes is assigned to the UE by the ARI, and the other one may be assigned, in the form of an offset value for the PUCCH resource index assigned by the ARI, to the UE through another method such as higher layer signaling. In the case where A/N repetition is configured for the UE that performs SORTD using the two PUCCH resource indexes explicitly assigned for two antenna ports, the UE can performs the ACK/NACK feedback using the following method.

(1) First Transmission~$N_{ANRep}$-th Transmission:

PUCCH resource to be used in each of two antenna ports is determined using two PUCCH resource indexes explicitly assigned to the UE so as to implement SORTD using the two antenna ports. That is, in the first to $N_{ANRep}$-th transmission, PUCCH resource index to be used by each antenna ports is determined by the explicit mapping. The UE may transmit ACK/NACK information using one of the two PUCCH resource indexes at the antenna port (p0), and may transmit ACK/NACK information using the other one of the two PUCCH resource indexes at the antenna port (p1). In this case, as shown in FIG. 38, 2 PUCCH resource indexes displayed in the first transmission and 2 PUCCH resource indexes displayed in the second to $N_{ANRep}$-th transmission may be indicated by the ARI transmitted through the TPC command field of PDCCH(s), or may indicate the same PUCCH resources as PUCCH resources derived from the ARI.

On the other hand, only in the first transmission, 2 PUCCH resource indexes indicated through a PDCCH for the SORTD may be used to decide PUCCH resources. If necessary, PUCCH resources used in the repeated transmission (second transmission~$N_{ANRep}$-th transmission) may also be separately designated by higher layer signaling instead of a PDCCH. In this case, 2 PUCCH resource indexes displayed in the first transmission of FIG. 38 may indicate PUCCH resources that may be indicated by the ARI transmitted through a TPC command field of PDCCH(s) or be derived from the ARI. 2 PUCCH resource indexes displayed in the second to $N_{ANRep}$-th transmission may indicate PUCCH resources that are notified of the UE by the BS when A/N repetition is configured.

Embodiment 8

Method 2

In case of A/N repetition, SORTD is not used in all transmission

_First transmission~$N_{ANRep}$-th transmission: Transmission of PUCCH format 3 without SORTD As previously stated in Embodiment 7, in order to implement the SORTD, additional PUCCH resources are needed. If the A/N repetition is applied, the number of PUCCH resources needed for ACK/NACK feedback is increased in proportion to the number of A/N repetition times and the number of antenna ports participating in the SORTD. For example, if there is a need to support the SORTD based on two antenna ports and $N_{ARep}$ A/N repetitions, the UE may further require a maximum of 2*$N_{ARep}$-times PUCCH resources for one ACK/NACK feedback, as compared to the other case in which the SORTD and the A/N repetition are not configured, such that the ACK/NACK feedback may result in large overhead in the system. In order to reduce large resource overhead, if the A/N repetition is configured, the SORTD may be turned off until the A/N repetition is released. The BS that has requested the UE to perform the A/N repetition may be configured to receive ACK/NACK information from the UE on the assumption that the UE performs the A/N repetition only through one antenna port. The coverage of the PUCCH extended by the SORTD may be kept in a similar range by such A/N repetition. Therefore, the 8$^{th}$ embodiment (Embodiment 8) constructs the communication system in such a manner that the A/N feedback is transmitted from the UE to the BS by switching off the SORTD during the A/N repetition, resulting in reduction in resource overhead encountered by the A/N feedback. According to the 8$^{th}$ embodiment (Embodiment 8), only the PUCCH resource index to be used when the first antenna port performs A/N repetition must be signaled to the UE. That is, PUCCH resource index for the second antenna port need not be separately signaled to the UE. Therefore, the 8$^{th}$ embodiment (Embodiment 8) has an advantage in that not only UL resource overhead but also higher layer (e.g., RRC) signaling overhead can be reduced.

Figure 39:
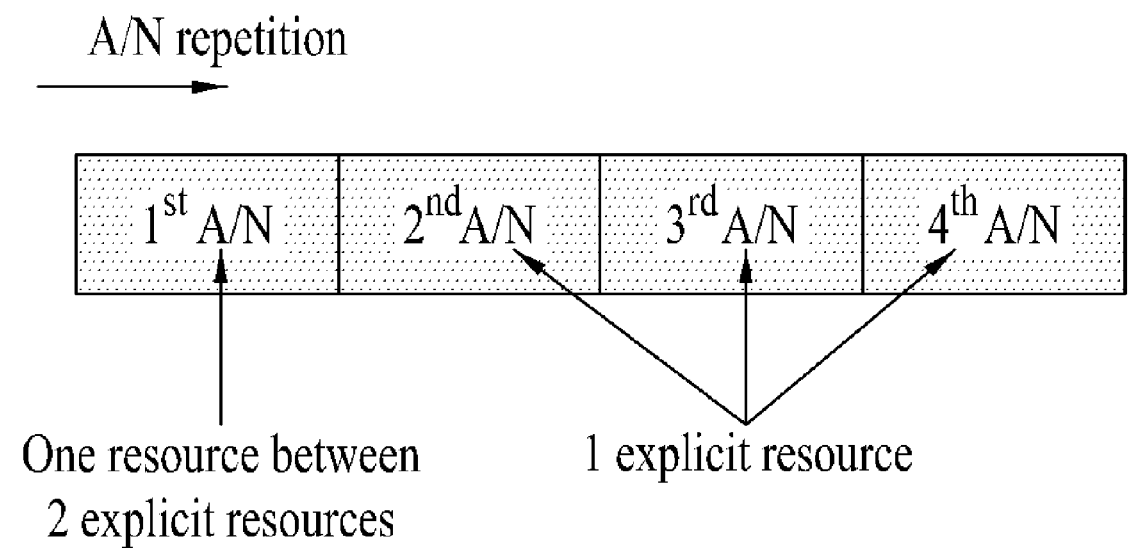
FIG. 39 exemplarily shows ACK/NACK feedback according to an eighth embodiment of the present invention.

FIG. 39 exemplarily shows ACK/NACK feedback according to the 8$^{th}$ embodiment of the present invention.

Referring to FIG. 39, the UE configured to perform the SORTD using two antenna ports explicitly receives two PUCCH resource indexes for the two antenna ports through a PDCCH received from the BS. The two PUCCH resource indexes from one pair, such that the resultant pair of the PUCCH resource indexes may be assigned to the UE by the ARI. Only one of the two PUCCH resource indexes is assigned to the UE by the ARI, and the other one may be assigned, in the form of an offset value for the PUCCH resource index assigned by the ARI, to the UE using another method such as higher layer signaling. In the case where A/N repetition is configured for the UE that performs SORTD using the two PUCCH resource indexes explicitly assigned for two antenna ports, the UE can performs the ACK/NACK feedback using the following method.

(1) First Transmission~$N_{ANRep}$-th Transmission:

One PUCCH resource index, that is decided by the predetermined rules (e.g., use of the low PUCCH resource index, etc.) from among two PUCCH resource indexes explicitly allocated to the UE for the SORTD, may be used for ACK/NACK feedback. In other words, by means of one PUCCH resource decided by the predetermined rule from among two PUCCH resource indexes allocated for the SORTD, the UE may repeatedly transmit ACK/NACK information $N_{ANRep}$ times through one antenna port. That is, one PUCCH resource decided by the explicit mapping extending from the first transmission to the $N_{ANRep}$-th transmission may be used for ACK/NACK feedback. For example, the UE may repeatedly transmit ACK/NACK information $N_{ANRep}$ times using PUCCH resource index decided by the predetermined rule from among the two PUCCH resource indexes assigned to the antenna port (p0). In this case, as can be seen from FIG. 39, one PUCCH resource index displayed in the first transmission and one PUCCH resource index displayed in the second to $N_{ANRep}$-th transmission may be indicated by the ARI transmitted through the TPC command field of PDCCH(s), or may indicate the same PUCCH resources as PUCCH resources derived from the ARI.

On the other hand, only in the first transmission, PUCCH resources are determined using only one of two PUCCH resource indexes indicated through a PDCCH for the SORTD.

If necessary, PUCCH resources used in the repeated transmission (second transmission~$N_{ANRep}$-th transmission) may also be separately designated by higher layer signaling instead of a PDCCH. In this case, one PUCCH resource index displayed in the first transmission of FIG. 39 may indicate PUCCH resources that may be indicated by the ARI transmitted through a TPC command field of PDCCH(s) or be derived from the ARI. One PUCCH resource index displayed in the second to $N_{ANRep}$-th transmission may indicate PUCCH resources that are notified of the UE by the BS when A/N repetition is configured.

Embodiment 9

Method 3

In case of A/N repetition, the SORTD is used only in the first transmission.
  _First transmission: Transmission of PUCCH format 3 supporting SORTD (denoted by 'PUCCH format 3 with SORTD')
  _Second transmission~$N_{ANRep}$-th transmission: Transmission of PUCCH format 3 not using SORTD (denoted by 'PUCCH format 3 without SORTD')

According to the $8^{th}$ embodiment (Embodiment 8), in the case where SORTD may be pre-configured prior to A/N repetition configuration or the SORTD is configured along with A/N repetition, the BS may allow one pair of PUCCH resources for the SORTD to be reserved for the corresponding UE. In this case, if the SORTD is not used even in the first transmission during the A/N repetition, the reserved PUCCH resources are not used, resulting in a waste of reserved PUCCH resources. In order to solve the above-mentioned problems, under the condition that the SORTD is pre-configured or the SORTD is configured along with the A/N repetition configuration, the ninth embodiment (Embodiment 9) supports the SORTD only in the first transmission from among the A/N repetition, and turns off the SORTD in the remaining transmissions (second transmission~$N_{ANRep}$-th transmission). According to the $9^{th}$ embodiment (Embodiment 9), instead of turning off the SORTD in all transmission, the SORTD is supported in the first transmission to which PUCCH resources for the corresponding UE from among PUCCH resources constructing the PUCCH resource candidate set by a TPC command of a PDCCH are assigned, such that reserved resources are prevented from being unused and discarded. In addition, from the second transmission, since the A/N repetition is performed only through one antenna port without using the SORTD, resource overhead for UCI transmission is reduced. In addition, PUCCH resources to be used in the second antenna port need not be separately signaled, resulting in a reduction in higher layer signaling overhead.

Figure 40:
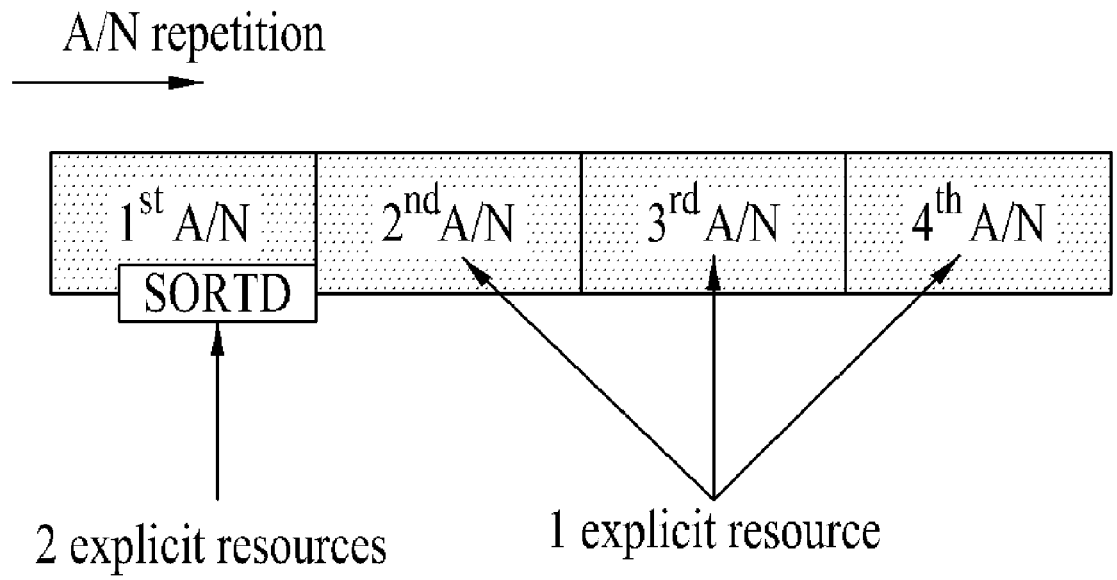
FIG. 40 exemplarily shows ACK/NACK feedback according to a ninth embodiment of the present invention.

FIG. 40 exemplarily shows ACK/NACK feedback according to the ninth embodiment of the present invention.

Referring to FIG. 40, the UE configured to perform the SORTD using two antenna ports explicitly receives two PUCCH resource indexes for the two antenna ports through a PDCCH received from the BS. The two PUCCH resource indexes from one pair, such that the resultant pair of the PUCCH resource indexes may be assigned to the UE by the ARI. Only one of the two PUCCH resource indexes is assigned to the UE by the ARI, and the other one may be assigned, in the form of an offset value for the PUCCH resource index assigned by the ARI, to the UE using another method such as higher layer signaling. In the case where A/N repetition is configured for the UE that performs SORTD using the two PUCCH resource indexes explicitly assigned for two antenna ports, the UE can performs the ACK/NACK feedback using the following method.

(1) First Transmission:

PUCCH resource to be used for ACK/NACK information transmission may be determined for each of two antenna ports using two PUCCH resource indexes explicitly allocated for the SORTD. That is, the UE may support the SORTD using PUCCH resources decided by the explicit mapping. In this case, in association with the antenna port (p0), ACK/NACK PUCCH resource may be determined by one of the two PUCCH resource indexes. In association with the antenna port (p1), ACK/NACK PUCCH resource may be determined by the remaining one.

(2) $2^{Nd}$ Transmission~$N_{ANRep}$-th Transmission:

From the second transmission, from among two PUCCH resource indexes explicitly assigned to the corresponding UE for the SORTD, one PUCCH resource index, that is decided by the predetermined rules (e.g., use of the low PUCCH resource index, etc.) from among the two PUCCH resource indexes explicitly allocated to the UE, may be used for ACK/NACK feedback. That is, one PUCCH resource decided by the explicit mapping extending from the second transmission to the $N_{ANRep}$-th transmission may be used for ACK/NACK feedback. The UE, in the second to $N_{ANRep}$-th transmission, may transmit ACK/NACK information using one PUCCH resource decided by the predetermined rule from among two PUCCH resource indexes allocated for the SORTD. In this case, as shown in FIG. 40, 2 PUCCH resource indexes displayed in the first transmission and one PUCCH resource index displayed in the second to $N_{ANRep}$-th transmission may be indicated by the ARI transmitted through the TPC command field of PDCCH(s), or may indicate the same PUCCH resources as PUCCH resources derived from the ARI.

On the other hand, only in the first transmission, one of 2 PUCCH resource indexes indicated through a PDCCH for the SORTD may be used to decide PUCCH resources. If necessary, PUCCH resources used in the repeated transmission (second transmission~$N_{ANRep}$-th transmission) may also be separately designated by higher layer signaling instead of a PDCCH. In this case, 2 PUCCH resource indexes displayed in the first transmission of FIG. 40 may indicate PUCCH resources that may be indicated by the ARI transmitted through a TPC command field of PDCCH(s) or be derived from the ARI. One PUCCH resource index displayed in the second to $N_{ANRep}$-th transmission may indicate PUCCH resources that are notified of the UE by the BS when A/N repetition is configured.

- Channel Selection with SORTD vs. ACK/NACK Repetition

The present embodiments illustrating a method for performing A/N repetition under the condition that channel selection and SORTD are configured or channel selection and SORTD are configured along with A/N repetition will hereinafter be described in detail. The following embodiments are proposed in consideration of correlation between the channel selection and the SORTD. A detailed description channel selection method is not limited to implement the embodiments of the present invention. That is, although detailed channel selection methods are different from one another, the present embodiments can be applied to ACK/NACK feedback carried out by the UE.

1. In case of ACK/NACK feedback for 'PDSCH with PDCCH' or ACK/NACK feedback for DL SPS release, i.e., if at least one PDCCH is detected, Embodiment 10 to Embodiment 15 may be used.

2-bit, 3-bit, or 4-bit ACK/NACK information for 'PDSCH with PDCCH' and/or DL SPS release may be transmitted from the UE to the BS by means of channel selection using PUCCH format 1/1a/1b. In this case, in order to transmit 2-bit, 3-bit, or 4-bit ACK/NACK information using the PUCCH format 1/1a/1b, 2 PUCCH resources, 3 PUCCH resources, or 4 PUCCH resources are needed for channel selection. A plurality of PUCCH resource indexes for channel selection may be assigned by at least one of the following methods. In addition, different mapping tables and/or different resource allocation methods may be used in TDD and FDD. If SORTD is activated, it is necessary for several resources to be pre-assigned to each antenna port for channel selection. Conditions capable of being generated in the UE configured to perform ACK/NACK feedback using channel selection and SORTD are as follows (1) to (4).

(1) Case in which the number of DL CCs configured for in the UE is only one.

(2) Case in which 'PDSCH with PDCCH' or 'DL SPS release' is not present and only ACK/NACK for DL SPS is needed.

(3) Case in which all 'PDSCH with PDCCH' or 'DL SPS release' is present on PCell, that is, condition in which either 'PDSCH with PDCCH' or 'DL SPS release' may be received only on PCell.

(4) Case in which 'PDSCH with PDCCH' or 'DL SPS release' is present on SCell.

As described above, in association with the above-mentioned case (1) or (2) from among conditions of the UE configured to perform ACK/NACK feedback based on PUCCH format 2 using SORTD and channel selection, the UE may be considered to be in a single carrier situation in such a manner that the UE communicates with the BS using a single carrier. Under the above-mentioned single carrier situation, although the UE receives a command message from the BS in such a manner that channel selection can be used for ACK/NACK feedback, the above-mentioned embodiments 1 to 6, each of which performs ACK/NACK repetition using the PUCCH format 1/1a/1b (along with SORTD or without SORTD) without channel selection can be equally applied to the UE.

On the other hand, for the UE present in the case (3) or (4) from among the above-mentioned conditions, a method for performing channel selection, SORTD, and ACK/NACK repetition needs to be defined. For reference, according to the case (3), PUCCH resource indexes to be used for ACK/NACK feedback may be determined by a function of a CCE index of the initially detected PDCCH. In contrast, a PUCCH resource candidate set is pre-provided by the BS for the UE through higher layer signaling (e.g., RRC signaling), and the ARI value contained in at least one PDCCH may indicate which one of resources from among the PUCCH resource candidate set can be used for ACK/NACK feedback. The BS may transmit the ARI value to the UE by reusing a TPC command field or DAI field contained in the PDCCH, etc. The UE detects PDCCH(s) transmitted for the UE, and determines a PUCCH resource to be used for ACK/NACK feedback on the basis of the ARI value contained in the detected PDCCH(s). For example, if SORTD is not used, the PUCCH resource candidate set may be comprised of 4 resource indexes. If SORTD is used, the PUCCH resource candidate set may be comprised of 4 resource index pairs, such that it may be comprised of a total of 8 resource indexes. On the other hand, in the case (4), a PUCCH resource candidate set is pre-provided by the BS for the UE through higher layer signaling (e.g., RRC signaling), and the ARI value contained in at least one PDCCH may indicate which one of resources from among the PUCCH resource candidate set can be used for ACK/NACK feedback. The BS may transmit the ARI value to the UE by reusing a TPC command field or DAI field contained in the PDCCH, etc. The UE detects PDCCH(s) transmitted for the UE, and determines a PUCCH resource to be used for ACK/NACK feedback on the basis of the ARI value contained in the detected PDCCH(s). For example, if SORTD is not used, the PUCCH resource candidate set may be comprised of 4 resource indexes. If SORTD is used, the PUCCH resource candidate set may be comprised of 4 resource index pairs, such that it may be comprised of a total of 8 resource indexes.

As described above, although the higher layer signals the UE to use channel selection for ACK/NACK feedback from the higher layer, it should be noted that channel selection may not be actually used for ACK/NACK feedback from the UE to the BS. That is, in the case (1) in which the number of DL CCs configured for the UE is set to 1, or in the case (2) in which 'PDSCH with PDCCH' or 'DL SPS release' detected in the UE is not present and only ACK/NACK for DL SPS is needed, or it may be possible to perform ACK/NACK feedback using the PUCCH format 1/1a/1b without channel selection, as shown in the first to sixth embodiments (Embodiments 1 to 6). Next, under the condition that the UE is configured to perform ACK/NACK feedback using channel selection through higher layer signaling from the BS and the channel selection is actually used, various embodiments illustrating a method for performing SORTD and/or A/N repetition will hereinafter be described in detail.

Embodiment 10

Method 1

In case of A/N repetition, SORTD is used in all transmission.

_1st transmission to $N_{ANRep}$-th transmission: channel selection supporting SORTD (denoted by 'channel selection with SORTD')

In general, A/N repetition may be used to increase the coverage of a UE having a limited coverage. That is, compared to other channels such as PRACH and the like, if the ACK/NACK channel has an insufficient Signal-to-Noise Ratio (SNR) margin on a link budget, A/N repetition may be configured in such a manner that the ACK/NACK channel can support the same coverage as in other channels. Therefore, the A/N repetition configuration may be interpreted that the corresponding UE has the small coverage. Herein, the coverage means a specific range to which the UL signal transmitted by the corresponding UE can be successfully delivered. In view of the above-mentioned situation, according to the $10^{th}$ embodiment (Embodiment 10), in the case where SORTD is pre-configured or A/N repetition and SORTD are simultaneously configured, the UE continuously uses the SORTD in such a manner that an UL signal of the UE can be well detected by the BS. The UE may be configured to transmit ACK/NACK information to the BS using the SORTD irrespective of A/N repetition, and the BS may be configured to determine the execution of ACK/NACK information transmission using the SORTD irrespective of A/N repetition. That is, if the configured SORTD is present in case of the A/N repetition, a communication system is configured in such a manner that SORTD and A/N repetition are simultaneously applied in the communication system.

Figure 41:
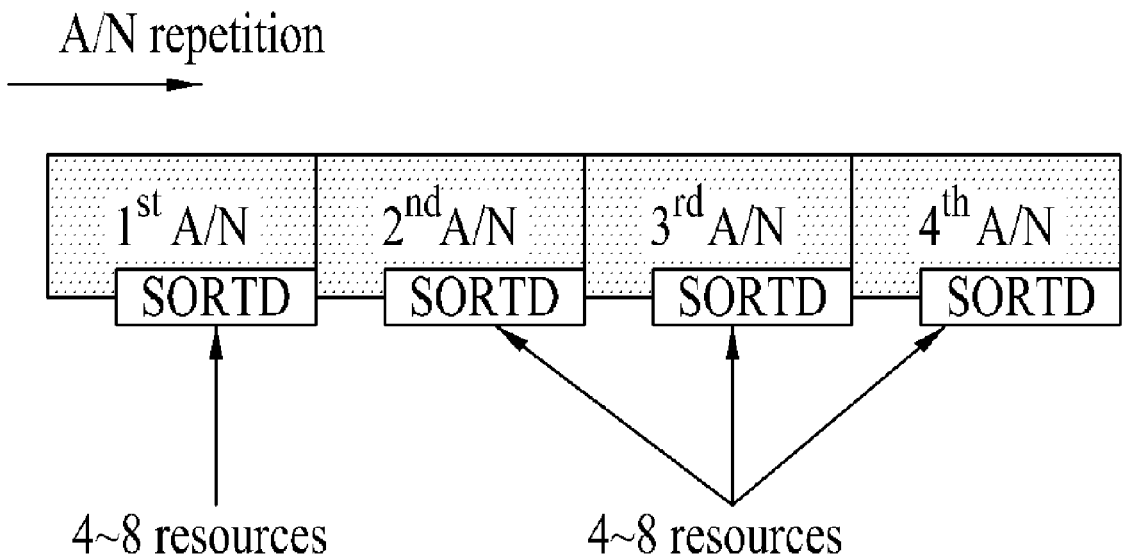
FIG. 41 exemplarily shows ACK/NACK feedback according to a tenth embodiment of the present invention.

FIG. 41 exemplarily shows ACK/NACK feedback according to the tenth embodiment of the present invention.

Referring to FIG. 41, the UE configured to perform SORTD and channel selection using two antenna ports may transmit ACK/NACK feedback through the two antenna ports using two PUCCH resources decided by the channel selection mapping table, according to ACK/NACK information to be transmitted from among 4 to 8 PUCCH resource indexes for the two antenna ports (i.e., 2 to 4 PUCCH resource indexes for each antenna port). In this way, if the UE performing SORTD receives a message indicating A/N repetition configuration from the BS, i.e., if A/N repetition is configured in the UE, the UE can perform the ACK/NACK feedback using the following methods.

(1) First Transmission:

Under the condition that A/N repetition is not configured, from among 4 to 8 PUCCH resource indexes (2 to 4 resource indexes for each antenna port) that are implicitly and/or explicitly defined for channel selection in each of two antenna ports, the UE may perform ACK/NACK transmission on the two antenna ports using two PUCCH resource indexes selected on the basis of ACK/NACK information to be fed back, such that it can perform SORTD. For example, according to ACK/NACK information to be transmitted, PUCCH resource indexes to be used in each antenna port and a transmission bit (complex modulation symbol) to be transmitted on each PUCCH resource may be pre-defined in the form of a mapping table. The UE may detect ACK/NACK response(s), and may transmit 1-bit or 2-bit transmission bits (or complex modulation symbol) using two PUCCH resource indexes mapped to the corresponding ACK/NACK response(s) at each of the two antenna ports.

(2) Second Transmission~$N_{ANRep}$-th Transmission:

The BS may configure A/N repetition, and at the same time may perform signaling of 4 to 8 PUCCH resource indexes for two antenna ports capable of being used in the A/N repetition through a higher layer message (e.g., RRC message) to the UE. For example, if A/N is configured in the activated SORTD state, the BS may transmit 4 to 8 PUCCH resource indexes (i.e., 4 PUCCH resource indexes in case of non-SORTD or 8 PUCCH resource indexes in case of SORTD) to the UE through higher layer signaling. In this case, the PUCCH resource indexes may be directly indicated by a higher layer message, or may be indirectly indicated in the form of an offset of other predetermined parameters (e.g., a CCE index or PUCCH resource index, etc. used in the explicit mapping).

According to the above-mentioned description of Embodiment 10, in the first ACK/NACK transmission or in the second to the $N_{ANRep}$-th ACK/NACK transmission, PUCCH resource indexes used in channel selection are changed. In more detail, in the first ACK/NACK transmission, 2 PUCCH resource indexes for ACK/NACK transmission are selected from among PUCCH resource indexes that are implicitly and/or explicitly signaled for SORTD. From the second transmission, 2 PUCCH resource indexes for ACK/NACK transmission are selected from among PUCCH resource indexes newly indicated by higher layer signaling for A/N repetition. On the other hand, the UE and the BS may also be configured in such a manner that one of the former and latter methods is used in all transmission (first transmission to $N_{ANRep}$-th transmission).

Embodiment 11

Method 2

In case of A/N repetition, SORTD is not used in all transmission.

_First transmission~$N_{ANRep}$-th transmission: channel selection without SORTD As shown in Embodiment 10, in order to implement channel selection and SORTD, additional PUCCH resources are needed. If A/N repetition is applied, the number of PUCCH resources needed for ACK/NACK feedback is increased in proportion to the number of A/N repetition times and the number of antenna ports participating in the SORTD. For example, if there is a need to support the SORTD based on two antenna ports and $N_{ARep}$ A/N repetitions, the UE may further require a maximum of $2*N_{ARep}$-times PUCCH resources for one ACK/NACK feedback, as compared to the other case in which the SORTD and the A/N repetition are not configured. In addition, for channel selection, 2, 3, or 4 PUCCH resources per antenna port may be reserved for the corresponding UE, such that the ACK/NACK feedback may result in large overhead in the system. In order to reduce large resource overhead, if the A/N repetition is configured, the SORTD may be turned off until the A/N repetition is released. The BS that has signaled the A/N repetition to the UE may be configured to receive ACK/NACK information from the UE on the assumption that the UE performs the A/N repetition only through one antenna port. The coverage of the PUCCH extended by the SORTD may be kept in a similar range by such A/N repetition. Therefore, the $11^{th}$ embodiment (Embodiment 11) constructs the communication system in such a manner that the A/N feedback is transmitted from the UE to the BS by switching off the SORTD during the A/N repetition, resulting in reduction in resource overhead encountered by the A/N feedback. According to the $11^{th}$ embodiment (Embodiment 11), only the PUCCH resource index to be used when the first antenna port performs A/N repetition must be signaled to the UE. That is, PUCCH resource index for the second antenna port need not be separately signaled to the UE. Therefore, the $11^{th}$ embodiment (Embodiment 11) has an advantage in that not only UL resource overhead but also higher layer (e.g., RRC) signaling overhead can be reduced.

Figure 42:
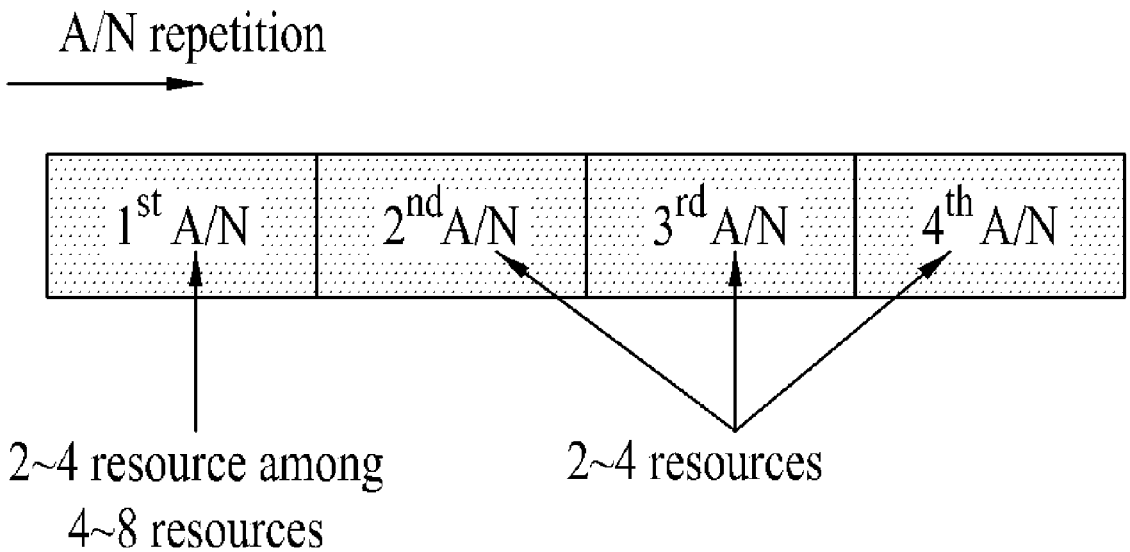
FIG. 42 exemplarily shows ACK/NACK feedback according to an eleventh embodiment of the present invention.

FIG. 42 exemplarily shows ACK/NACK feedback according to the eleventh embodiment of the present invention.

Referring to FIG. 42, the UE configured to perform SORTD and channel selection using two antenna ports may transmit ACK/NACK feedback through the two antenna ports using two PUCCH resources decided by the channel selection mapping table, according to ACK/NACK information to be transmitted, from among 4 to 8 PUCCH resource indexes for the two antenna ports (i.e., 2 to 4 PUCCH resource indexes for each antenna port). In this way, if the UE performing SORTD receives a message indicating A/N repetition configuration from the BS, i.e., if A/N repetition is configured in the UE, the UE can perform the ACK/NACK feedback using the following methods.

(1) First transmission: Irrespective of A/N repetition, the UE may perform ACK/NACK feedback using some parts (e.g., PUCCH resource indexes for the first antenna port) of 4-8 PUCCH resource indexes that are implicitly and/or explicitly defined on two antenna ports for channel selection. That is, the UE does not perform SORTD in the first transmission, and performs ACK/NACK transmission through only one of the antenna ports pertaining to the UE.

(2) Second Transmission~$N_{ANRep}$-th Transmission:

The BS may configure A/N repetition, and at the same time may perform signaling of 2 to 4 PUCCH resource indexes for channel selection at one antenna port to the UE through higher layer signaling (e.g., RRC signaling) so as to implement the A/N repetition. For example, if A/N is configured in the activated SORTD state, the BS may transmit 2 to 4 (or always 4) PUCCH resource indexes (i.e., a PUCCH resource candidate set) to the UE through higher layer signaling. In this case, the number of PUCCH resource indexes contained in the PUCCH resource candidate set can be determined irrespective of whether SORTD is configured, because the SORTD is not performed in case of A/N repetition as illustrated in Embodiment 11. In this case, the PUCCH resource indexes may be directly indicated by a higher layer message, or may be indirectly indicated in the form of an offset of other predetermined parameters (e.g., a CCE index or PUCCH resource index, etc. used in the explicit mapping).

According to the above-mentioned description of Embodiment 11, in the first ACK/NACK transmission or in the second to $N_{ANRep}$-th ACK/NACK transmission, PUCCH resource indexes used in channel selection are changed. In more detail, in the first ACK/NACK transmission, one PUCCH resource index for ACK/NACK transmission is selected from among PUCCH resource indexes that are implicitly and/or explicitly signaled for SORTD. From the second transmission, one PUCCH resource index for ACK/NACK transmission is selected from among PUCCH resource indexes indicated by higher layer signaling for A/N repetition. On the other hand, the UE and the BS may also be configured in such a manner that one of the former and latter methods is used in all transmission (first transmission to $N_{ANRep}$-th transmission).

Embodiment 12

Method 3

In case of A/N repetition, SORTD is used only in first transmission.
_First transmission: channel selection supporting SORTD (denoted by 'channel selection with SORTD')
_2nd transmission~$N_{ANRep}$-th transmission: channel selection without SORTD According to the 11$^{th}$ embodiment (Embodiment 11), in the case where SORTD may be pre-configured prior to A/N repetition configuration or the SORTD is configured along with A/N repetition, the BS may allow one pair of PUCCH resources for the SORTD to be reserved for the corresponding UE. In this case, if the SORTD is not used even in the first transmission during the A/N repetition, the reserved PUCCH resources are not used, resulting in a waste of reserved PUCCH resources. In order to solve the above-mentioned problems, under the condition that the SORTD is preconfigured or the SORTD is configured along with the A/N repetition configuration, the twelfth embodiment (Embodiment 12) supports the SORTD only in the first transmission from among the A/N repetition, and turns off the SORTD in the remaining transmissions (second transmission~$N_{ANRep}$-th transmission). According to the twelfth embodiment (Embodiment 12), instead of turning off the SORTD in all transmission, the SORTD is supported in the first transmission to which PUCCH resources for the corresponding UE from among PUCCH resources constructing the PUCCH resource candidate set by a TPC command of a PDCCH are assigned, such that reserved resources are prevented from being unused and discarded. In addition, from the second transmission, since the A/N repetition is performed only through one antenna port without using the SORTD, resource overhead for UCI transmission is reduced. In addition, PUCCH resources to be used in the second antenna port need not be separately signaled, resulting in a reduction in higher layer signaling overhead.

Figure 43:
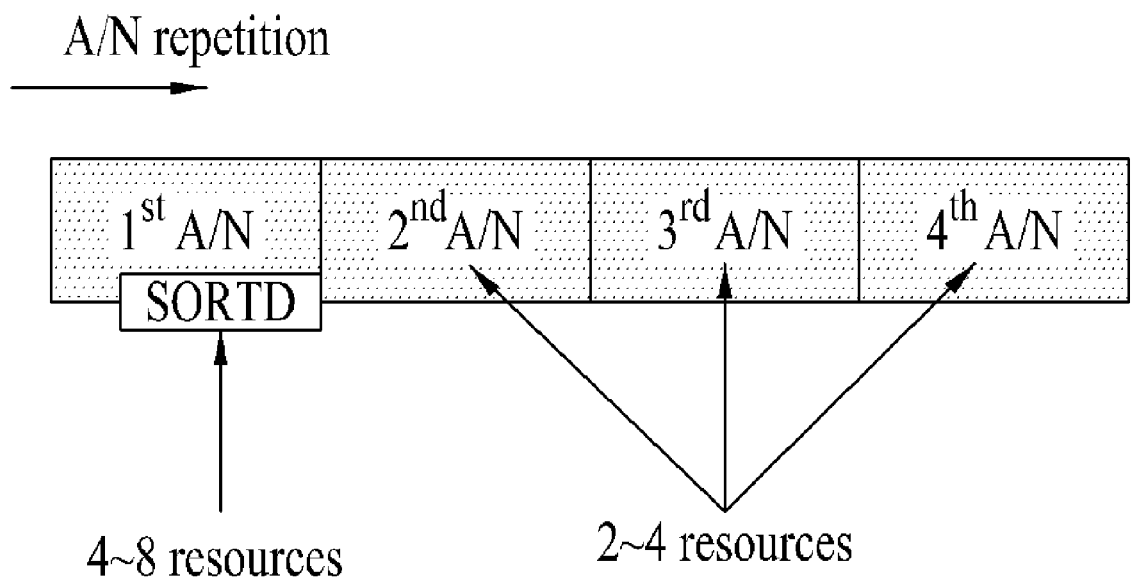
FIG. 43 exemplarily shows ACK/NACK feedback according to a twelfth embodiment of the present invention.

FIG. 43 exemplarily shows ACK/NACK feedback according to the twelfth embodiment of the present invention.

Referring to FIG. 43, the UE configured to perform SORTD and channel selection using two antenna ports may transmit ACK/NACK feedback through the two antenna ports using two PUCCH resources decided by the channel selection mapping table, according to ACK/NACK information to be transmitted from among 4 to 8 PUCCH resource indexes for the two antenna ports (i.e., 2 to 4 PUCCH resource indexes for each antenna port). In this way, if the UE performing SORTD receives a message indicating A/N repetition configuration from the BS, i.e., if A/N repetition is configured in the UE, the UE can perform the ACK/NACK feedback using the following methods.

(1) First transmission: Under the condition that A/N repetition is not configured, from among 4 to 8 PUCCH resource indexes (2 to 4 resource indexes for each antenna port) that are implicitly and/or explicitly defined for channel selection in each of two antenna ports, the UE may perform ACK/NACK transmission on the two antenna ports using two PUCCH resource indexes selected on the basis of ACK/NACK information to be fed back, such that it can perform SORTD. For example, according to ACK/NACK information to be transmitted, PUCCH resource index to be used in each antenna port and a transmission bit (complex modulation symbol) to be transmitted on each PUCCH resource may be pre-defined in the form of a mapping table. The UE may detect ACK/NACK response(s), and may transmit 1-bit or 2-bit transmission bits (or complex modulation symbol) using two PUCCH resource indexes mapped to the corresponding ACK/NACK response(s) through the two antenna ports.

(2) Second Transmission~$N_{ANRep}$-th Transmission:

The BS may configure A/N repetition, and at the same time may perform signaling of 2 to 4 PUCCH resource indexes for channel selection at one antenna port to the UE through higher layer signaling (e.g., RRC signaling) so as to implement the A/N repetition. For example, if A/N is configured in the activated SORTD state, the BS may transmit 2 to 4 (or always 4) PUCCH resource indexes (i.e., a PUCCH resource candidate set) to the UE through higher layer signaling. In this case, the number of PUCCH resource indexes contained in the PUCCH resource candidate set can be determined irrespective of whether SORTD is configured, because the SORTD is not performed from the ACK/NACK transmission as illustrated in Embodiment 12. In this case, the PUCCH resource indexes may be directly indicated by a higher layer message, or may be indirectly indicated in the form of an offset of other predetermined parameters (e.g., a CCE index or PUCCH resource index, etc. used in the explicit mapping).

According to the above-mentioned description of Embodiment 12, in the first ACK/NACK transmission or in the second to $N_{ANRep}$-th ACK/NACK transmission, PUCCH resource indexes used in channel selection are changed. In more detail, in the first ACK/NACK transmission, two PUCCH resource indexes for ACK/NACK transmission are selected from among PUCCH resource indexes that are implicitly and/or explicitly signaled for channel selection at two antenna ports. In contrast, from the second transmission, one PUCCH resource index for ACK/NACK transmission is selected from among PUCCH resource indexes indicated by higher layer signaling for channel selection in case of A/N repetition. On the other hand, the UE and the BS may also be configured in such a manner that one of the former and latter methods is used in all transmission (first transmission to $N_{ANRep}$-th transmission).

The above-mentioned Embodiments 10 to 12 relate to a method for continuously performing channel selection in case of A/N repetition. However, if A/N repetition and channel selection are simultaneously carried out as described above, a plurality of PUCCH resources must be continuously reserved for channel selection, resulting in the occurrence of PUCCH resource overhead. For example, whenever A/N transmission is carried out, 2 to 4 PUCCH resources (in case that SORTD is not supported) or 4 to 8 PUCCH resources (in case that SORTD is supported) must be reserved for one UE. To accomplish this, the following description will disclose Embodiments 13 to 15. In Embodiment 13, 14 or 15, when A/N repetition is performed, actual channel selection is applied only to first transmission, the channel selection is not applied to the next repeated transmission subsequent to the first transmission, and ACK/NACK transmission bits (i.e., constellation) transmitted on PUCCH resources selected by the first transmission are repeatedly transmitted on PUCCH resource(s) assigned for A/N repetition. According to Embodiments 13 to 15, although A/N repetition is carried out, the transmission bit values actually transmitted in all ACK/NACK transmission (first transmission~$N_{ANRep}$-th transmission) are identical to each other.

Embodiment 13

Method 4

In case of A/N repetition, SORTD is performed in every transmission but channel selection is used only in the first transmission.
 _First transmission: channel selection supporting SORTD (denoted by 'channel selection with SORTD')
 _Second transmission~$N_{ANRep}$-th transmission: no channel selection with SORTD In general, A/N repetition may be used to increase the coverage of a UE having a limited coverage. That is, compared to other channels such as PRACH and the like, if the ACK/NACK channel has an insufficient Signal-to-Noise Ratio (SNR) margin on a link budget, A/N repetition may be configured in such a manner that the ACK/NACK channel can support the same coverage as in other channels. Therefore, the A/N repetition configuration may be interpreted that the coverage of the corresponding UE is small. Herein, the coverage means a specific range to which the UL signal transmitted by the corresponding UE can be successfully delivered. In view of the above-mentioned situation, according to the 13$^{th}$ embodiment (Embodiment 13), in the case where SORTD is pre-configured or A/N repetition and SORTD are simultaneously configured, the UE continuously uses the SORTD in such a manner that an UL signal of the UE can be well detected by the BS. The UE may be configured to transmit ACK/NACK information to the BS using the SORTD irrespective of A/N repetition, and the BS may be configured to determine the execution of ACK/NACK information transmission using the SORTD irrespective of A/N repetition. That is, if the pre-configured or simultaneously-configured SORTD is present in case of the A/N repetition, a communication system is configured in such a manner that SORTD and A/N repetition are simultaneously applied to the communication system.

Figure 44:
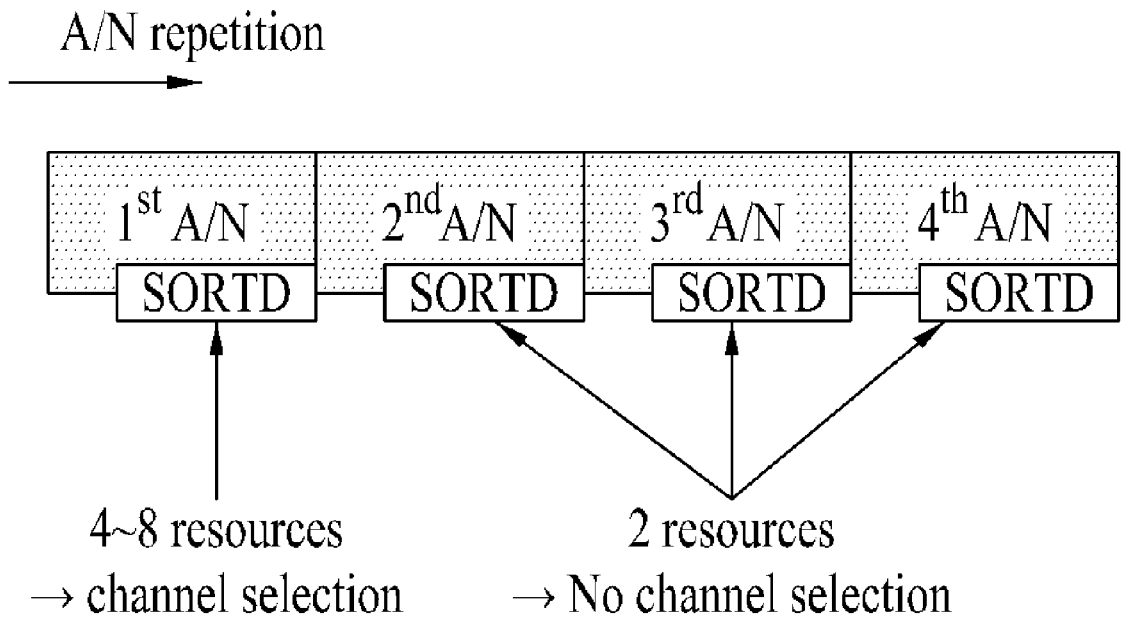
FIG. 44 exemplarily shows ACK/NACK feedback according to a thirteenth embodiment of the present invention.

FIG. 44 exemplarily shows ACK/NACK feedback according to the thirteenth embodiment of the present invention.

Referring to FIG. 44, the UE configured to perform SORTD and channel selection using two antenna ports may transmit ACK/NACK feedback through the two antenna ports using two PUCCH resources decided by the channel selection mapping table, according to ACK/NACK information to be transmitted from among 4 to 8 PUCCH resource indexes for the two antenna ports (i.e., 2 to 4 PUCCH resource indexes for each antenna port). In this way, if the UE performing SORTD receives a message indicating A/N repetition configuration from the BS, i.e., if A/N repetition is configured for the UE, the UE can perform the ACK/NACK feedback using the following methods.

(1) First transmission: Before A/N repetition is configured, from among 4 to 8 PUCCH resource indexes (2 to 4 resource indexes for each antenna port) that are implicitly and/or explicitly defined for channel selection in each of two antenna ports, the UE may select two PUCCH resources where ACK/NACK information is to be transmitted. The UE transmits complex modulation symbol(s) corresponding to the ACK/NACK information on the two selected PUCCH resources to the BS through the two antenna ports, such that it can perform SORTD. For example, according to ACK/NACK information to be transmitted, a PUCCH resource index to be used in each antenna port and a transmission bit (complex modulation symbol) to be transmitted on each PUCCH resource may be pre-defined as a mapping table. The UE may detect ACK/NACK response(s), and may transmit 1-bit or 2-bit transmission bits (or complex modulation symbol) using two PUCCH resource indexes mapped to the corresponding ACK/NACK response(s) at each of two antenna ports. That is, both SORTD and channel selection are performed in the first transmission.

(2) Second Transmission~$N_{ANRep}$-th Transmission:

When configuring A/N repetition, the BS may transmit 2 PUCCH resource indexes to be used by two antenna ports to the UE through higher layer signaling (e.g., RRC signaling). In this case, if SORTD is activated, the BS may transmit two PUCCH resource indexes to the UE for two antenna ports through higher layer signaling. If SORTD is deactivated, the BS may transmit one PUCCH resource index to the UE for one antenna port through higher layer signaling. The PUCCH resource indexes may be directly indicated by a higher layer message, or may be indirectly indicated in the form of an offset of other predetermined parameters (e.g., a CCE index or PUCCH resource index, etc. used in the explicit mapping). From the second transmission, the UE may transmit a transmission bit (or complex modulation symbol) that has been transmitted by each antenna port in the first transmission at the corresponding antenna port without change. That is, in the second to $N_{ANRep}$-th transmission, channel selection is not performed but SORTD is performed.

On the other hand, even in the second to $N_{ANRep}$-th transmission, PUCCH resources selected in the first transmission and the transmission bit (complex modulation symbol) transmitted on each PUCCH resource can be used without change. For example, it is assumed that, in the first transmission, a PUCCH resource corresponding to $n^{(1,p0)}_{PUCCH1}$ from among PUCCH resources for the antenna port (p0) is selected, and a PUCCH resource corresponding to $n^{(1,p1)}_{PUCCH0}$ from among PUCCH resources for the antenna port (p1) is selected. The UE, even in the second transmission to the $N_{ANRep}$-th transmission, may transmit a transmission bit (or complex modulation symbol) mapped to the corresponding ACK/NACK information to the BS through the antenna port (p0) on the PUCCH resource $n^{(1,p0)}_{PUCCH1}$ having been used in the first transmission, and may transmit the transmission bit (or complex modulation symbol) mapped to the corresponding ACK/NACK information to the BS through the antenna port (p1) on the PUCCH resource $n^{(1,p1)}_{PUCCH0}$.

According to the above-mentioned description of Embodiment 13, PUCCH resource indexes used in channel selection are different between the first ACK/NACK transmission and the second $N_{ANRep}$-th ACK/NACK transmission. In more detail, in the first ACK/NACK transmission, two PUCCH resource indexes for ACK/NACK transmission are selected from among PUCCH resource indexes that are implicitly and/or explicitly signaled for SORTD. In contrast, from the second transmission, PUCCH resource indexes newly indicated by higher layer signaling for A/N repetition are used for ACK/NACK transmission. On the other hand, the UE and the BS may also be configured in such a manner that one of the former and latter methods is used in all transmission (first transmission to $N_{ANRep}$-th transmission).

Embodiment 14

Method 5

In case of A/N repetition, SORTD is not used in all transmission, and channel selection is used only in the first transmission.

_First transmission~$N_{ANRep}$-th transmission: channel selection without SORTD
_Second transmission~$N_{ANRep}$-th transmission: SORTD and channel selection are not performed (denoted by 'no channel selection without SORTD')

As shown in Embodiment 13, in order to implement channel selection and SORTD, additional PUCCH resources are needed. If A/N repetition is applied, the number of PUCCH resources needed for ACK/NACK feedback is increased in proportion to the number of A/N repetition times and the number of antenna ports participating in the SORTD. For example, if there is a need to support the SORTD based on two antenna ports and $N_{ARep}$ A/N repetitions, the UE may further require a maximum of $2*N_{ARep}$-times PUCCH resources for one ACK/NACK feedback, as compared to the other case in which the SORTD and the A/N repetition are not configured. In addition, for channel selection, 2, 3, or 4 PUCCH resources per antenna port may be reserved for the corresponding UE, such that the ACK/NACK feedback may result in large overhead in the system. In order to reduce large resource overhead, if the A/N repetition is configured, the SORTD may be turned off until the A/N repetition is released. The BS that has signaled the A/N repetition to the UE may be configured to receive ACK/NACK information from the UE on the assumption that the UE performs the A/N repetition only through one antenna port. The coverage of the PUCCH extended by the SORTD may be kept in a similar range by such A/N repetition. Therefore, the 14th embodiment (Embodiment 14) constructs the communication system in such a manner that the A/N feedback is transmitted from the UE to the BS by switching off the SORTD during the A/N repetition, resulting in reduction in resource overhead encountered by the A/N feedback. According to the 14th embodiment (Embodiment 14), only the PUCCH resource index to be used when the first antenna port performs A/N repetition must be signaled to the UE. That is, PUCCH resource index for the second antenna port need not be separately signaled to the UE. Therefore, the 14th embodiment (Embodiment 14) has an advantage in that not only UL resource overhead but also higher layer (e.g., RRC) signaling overhead can be reduced.

Figure 45:
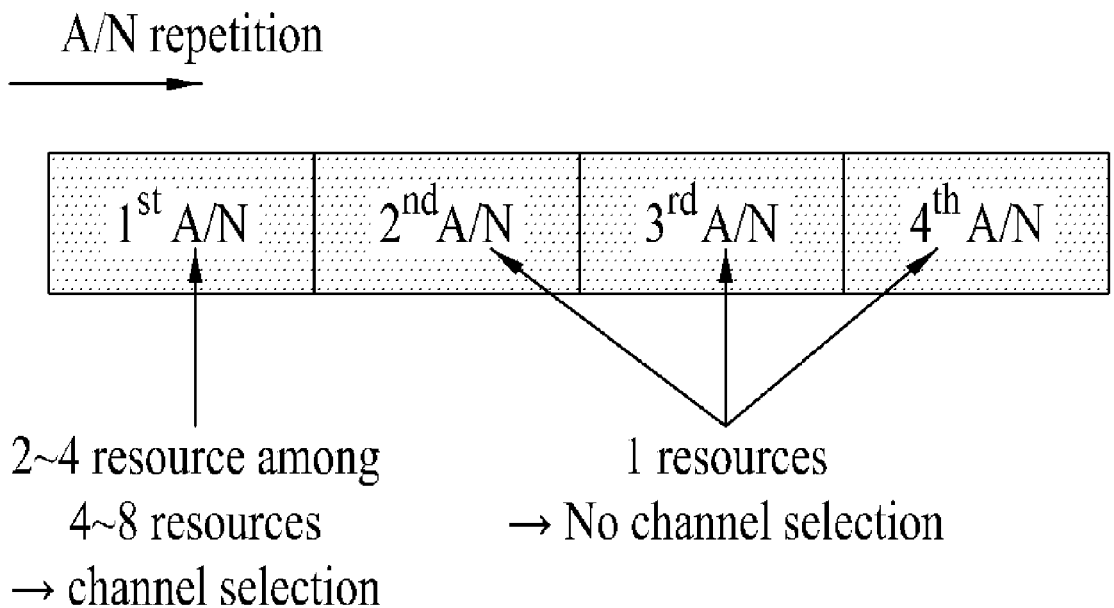
FIG. 45 exemplarily shows ACK/NACK feedback according to a fourteenth embodiment of the present invention.

FIG. 45 exemplarily shows ACK/NACK feedback according to the 14th embodiment of the present invention.

Referring to FIG. 45, the UE configured to perform SORTD using two antenna ports may transmit ACK/NACK feedback through the two antenna ports using two PUCCH resources decided by the channel selection mapping table, according to ACK/NACK information to be transmitted, from among 4 to 8 PUCCH resource indexes for the two antenna ports (i.e., 2 to 4 PUCCH resource indexes for each antenna port). In this way, if the UE performing SORTD receives a message indicating A/N repetition configuration from the BS, i.e., if A/N repetition is configured in the UE, the UE can perform the ACK/NACK feedback using the following methods.

(1) First Transmission:

Before A/N repetition is configured for channel selection on two antenna ports, only some parts (e.g., PUCCH resource indexes for the first antenna port) from among 4 to 8 PUCCH resource indexes implicitly and/or explicitly defined are used for the first transmission of A/N repetition. For example, from among some PUCCH resource indexes (e.g., 2 to 5 PUCCH resource indexes) based on the predetermined rule from among the 4 to 8 PUCCH resource indexes, 2 PUCCH resource indexes mapped to the corresponding ACK/NACK transmission may be selected according to the channel selection mapping table. The two selected PUCCH resource indexes may be mapped to two antenna ports for SORTD on a one to one basis. The UE may transmit transmission bit(s) on two PUCCH resources indicated by two PUCCH resource indexes through the two antenna ports. That is, during the first transmission, channel selection is performed whereas SORTD is not performed.

(2) Second Transmission~$N_{ANRep}$-th Transmission:

The BS may configure A/N repetition, and at the same time may signal one PUCCH resource index to be used by one antenna port for A/N repetition to the UE through higher layer signaling (e.g., RRC signaling). In this case, irrespective of whether SORTD is activated, the BS may always perform signaling of only one PUCCH resource index to the UE for the second to $N_{ANRep}$-th transmission. One PUCCH resource index indicated by higher layer signaling may be directly indicated by a higher layer message, or may be indirectly indicated in the form of an offset of other predetermined parameters (e.g., a CCE index or PUCCH resource index, etc.

used in the explicit mapping). In the second to $N_{ANRep}$-th transmission, both SORTD and channel selection are not performed.

According to the above-mentioned description of Embodiment 14, PUCCH resource indexes used in channel selection are different between the first ACK/NACK transmission and the second to $N_{ANRep}$-th ACK/NACK transmission. In more detail, in the first ACK/NACK transmission, PUCCH resource indexes for ACK/NACK transmission are selected from among PUCCH resource indexes that are implicitly and/or explicitly signaled for SORTD. In contrast, from the second transmission, PUCCH resource indexes newly indicated by higher layer signaling for A/N repetition are used for ACK/NACK transmission. On the other hand, the UE and the BS may also be configured in such a manner that one of the former and latter methods is used in all transmission (first transmission to $N_{ANRep}$-th transmission).

Embodiment 15

Method 6

In case of A/N repetition, SORTD and channel selection are used only in the first transmission.
_First transmission: channel selection supporting SORTD (denoted by 'channel selection with SORTD')
_Second transmission~$N_{ANRep}$-th transmission: SORTD and channel selection are not performed (denoted by 'PUCCH format 3 without SORTD')

According to the 14$^{th}$ embodiment (Embodiment 14), in the case where SORTD may be pre-configured prior to A/N repetition configuration or the SORTD is configured along with A/N repetition, the BS may allow one pair of PUCCH resources for the SORTD to be reserved for the corresponding UE. In this case, if the SORTD is not used even in the first transmission during the A/N repetition, the reserved PUCCH resources are not used, resulting in a waste of reserved PUCCH resources. In order to solve the above-mentioned problems, under the condition that the SORTD is preconfigured or the SORTD is configured along with the A/N repetition configuration, the 15$^{th}$ embodiment (Embodiment 15) supports the SORTD only in the first transmission from among the A/N repetition, and turns off the SORTD in the remaining transmissions (second transmission~$N_{ANRep}$-th transmission). According to the 15$^{th}$ embodiment (Embodiment 15), instead of turning off the SORTD in all transmission, the SORTD is supported in the first transmission to which PUCCH resources for the corresponding UE from among PUCCH resources constructing the PUCCH resource candidate set by a TPC command of a PDCCH are assigned, such that reserved resources are prevented from being unused and discarded. In addition, from the second transmission, since the A/N repetition is performed only through one antenna port without using the SORTD, resource overhead for UCI transmission is reduced. In addition, PUCCH resources to be used in the second antenna port need not be separately signaled, resulting in a reduction in higher layer signaling overhead.

Figure 46:
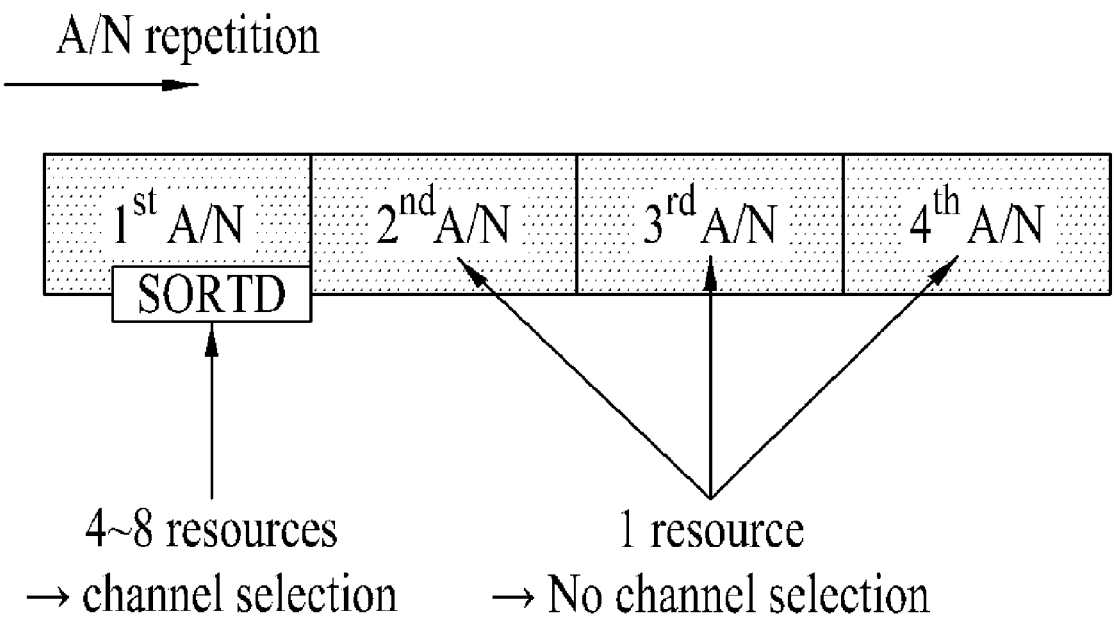
FIG. 46 exemplarily shows ACK/NACK feedback according to a $15^{th}$ embodiment of the present invention.

FIG. 46 exemplarily shows ACK/NACK feedback according to the 15$^{th}$ embodiment of the present invention.

Referring to FIG. 46, the UE configured to perform SORTD and channel selection using two antenna ports may transmit ACK/NACK feedback through the two antenna ports using two PUCCH resources decided by the channel selection mapping table, according to ACK/NACK information to be transmitted from among 4 to 8 PUCCH resource indexes for the two antenna ports (i.e., 2 to 4 PUCCH resource indexes for each antenna port). In this way, if the UE performing SORTD and channel selection receives a message indicating A/N repetition configuration from the BS, i.e., if A/N repetition is configured in the UE, the UE can perform the ACK/NACK feedback using the following methods.

(1) First transmission: Before A/N repetition is configured, from among 4 to 8 PUCCH resource indexes (2 to 4 resource indexes for each antenna port) that are implicitly and/or explicitly defined for channel selection in each of two antenna ports, the UE may select two PUCCH resources where ACK/NACK information is to be transmitted. The UE transmits complex modulation symbol(s) corresponding to the ACK/NACK information on the two selected PUCCH resources to the BS through the two antenna ports, such that it can perform SORTD. For example, according to ACK/NACK information to be transmitted, a PUCCH resource index to be used in each antenna port and a transmission bit (complex modulation symbol) to be transmitted on each PUCCH resource may be pre-defined as a mapping table. The UE may detect ACK/NACK response(s), and may transmit 1-bit or 2-bit transmission bits (or complex modulation symbol) using two PUCCH resource indexes mapped to the corresponding ACK/NACK response(s) through two antenna ports. That is, both SORTD and channel selection are performed in the first transmission.

(2) Second Transmission~$N_{ANRep}$-th Transmission:

The BS may configure A/N repetition, and at the same time may signal one PUCCH resource index to be used by one antenna port for A/N repetition to the UE through higher layer signaling (e.g., RRC signaling). In this case, irrespective of whether SORTD is activated, the BS may always perform signaling of only one PUCCH resource index to the UE for the second to $N_{ANRep}$-th transmission. One PUCCH resource index indicated by higher layer signaling may be directly indicated by a higher layer message, or may be indirectly indicated in the form of an offset of other predetermined parameters (e.g., a CCE index or PUCCH resource index, etc. used in the explicit mapping). In the second to $N_{ANRep}$-th transmission, both SORTD and channel selection are not performed.

According to the above-mentioned description of Embodiment 15, in the first ACK/NACK transmission or in the second to $N_{ANRep}$-th ACK/NACK transmission, PUCCH resource indexes used in channel selection are changed. In more detail, in the first ACK/NACK transmission, PUCCH resource indexes for ACK/NACK transmission are selected from among PUCCH resource indexes that are implicitly and/or explicitly signaled for channel selection at two antenna ports. In contrast, from the second transmission, PUCCH resource indexes for ACK/NACK transmission is selected from among PUCCH resource indexes indicated by higher layer signaling for channel selection in case of A/N repetition. On the other hand, the UE and the BS may also be configured in such a manner that one of the former and latter methods is used in all transmission (first transmission to $N_{ANRep}$-th transmission).

• Method for Preventing SORTD and A/N Repetition from being Simultaneously Used

A/N repetition has been proposed to overcome the limited coverage of an ACK/NACK channel as compared to other channels (e.g., PRACH). Therefore, provided that A/N repetition is performed, this means that the above-mentioned coverage limitation can be solved although SORTD is not performed. Therefore, in order to simplify the communication system, SORTD and A/N repetition can be prevented from being simultaneously used. For these purposes, the following embodiments can be proposed.

Embodiment 16

In case of A/N repetition, SORTD is always turned off.

If A/N repetition is configured by the higher layer, the UE always turns the SORTD off. Provided that the UE turns off the SORTD under the condition that the SORTD is activated and turned on by the BS, this means that the SORTD can be potentially applied only to the A/N repetition configuration. In this case, if the A/N repetition is released, SORTD may be reactivated and turned on. Alternatively, when A/N repetition is configured, the BS deactivates the SORTD such that it may turn off SORTD for the UE. In this case, the BS reconfigures the SORTD and performs signaling of the reconfigured SORTD to the UE, such that the UE can reactivate the SORTD.

Embodiment 17

In Embodiment 17, A/N repetition and SORTD is prevented from being simultaneously configured.

Simultaneous configuration of SORTD and A/N repetition may be prevented in the higher layer (e.g., MAC layer or RRC layer). For example, the MAC layer or the RRC layer is configured to always turn off A/N repetition when SORTD is activated. In another example, if A/N repetition is configured, this means that SORTD is turned off. In the above-mentioned Embodiments 1 to 17, distinction between the first transmission and the remaining transmission (second to $N_{ANRep}$-th transmission) is disclosed only for illustrative purposes. If necessary, the first to k-th transmission and the (k+1)-th to $N_{ANRep}$th transmission may be distinguished from each other on the basis of a specific positive integer (k). In the meantime, Although FIGS. 32 to 34 have exemplarily disclosed the case of '$N_{ANRep}$=4' it may be obvious to those skilled in the art that the present embodiments can also be applied to other numbers other $N_{ANRep}$ values excluding $N_{ANRep}$=4.

The above-mentioned embodiments 1 to 17 are classified according to a PUCCH format, execution or non-execution of SORTD, execution or non-execution channel selection, etc. For convenience of description and better understanding of the present invention, the implicit mapping and the explicit mapping described in Embodiments 1 to 17 are called implicit resource allocation and explicit resource allocation, respectively. The implicit resource allocation and the explicit resource allocation capable of being applied to the present invention will hereinafter be described in detail. For convenience of description, the implicit resource allocation and the explicit resource allocation may have the following meaning.

• Implicit Resource Allocation=Implicit Mapping

1. The implicit resource allocation means a method for deriving PUCCH resources in association with (the lowest) CCE index of a PDCCH. The implicit mapping may be applied to channel selection using either PUCCH format 1a/1b or PUCCH format 1b.

2. One or two PUCCH resources may be derived from one PDCCH. When deriving one PUCCH resource, PUCCH resource indexes may be determined by Math Figure 6 (or Math Figure 1).

When deriving two PUCCH resources, one PUCCH resource index may be determined by Math Figure 6, and the remaining one PUCCH resource may be determined by Math Figure 7.

• Explicit Resource Allocation=Explicit Mapping

1. The explicit resource allocation means a method for receiving PUCCH resources from the higher layer (e.g., RRC layer). At least one PUCCH resource may be received from the higher layer. The UE receives several PUCCH resources from the BS through higher layer signaling, and may receive an indication message indicating resources to be used by the UE from among the several PUCCH resources from the BS using the ARI. For reference, a TPC command field contained in a DCI may be reused as the ARI.

2. In case of channel selection using PUCCH format 1b (in case of 4-bit ACK/NACK feedback, 4 PUCCH resources are needed)

_Alt 1: One PUCCH resource may be derived by the implicit resource allocation from a PDCCH on a PCell (i.e., one PUCCH resource may be derived by $n_{CCE}$), and the remaining three PUCCH resources may be allocated by the explicit resource allocation. In this case, if it is assumed that one PUCCH resource candidate set is comprised of three PUCCH resources, the UE receives a total of 4 PUCCH resource candidate sets from the higher layer (e.g., RRC), and may receive one PUCCH resource candidate set capable of being used in ACK/NACK repetition by a value indicated by the ARI. The four PUCCH resource candidate sets may be comprised of different PUCCH resources, and may share some PUCCH resources with other PUCCH resource candidate sets as necessary.

_Alt 2: For non-cross-carrier scheduling, two implicit resources derived from a PDCCH of a PCell may be allocated to the UE. For cross-carrier scheduling, not only two implicit resources derived from a PDCCH (i.e., a PDCCH for PDSCH allocation of PCell) for the non-cross-scheduling of the PCell, but also two implicit resources derived from a PDCCH (i.e., a PDCCH for PDSCH allocation of SCell) for PCell cross-scheduling may also be assigned to the UE as necessary. In this case, if two implicit resources are derived from one PDCCH, Math Figures 7 and 8 may be used. The explicit resource may be allocated by the same method as in the 'Alt' case.

3. In Case of PUCCH Format 3

_UE may receive four PUCCH resources from the BS through higher layer signaling (e.g., RRC signaling), and may receive an indication message, that indicates resources to be used for ACK/NACK transmission from among the four PUCCH resources, from the BS.

_ARI may be transmitted from the BS to the UE through a TPC command field of the SCell. If several SCells are configured, the above-mentioned SCell values may have the same TPC (ARI) value.

_In case of PUCCH format 3, if the UE receives a PDSCH or another PDCCH for SPS release only in the PCell, the UE cannot recognize an ARI value indicated by the SCell, such that it is impossible for the UE to recognize PUCCH format 3 resources. In this case, although the UE is configured to use the PUCCH format 3, it should be noted that the UE can transmit ACK/NACK using the PUCCH format 1a/1b.

Hereinafter, various embodiments illustrating a resource allocation method and ACK/NACK transmission method available when A/N repetition is used under the above-mentioned carrier aggregation situation will hereinafter be described.

In the present invention, if the UE performs A/N repetition $N_{ANRep}$ times, the UE performs general ACK/NACK feedback during the first transmission. For example, in case of the first transmission, the UE may transmit ACK/NACK transmission on PUCCH resource(s) decided by the implicit resource allocation. In order to replace resource(s) implicitly allocated in the first transmission with others in the remaining transmission (second to $N_{ANRep}$-th transmission), the UE is explicitly assigned as much resource(s) as resource(s) used in the first transmission from the BS through higher layer signaling (e.g., RRC), such that the implicitly assigned resource(s) may be replaced with other resource(s) explicitly assigned by the higher layer. Alternatively, if the implicit resources are derived only from a PCell, resources derived from the PCell may be replaced with resources configured for A/N repetition. In more detail, the present invention provides the following three embodiments A) to C) as resource allocation methods for A/N repetition.

Embodiment A

Case in which Only the Implicit Resource Allocation is Used in the First Transmission In case of cross-carrier scheduling of the Alt 2, four PUCCH resources having been implicitly assigned may be used for channel selection based on PUCCH format 1b. 2 resources may be derived from a PCell PDCCH (non-cross-carrier scheduling) and the remaining two resources may be derived from a PCell PDCCH (cross-carrier scheduling) for SCell. In this case, since there are a total of 4 implicit resources, it is necessary for at least four PUCCH resources to be configured for A/N repetition. Therefore, the UE may use four implicitly assigned PUCCH resources in case of the first transmission, and may use 4 PUCCH resources, that are configured for A/N repetition and signaled from the BS, as PUCCH resources for channel selection in the remaining second to $N_{ANRep}$-transmission.

Embodiment B

Case in which Only the Explicit Resource Allocation is Used Only in the First Transmission Resources of PUCCH format 3 may be determined by the explicit resource allocation only.

In this case, the implicit resource allocation is not present and only the explicit resource allocation is present, such that PUCCH resources ($n^{(3)}_{RUCCH-ANRep}$) for A/N repetition need not be separately configured, and the remaining transmission can be performed using PUCCH resource(s) indicated by the ARI in case of the first transmission. If the UE receives PDSCH/PDCCH from only a PCell, it is not necessary to configure explicit resources for A/N repetition based on PUCCH format 3, but explicit resources for A/N repetition based on PUCCH format 1a/1b are configured such that the explicit resource may be signaled to the UE. In case of the PUCCH format 1a/1b based A/N repetition, the UE may use PUCCH resources decided by the implicit resource allocation in case of the first transmission, and may use A/N repetition using the configured PUCCH resources in case of the second to $N_{ANRep}$-th transmission.

Embodiment C

In Case of Using the Implicit Resource Allocation and the Explicit Resource Allocation in the First Transmission In case of the Alt 1 or in case of the non-cross-carrier scheduling of the Alt 2, both the implicit resource allocation and the explicit resource allocation may be used for channel selection based on PUCCH format 1b.

In case of the Alt 1, a total number of implicit resources is set to 1. If A/N repetition is configured, the BS may configure at least one PUCCH resource for the A/N repetition, and may perform signaling of the configured result to the UE. However, since PUCCH resources to be reserved may be changed due to such reconfiguration, a plurality of PUCCH resources (e.g., 4 PUCCH resources) of more than one PUCCH resource may be configured for A/N repetition. In this case, the UE transmits ACK/NACK information using one implicit resource and three explicit resources during the first transmission. In case of the remaining transmission (second to $N_{ANRep}$-th transmission), the implicit resources may be replaced with the explicitly assigned resources for A/N repetition, and channel selection is carried out using the channel selection mapping table, such that the ACK/NACK information can be transmitted.

In case of the non-cross-carrier scheduling at Alt 2, a total number of implicit resources is 2. Thus, if A/N repetition is configured, the BS configures at least two PUCCH resources for the A/N repetition, and performs signaling of the configured result to the UE. However, the number (for example, 2) of resources signaled for A/N repetition in case of the cross-carrier scheduling is different from the number (for example, 4) of resources signaled for A/N repetition in case of the non-cross-carrier scheduling. For RRC reconfiguration handling between the cross-carrier scheduling and the non-cross-carrier scheduling, a higher one (i.e., 4) of the two values (2 and 4) may always be configured in the RRC. In case of the cross-carrier scheduling, the UE transmits ACK/NACK information using two implicit resources and two explicit resources during the first transmission. In the remaining transmission (second to $N_{ANRep}$-th transmission), the UE replaces the implicit resources with the explicitly assigned resources for A/N repetition (i.e., the UE uses the explicit resources in all transmission), performs channel selection using the channel selection mapping table, such that the ACK/NACK information can be transmitted. In case of the non-cross-carrier scheduling, the UE performs channel selection using the channel selection mapping table on the basis of the four implicit resources, such that it can transmit the ACK/NACK information.

On the other hand, the BS allows PUCCH resources to be reserved in predetermined SR-purposed subframes for the UE through higher layer signaling (e.g., RRC signaling). For example, PUCCH resources may be reserved for a specific UE at intervals of a predetermined number of SR-purposed subframes through higher layer signaling. The UE may determine SR-purposed PUCCH resources reserved in the UE (i.e., SR PUCCH resources) on the basis of the higher layer signaling. If the UE desires to request UL scheduling from the BS, the UE transmits a modulation symbol '1' indicating the SR using the above-mentioned SR PUCCH resources. While the UE does not request UL scheduling, the UE does not transmit information through the SR PUCCH. Basically, if it is assumed that a signal received through the SR PUCCH resources is present in a subframe having reserved SR PUCCH resources, the BS determines the presence of a UL scheduling request of the UE. On the other hand, if a signal received through the SR PUCCH resources is not present in the subframe including reserved SR PUCCH resources, the BS determines the absence of a UL scheduling request of the UE.

ACK/NACK PUCCH resources dynamically decided by PDSCH resources may be located at the same subframe as that of the SR PUCCH resources. Although several UEs can transmit UL control information (UCI) using the same PUCCH resource within one subframe, one UE may transmit UL control information (UCI) through only one PUCCH resource within one subframe. In other words, in the 3GPP LTE system, it is impossible for one UE to use several PUCCH resources for UCI transmission. Therefore, in the case where ACK/NACK information and other control information (e.g., CQI/PMI/RI, SR. etc.) must be simultaneously transmitted in one subframe, the UE performs piggybacking of ACK/NACK information to other control information, such that the piggyback result is transmitted on a PUCCH allocated to transmit the other control information. That is, provided that SR PUCCH resources are allocated to a subframe in which ACK/NACK information must be transmitted by the UE, the ACK/NACK information is transmitted using the SR PUCCH resources instead of the dynamically decided ACK/NACK PUCCH resources. In other words, when positive SR transmission and ACK/NACK transmission are simultaneously carried out, the UE modulates the ACK/NACK information and transmits the modulated result to the BS on the SR PUCCH resources. For example, referring to FIG. 11, PUCCH (m=3) may be determined to be ACK/NACK PUCCH resources at a subframe in which PUCCH (m=1) is reserved for an SR of a specific UE. In this case, the specific UE transmits the ACK/NACK information on PUCCH (m=1) instead of PUCCH (m=3). Since there is a signal received on the PUCCH (m=1) reserved for the specific UE, the presence of a UL scheduling request of the specific UE is determined. In case of FDD, constellation for ACK/NACK information transmission is transmitted through SR PUCCH resources in the PUCCH format 1a/1b without change. In case of TDD, the number of ACK information is counted, and the counted number is modulated and transmitted on the SR PUCCH resources. In case of the PUCCH format 3, the UE increases as much payload as 1 bit only in the subframe including reserved SR PUCCH resources. As a result, when the SR is negative or positive, '0' or '1' is jointcoded with ACK/NACK information, such that the jointcoded result may be transmitted to the BS. Next, various embodiments illustrating a method for processing the (SR+ACK/NACK) transmission when the A/N repetition is configured will hereinafter be described in detail.

Embodiment I (SR+ACK/NACK) Transmission is Supported Only in the SR Subframe

SR and ACK/NACK are simultaneously transmitted only in a subframe in which SR and ACK/NACK transmission occurs from among a plurality of SR subframes.

Provided that the PUCCH format 1a/1b or the PUCCH format 1b with channel selection is used for ACK/NACK transmission, if the SR is negative, the UE may perform A/N repetition using PUCCH resource(s) decided by any one of the embodiments 1 to C. If the SR is positive, the UE loads ACK/NACK information on the SR PUCCH resources only in the SR subframe, and transmits the loaded ACK/NACK information. For example, it is assumed that A/N repetition is performed in each of Subframe #X, Subframe #X+1, Subframe #X+2, and Subframe #X+3, and it is also assumed that Subframe #X+1 is used as the SR subframe. If the SR is positive, the UE transmits ACK/NACK information to the BS on the SR PUCCH resource only in the Subframe #X+1. In the remaining subframes (Subframe #X, Subframe #X+2, Subframe #X+3), the above-mentioned ACK/NACK information can be transmitted on the designated ACK/NACK PUCCH resource(s). If the SR is negative, the UE may transmit ACK/NACK information on the designated ACK/NACK PUCCH resource(s) instead of SR PUCCH resources in all subframes (Subframe #X, Subframe #X+1, Subframe #X+2, Subframe #X+3).

In case of applying the PUCCH format 3 to the ACK/NACK transmission, one bit is always added to ACK/NACK information irrespective of negative/positive SR, the UE may add the SR bit to each SR subframe such that it may transmit the SR and ACK/NACK information to the BS. For example, it is assumed that A/N repetition is performed in each of Subframe #X, Subframe #X+1, Subframe #X+2, and Subframe #X+3, and it is also assumed that Subframe #X+1 is used as the SR subframe. If the SR is positive, the UE adds the SR bit indicating the positive state to the start or end part of ACK/NACK payload at the subframe #X+1, such that it simultaneously transmits the SR and the ACK/NACK on the (explicitly or implicitly) designated ACK/NACK PUCCH resources. In the remaining subframes (Subframe #X, Subframe #X+2, Subframe #X+3), the SR bit is not added, and only ACK/NACK information can be transmitted on ACK/NACK PUCCH resources. If the SR is negative, the UE adds the SR bit indicating the negative state to the start or end part of ACK/NACK payload at the subframe #X+1, such that it can simultaneously transmit the SR and the ACK/NACK on ACK/NACK PUCCH resources. In the remaining subframes (Subframe #X, Subframe #X+2, Subframe #X+3), the SR bit is not added, and only ACK/NACK information can be transmitted on ACK/NACK PUCCH resources.

Embodiment II (SR+ACK/NACK) Transmission is Supported in all A/N Repetition Intervals Provided that the PUCCH format 1a/1b or the PUCCH format 1b with channel selection is used for ACK/NACK transmission, the UE may simultaneously transmit the SR and the ACK/NACK information during all the A/N repetition intervals. That is, ACK/NACK information can be transmitted on SR PUCCH resources during all the A/N repetition intervals. For example, it is assumed that A/N repetition is performed in each of Subframe #X, Subframe #X+1, Subframe #X+2, and Subframe #X+3, and it is also assumed that Subframe #X+1 is used as the SR subframe. If the SR is positive, the UE transmits ACK/NACK information to the BS on SR PUCCH resources only in all the subframes (i.e., Subframe #X, Subframe #X+1, Subframe #X+2, and Subframe #X+3). If the SR is negative, the UE may transmit ACK/NACK information on the designated ACK/NACK PUCCH resource(s) instead of SR PUCCH resources in all the subframes (Subframe #X, Subframe #X+1, Subframe #X+2, Subframe #X+3).

In case of applying the PUCCH format 3 to the ACK/NACK transmission, at least one subframe in which A/N repetition is performed overlaps with the SR subframe, the UE adds the SR bit composed of 1 bit to ACK/NACK information in all subframes where the A/N repetition is performed, and transmits the added result. For example, it is assumed that A/N repetition is performed in Subframe #X, Subframe #X+1, Subframe #X+2, and Subframe #X+3, and it is also assumed that Subframe #X+1 is used as the SR subframe. If the SR is positive, the UE adds the SR bit indicating the positive state to the start or end part of ACK/NACK payload at the subframes (Subframe #X, Subframe #X+1, Subframe #X+2, Subframe #X+3), such that it simultaneously transmits the SR and the ACK/NACK on the (explicitly or implicitly) designated ACK/NACK PUCCH resources. If the SR is negative, the UE adds the SR bit indicating the negative state to the start or end part of ACK/NACK payload at all subframes (i.e., Subframe #X, Subframe #X+1, Subframe #X+2, Subframe #X+3), such that it can simultaneously transmit the SR and the ACK/NACK on ACK/NACK PUCCH resources.

Embodiment III

SR Drop in Case of A/N Repetition

Provided that the PUCCH format 1a/1b or the PUCCH format 1b with channel selection is used for ACK/NACK transmission, if the SR is negative, the UE transmits ACK/NACK information on ACK/NACK PUCCH resource(s). If the SR is positive, the UE drops the SR, and transmits ACK/NACK information on the ACK/NACK PUCCH resource(s).

If the PUCCH format 3 is used for ACK/NACK transmission and the SR is negative, the UE does not increase one bit for the SR at the SR subframe, and transmits only ACK/NACK information on ACK/NACK PUCCH resource(s). Even in the case where the SR is positive, the UE does not increase one bit at the SR subframe, and may transmit only ACK/NACK information on ACK/NACK PUCCH resource(s).

In Embodiments I to III, a communication system may be limited in a manner that A/N repetition (including channel selection) and SORTD for the PUCCH format 1a/1b are not simultaneously configured in consideration of simultaneously occurrence of SR transmission and ACK/NACK transmission. That is, if A/N repetition is configured, the single antenna transmission scheme may be applied as a default to SORTD for the PUCCH format 1/1a/1b. In this case, the PUCCH format 1 and the PUCCH format 1a/1b have different SORTD structures, such that A/N repetition and/or SORTD may be separately designated. Alternatively, if A/N repetition and SORTD are simultaneously configured, the UE may disregard the SORTD and transmit ACK/NACK information to the BS using the single antenna transmission scheme. For example, if A/N repetition and SORTD are simultaneously configured, the SORTD may be disregarded.

Embodiments 1 to C may be applied to decide ACK/NACK PUCCH resources used for A/N repetition in Embodiments I and II. In other words, Embodiments I to III may be combined with Embodiments 1 to C.

Figure 47:
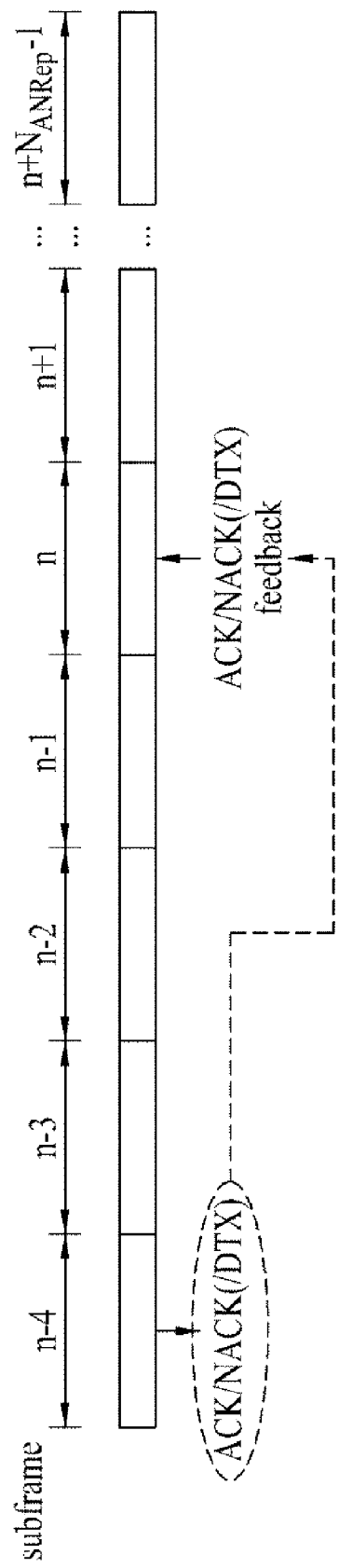
FIG. 47 exemplarily shows ACK/NACK transmission timing.

FIG. 47 exemplarily shows ACK/NACK transmission timing.

Referring to FIG. 47, at the subframe (n-k) (where k is a positive integer, for example, k=4), the UE may detect ACK/NACK response(s) for 'PDSCH with corresponding PDCCH', 'PDCCH for SPS release' and/or 'PDSCH without PDCCH' and may transmit ACK/NACK information indicating the above-mentioned ACK/NACK response(s) at the subframe (n). If the BS transmits A/N repetition information indicating that A/N repetition is configured in the UE, the UE may repeatedly transmit the ACK/NACK information over contiguous UL subframes $N_{ANRep}$ times indicated by the A/N repetition information. According to any one of the above-mentioned embodiments, the UE performs A/N repetition such that it transmits the ACK/NACK information to the BS. The BS has recognized which one of PUCCH resources is to be used for ACK/NACK transmission at each transmission by the UE. Accordingly, the BS receives or detects the implicitly and/or explicitly assigned PUCCH resource(s) allocated to the UE for ACK/NACK information transmission, such that the BS can receive the ACK/NACK information transmitted from the UE at subframes involved in ACK/NACK repetition.

For example, as can be seen from Embodiment 1, if the UE that has received a message indicating ACK/NACK transmission on two antenna ports from the BS has to perform A/N repetition (i.e., if the UE having received a message indicating SORTD activation has to perform A/N repetition), the UE performs ACK/NACK transmission using 2 PUCCH resources decided by the implicit resource allocation using a PDCCH received from the BS during the first transmission. From the second transmission, the ACK/NACK transmission may be repeated $N_{ANRep}-1$ times using 2 PUCCH resources decided by the explicit resource allocation. The UE may receive A/N repetition configuration and/or SORTD activation from the BS through a higher layer message (e.g., RRC message). In addition, the UE may receive the repetition factor (also called 'iteration factor') for the A/N repetition from the BS through the higher layer message. In addition, the UE may receive PUCCH resource information indicating 2 PUCCH resources for the second to ($N_{ANRep}-1$)-th transmission from the BS through the higher layer message. If SORTD based on two antenna ports (p0 and p1) is configured, the PUCCH resource information may include information (for example, $n^{(1,p0)}_{PUCCH-ANRep}$) indicating a PUCCH resource for the antenna port (p0) and information (for example, $n^{(1,p1)}_{PUCCH-ANRep}$) indicating a PUCCH resource for the antenna port (p1) separately from each other.

The BS has recognized $n_{CCE}$ of the PDCCH, such that it can recognize which one of PUCCH resources will be used in the first transmission at each antenna port (p0) or (p1) according to Math Figures 7 and 8. In addition, since the BS has transmitted the repetition factor $N_{ANRep}$ and the PUCCH resource information to the UE, it can be recognized which one of PUCCH resources will be used in the second to ($N_{ANRep}-1$)-th transmission at each of the antenna port (p0) and the antenna port (p1). Therefore, the BS receives first ACK/NACK transmission of the UE using two PUCCH resources derived from $n_{CCE}$ and $n_{CCE}+1$ of the PDCCH at the antenna port (p0) and the antenna port (p1). The BS may further repeatedly receive ACK/NACK information $N_{ANRep}-1$ times from the antenna port (p0) and the antenna port (p1) using two PUCCH resources indicated by PUCCH resource information.

Referring to FIG. 46, the UE processor 400a controls the UE receiver 300a such that the UE may detect ACK/NACK response(s) for PDCCH(s) and/or 'PDSCH(s) without PDCCH' at the subframe (n-k) (where k is a positive integer, for example, k=4), the UE processor 400a generates ACK/NACK information indicating the ACK/NACK response(s) and controls the UE transmitter 100a in such a manner that the ACK/NACK information can be transmitted at the subframe (n). The UE receiver 300a may receive information indicating either A/N repetition configuration and/or SORTD activation from the BS. In addition, the UE receiver 300a may receive information indicating the repetition factor ($N_{ANRep}$) of the A/N repetition from the BS. The UE processor 400a may control the UE transmitter in such a manner that the A/N repetition is performed according to one embodiment of the present invention.

For example, referring to the first embodiment (Embodiment 1), if the UE that has received a message instructing the UE to perform ACK/NACK transmission through 2 antenna ports from the BS receives a message indicating A/N repetition from the BS, the UE processor 400a controls the UE transmitter 100a in such a manner that ACK/NACK transmission can be performed in the first transmission using 2 PUCCH resources decided by the implicit resource allocation based on a PDCCH received from the BS. From the second transmission, the UE processor 400a may control the UE transmitter 100a in such a manner that the ACK/NACK transmission is repeated ($N_{ANRep}-1$) times using 2 PUCCH resources decided by the explicit resource allocation. The UE receiver 300a may receive information regarding A/N repetition configuration and/or SORTD activation from the BS through a higher layer message (e.g., RRC message). In addition, the UE receiver 300a may receive the repetition factor $N_{ANRep}$ for the A/N repetition from the BS through the higher layer message. In addition, the UE receiver 300a may receive PUCCH resource information indicating 2 PUCCH resources for the second to ($N_{ANRep}-1$)-th transmission from the BS through the higher layer message. If SORTD based on two antenna ports (p0 and p1) is configured, the PUCCH resource information may separately include information (for example, $n^{(1,p0)}_{PUCCH-ANRep}$) indicating a PUCCH resource for the antenna port (p0) and information (for example, $n^{(1,p1)}_{PUCCH-ANRep}$) indicating a PUCCH resource for the antenna port (p1). The UE processor 400a controls the UE transmitter 100a, such that the UE transmitter 100a performs the first ACK/NACK transmission through the antenna port (p0) using a PUCCH resource derived from $n_{CCE}$ of a PDCCH received from the BS and performs the first ACK/NACK transmission through the antenna port (p1) using a PUCCH resource derived from $n_{CCE}+1$. The UE processor 400a may decide an ACK/NACK PUCCH resource to be initially used for the ACK/NACK transmission at the antenna port (p0) according to Math Figure 6, and may decide an ACK/NACK resource to be used for ACK/NACK transmission at the antenna port (p1) according to Math FIG. 7. Under the control of the UE processor 400a, the UE transmitter 100a performs initial/first transmission of the corresponding ACK/NACK information using 2 PUCCH resources respectively derived from $n_{CCE}$ and $n_{CCE}+1$ through the antenna port (p0) and the antenna port (p1) in the subframe n. The corresponding ACK/NACK information may represent ACK/NACK response(s) detected in the subframe n-k. In addition, under the control of the UE processor 400a, the UE transmitter 100a can perform the second to $N_{ANRep}$-th transmission using 2 PUCCH resources indicated by the PUCCH resource information through the antenna port (p0) and the antenna port (p1) in subframes 'n+1' to 'n+$N_{ANRep}-1$'.

The PDCCH and the PDCCH resource information may be transmitted from the BS transmitter 100b to the UE under the control of the BS processor 400b. Therefore, the BS processor 400b can know $n_{CCE}$ of the PDCCH, such that it can recognize which one of PUCCH resources will be used in the first transmission at each of the antenna port (p0) and the antenna port (p1). In addition, the BS transmitter 100b has transmitted the repetition factor $N_{ANRep}$ and the PUCCH resource information to the UE under the control of the BS processor 400a, such that the BS processor 400b can recognize which one of PUCCH resources will be used in the second to ($N_{ANRep}-1$)-th transmission at each of the antenna port (p0) and the antenna port (p1). Therefore, the BS processor 400b receives first ACK/NACK transmission of the UE at the antenna port (p0) and the antenna port (p1) using 2 PUCCH resources respectively derived from $n_{CCE}$ and $n_{CCE}+1$ of the PDCCH. In addition, the BS processor 400b controls the BS receiver 300b such that the BS receiver 300b repeatedly receives the ACK/NACK transmission information ($N_{ANRep}-1$) times from each of the antenna port (p0) and the antenna port (p1) using 2 PUCCH resources indicated by the PUCCH resource information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

The invention claimed is:

1. A method for transmitting acknowledgement/negative acknowledgement (ACK/NACK) information by a user equipment in a wireless communication system, the method comprising:
    receiving, by the user equipment, a physical downlink control channel (PDCCH);
    receiving, by the user equipment, physical uplink control channel (PUCCH) resource information for ACK/NACK repetition;
    performing an initial transmission of the ACK/NACK information through a first antenna port and a second antenna port; and
    performing a repetition transmission of the ACK/NACK information through the first antenna port and the second antenna port based on the PUCCH resource information,
    wherein the initial transmission of the ACK/NACK information is performed through the first antenna port using a first PUCCH resource n(1)PUCCH,1 and through the second antenna port using a second PUCCH resource n(1)PUCCH,2, where n(1)PUCCH,1=nCCE+N(1)PUCCH and n(1)PUCCH,2=nCCE+1+N(1)PUCCH, where nCCE is a lowest control channel element (CCE) index from among CCE indexes of the PDCCH, and N(1)PUCCH is configured by a higher layer, and
    wherein the repetition transmission of the ACK/NACK information is performed through the first antenna port using a third PUCCH resource n(1)PUCCH,3 and through the second antenna port using a fourth PUCCH resource n(1)PUCCH,4, where n(1)PUCCH,3 and n(1)PUCCH,4 are configured for the first antenna port and the second antenna port, respectively, by the PUCCH resource information.

2. The method according to claim 1, further comprising:
    receiving, by the user equipment, information indicating the number of ACK/NACK repetition transmissions, Nrep,
    wherein the ACK/NACK information is retransmitted Nrep times through the first antenna port using the third PUCCH resource n(1)PUCCH,3 and through the second antenna port using the fourth PUCCH resource n(1)PUCCH,4.

3. The method according to claim 2, wherein the information indicating Nrep and the PUCCH resource information are received through a radio resource control (RRC) message.

4. The method according to claim 1, wherein:
    if the PDCCH is a PDCCH indicating a specific PDSCH, the ACK/NACK information is for the specific PDSCH, and
    if the PDCCH is a PDCCH indicating semi-static scheduling (SPS) release, the ACK/NACK information is for the PDCCH indicating the SPS release.

5. The method according to claim 1, further comprising:
    receiving, by the user equipment, information instructing the user equipment to transmit the ACK/NACK information through the first and second antenna ports.

6. A method for receiving acknowledgement/negative acknowledgement (ACK/NACK) information by a base station in a wireless communication system, the method comprising:
- transmitting a physical downlink control channel (PDCCH) to a user equipment;
- transmitting physical uplink control channel (PUCCH) resource information for ACK/NACK repetition to the user equipment;
- performing an initial reception of the ACK/NACK information from a first antenna port of the user equipment and a second antenna port of the user equipment; and
- performing a repetition reception of the ACK/NACK information from the first antenna port and the second antenna port based on the PUCCH resource information,
- wherein the initial reception of the ACK/NACK information is received from the first antenna port using a first PUCCH resource $n(1)PUCCH,1$ and from the second antenna port using a second PUCCH resource $n(1)PUCCH,2$, where $n(1)PUCCH,1 = nCCE + N(1)PUCCH$ and $n(1)PUCCH,2 = nCCE+1+N(1)PUCCH$, where nCCE is a lowest control channel element (CCE) index from among CCE indexes of the PDCCH, and $N(1)PUCCH$ is configured by a higher layer, and
- wherein the repetition reception of the ACK/NACK information is received from the first antenna port using a third PUCCH resource $n(1)PUCCH,3$ and from the second antenna port using a fourth PUCCH resource $n(1)PUCCH,4$, where $n(1)PUCCH,3$ and $n(1)PUCCH,4$ are configured for the first antenna port and the second antenna port, respectively, by the PUCCH resource information.

7. The method according to claim 6, further comprising:
- transmitting information indicating the number of ACK/NACK repetition transmissions, Nrep, to the user equipment,
- wherein the ACK/NACK information is repeatedly received Nrep times using the third PUCCH resource $n(1)PUCCH,3$ and the fourth PUCCH resource $n(1)PUCCH,4$.

8. The method according to claim 7, further comprising:
- transmitting the information indicating Nrep and the PUCCH resource information to the user equipment through a radio resource control (RRC) message.

9. The method according to claim 6, wherein:
- if the PDCCH is a PDCCH indicating a specific PDSCH, the ACK/NACK information is for the specific PDSCH, and
- if the PDCCH is a PDCCH indicating semi-static scheduling (SPS) release, the ACK/NACK information is for the PDCCH indicating the SPS release.

10. The method according to claim 6, further comprising: transmitting, to the user equipment, information instructing the user equipment to transmit the ACK/NACK information through the first and second antenna ports.

11. A user equipment for transmitting acknowledgement/negative acknowledgement (ACK/NACK) information in a wireless communication system, the user equipment comprising:
- a receiver;
- a transmitter; and
- a processor for controlling the receiver and the transmitter, wherein the processor controls the receiver to receive a physical downlink control channel (PDCCH) and to receive physical uplink control channel (PUCCH) resource information for ACK/NACK repetition, and the processor controls the transmitter to perform an initial transmission of the ACK/NACK information through a first antenna port and through a second antenna port, and controls the transmitter to perform a repetition transmission of the ACK/NACK information through the first antenna port and the second antenna port based on the PUCCH resource information,
- wherein the initial transmission of the ACK/NACK information is performed through the first antenna port using a first PUCCH resource $n(1)PUCCH,1$ and through the second antenna port using a second PUCCH resource $n(1)PUCCH,2$, where $n(1)PUCCH,1=nCCE+N(1)PUCCH$ and $n(1)PUCCH,2=nCCE+1+N(1)PUCCH$, where nCCE is a lowest control channel element (CCE) index from among CCE indexes of the PDCCH, and $N(1)PUCCH$ is configured by a higher layer, and
- wherein the repetition transmission of the ACK/NACK information is performed through the first antenna port using a third PUCCH resource $n(1)PUCCH,3$ and through the second antenna port using a fourth PUCCH resource $n(1)PUCCH,4$, where $n(1)PUCCH,3$ and $n(1)PUCCH,4$ are configured for the first antenna port and the second antenna port, respectively, by the PUCCH resource information.

12. The user equipment according to claim 11, wherein the processor controls the receiver to receive information indicating the number of ACK/NACK repetition transmissions, Nrep, and the processor controls the transmitter to retransmit the ACK/NACK information Nrep times through the first antenna port using the third PUCCH resource $n(1)PUCCH,3$ and through the second antenna port using the fourth PUCCH resource $n(1)PUCCH,4$.

13. The user equipment according to claim 12, wherein the processor controls the receiver to receive the information indicating Nrep and the PUCCH resource information through a radio resource control (RRC) message.

14. The user equipment according to claim 11, wherein:
- if the PDCCH is a PDCCH indicating a specific PDSCH, the ACK/NACK information is for the specific PDSCH, and
- if the PDCCH is a PDCCH indicating semi-static scheduling (SPS) release, the ACK/NACK information is for the PDCCH indicating the SPS release.

15. The user equipment according to claim 11, wherein the processor controls the receiver to receive information instructing the user equipment to transmit the ACK/NACK information through the first and second antenna ports.

16. A base station for receiving acknowledgement/negative acknowledgement (ACK/NACK) information by a base station in a wireless communication system, the base station comprising:
- a receiver;
- a transmitter; and
- a processor for controlling the receiver and the transmitter, wherein the processor controls the transmitter to transmit a physical downlink control channel (PDCCH) to a user equipment and transmit physical uplink control channel (PUCCH) resource information for ACK/NACK repetition to the user equipment, and the processor controls the receiver to perform an initial reception of the ACK/NACK information from a first antenna port of the user equipment and a second antenna port of the user equipment, and controls the receiver to perform a repetition reception of the ACK/NACK information from the first antenna port and the second antenna port based on the PUCCH resource information, wherein the initial reception of the ACK/NACK information is received from the first antenna port using a first PUCCH resource n(1)PUCCH,1 and from the second antenna port using a second PUCCH resource n(1)PUCCH,2, where n(1)PUCCH,1=nCCE+N(1)PUCCH and n(1)PUCCH,2=nCCE+1+N(1)PUCCH, where nCCE is a lowest control channel element (CCE) index from among CCE indexes of the PDCCH, and N(1)PUCCH is configured by a higher layer, and wherein the repetition reception of the ACK/NACK information is received from the first antenna port using a third PUCCH resource n(1)PUCCH,3 and from the second antenna port using a fourth PUCCH resource n(1)PUCCH,4, where n(1)PUCCH,3 and n(1)PUCCH,4 are configured for the first antenna port and the second antenna port, respectively, by the PUCCH resource information.

17. The base station according to claim 16, wherein the processor controls the transmitter to transmit information indicating the number of ACK/NACK repetition transmissions, Nrep, to the user equipment, and controls the receiver to repeatedly receive the ACK/NACK information Nrep times using the third PUCCH resource n(1)PUCCH,3 and the fourth PUCCH resource n(1)PUCCH,4.

18. The base station according to claim 17, wherein the processor transmits the information indicating Nrep and the PUCCH resource information to the user equipment through a radio resource control (RRC) message.

19. The base station according to claim 16, wherein:
 if the PDCCH is a PDCCH indicating a specific PDSCH, the ACK/NACK information relates to the PDSCH, and
 if the PDCCH is a PDCCH indicating semi-static scheduling (SPS) release, the ACK/NACK information indicates the SPS release.

20. The base station according to claim 16, wherein the processor controls the transmitter to transmit information instructing the user equipment to transmit the ACK/NACK information through the first and second antenna ports.

* * * * *